(12) United States Patent
Kim et al.

(10) Patent No.: US 12,372,258 B2
(45) Date of Patent: Jul. 29, 2025

(54) AIR CLEANING APPARATUS

(71) Applicant: SK MAGIC CO., LTD, Seoul (KR)

(72) Inventors: Hyo-dong Kim, Hwaseong-si (KR); Young-Gwan Song, Hwaseong-si (KR); Hee-Chul Bae, Hwaseong-si (KR); Hyun-Ik Park, Hwaseong-si (KR); Eun-Seon Park, Hwaseong-si (KR); One-Sub Kim, Hwaseong-si (KR); Deok-In Choi, Hwaseong-si (KR); Jae-Hyung Choi, Hwaseong-si (KR)

(73) Assignee: SK MAGIC CO., LTD., Seoul (KR)

( * ) Notice: Subject to any disclaimer, the term of this patent is extended or adjusted under 35 U.S.C. 154(b) by 228 days.

(21) Appl. No.: 17/640,820

(22) PCT Filed: Aug. 25, 2021

(86) PCT No.: PCT/KR2021/011387
§ 371 (c)(1),
(2) Date: Mar. 5, 2022

(87) PCT Pub. No.: WO2022/045776
PCT Pub. Date: Mar. 3, 2022

(65) Prior Publication Data
US 2023/0175721 A1    Jun. 8, 2023

(30) Foreign Application Priority Data

Aug. 27, 2020   (KR) .................. 10-2020-0108854
Aug. 27, 2020   (KR) .................. 10-2020-0108855
(Continued)

(51) Int. Cl.
*F24F 8/80*     (2021.01)
*F24F 11/56*    (2018.01)
(Continued)

(52) U.S. Cl.
CPC .............. *F24F 8/80* (2021.01); *F24F 11/56* (2018.01); *F24F 13/084* (2013.01); *F24F 13/20* (2013.01); *F24F 8/108* (2021.01); *F24F 11/89* (2018.01)

(58) Field of Classification Search
CPC .. F24F 8/80; F24F 11/56; F24F 13/084; F24F 13/20; F24F 8/108; F24F 11/89; F24F 13/28; Y02B 30/70; H02J 50/00
See application file for complete search history.

(56) References Cited

U.S. PATENT DOCUMENTS 10,184,677 B2   1/2019   Son et al.
10,596,294 B2   3/2020   Kim et al.
(Continued)

FOREIGN PATENT DOCUMENTS

CN     1993588      7/2007
CN    106979560     7/2017
(Continued)

OTHER PUBLICATIONS

Translation of KR1020050067287, accessed Dec. 9, 2024 (Year: 2005).*
(Continued)

*Primary Examiner* — Jennifer Dieterle
*Assistant Examiner* — Phillip Y Shao

(57) ABSTRACT

An air cleaner includes a housing including a first opening configured to absorb outside air, a second opening configured to discharge the air outside, and a housing body having an internal flow path connecting the first opening and the second opening, a blower unit including a blowing fan configured to blow air accommodated in the internal flow path toward the second opening, and a driving motor disposed between the first opening and the blowing fan and detachably shaft-coupled to the blowing fan, and installed in (Continued)

the internal flow path, a filter installed in the internal flow path and configured to purify air absorbed through the first opening, and a discharge unit including a discharge grille having a plurality of discharge holes formed to allow air reaching the second opening to pass therethrough and detachably coupled to the second opening. Accordingly, the discharge grille for discharging air purified by the filter to the outside is separated from the opening of the housing to open the internal flow path in which the blowing fan and other internal components are installed, and thus cleaning, repair, and other tasks on the internal flow path and internal components are easily performed through the opening from which the discharge grille is separated.

4 Claims, 76 Drawing Sheets

(30)  Foreign Application Priority Data

| Aug. 27, 2020 | (KR) | 10-2020-0108856 |
|---|---|---|
| Oct. 20, 2020 | (KR) | 10-2020-0135611 |
| Dec. 7, 2020 | (KR) | 10-2020-0169724 |
| Jun. 29, 2021 | (KR) | 10-2021-0085119 |

(51) Int. Cl.
    *F24F 13/08*     (2006.01)
    *F24F 13/20*     (2006.01)
    *F24F 8/108*     (2021.01)
    *F24F 11/89*     (2018.01)

(56) References Cited

U.S. PATENT DOCUMENTS

| 2005/0268583 | A1 | 12/2005 | Han et al. | |
| 2006/0201119 | A1* | 9/2006 | Song | B01D 53/007 55/471 |
| 2017/0122602 | A1 | 5/2017 | Son et al. | |
| 2017/0246581 | A1* | 8/2017 | Jung | F24F 8/10 |
| 2017/0248153 | A1* | 8/2017 | Park | F04D 29/703 |
| 2019/0264948 | A1* | 8/2019 | Jung | A61L 2/22 |

FOREIGN PATENT DOCUMENTS

| CN | 107388413 | 11/2017 |
|---|---|---|
| CN | 107990426 | 5/2018 |
| CN | 210511990 | 5/2020 |
| JP | 1989-186159 A | 7/1989 |
| JP | 2002-059028 | 2/2002 |
| JP | 5895753 | 3/2016 |
| JP | 2017-537294 | 12/2017 |
| KR | 20050067287 A * | 7/2005 |
| KR | 10-2007-0000128 | 1/2007 |
| KR | 10-2008-0045000 | 5/2008 |
| KR | 10-2012-0113163 | 10/2012 |
| KR | 10-2013-0055369 | 5/2013 |
| KR | 10-2016-0001945 | 1/2016 |
| KR | 10-2016-0025967 | 3/2016 |
| KR | 10-1600701 | 3/2016 |
| KR | 10-2017-0141577 | 12/2017 |
| KR | 10-2017-0141583 | 12/2017 |
| KR | 10-2018-0109790 | 10/2018 |
| KR | 10-1998780 B1 | 7/2019 |
| KR | 10-2019-0102739 | 9/2019 |

OTHER PUBLICATIONS

Translation of KR101998780B1, accessed Dec. 9, 2024 (Year: 2019).*
Notice of Allowance for Korea Patent Application No. 10-2020-0135611, mailed Mar. 31, 2022.
Office Action for Korea Patent Application No. 10-2020-0169724, mailed Jun. 2, 2022.
Notice of Allowance for Korea Patent Application No. 10-2020-0169724, mailed Dec. 13, 2022.
Office Action for Korea Patent Application No. 10-2021-0085119, mailed Jan. 12, 2023.
Notice of Allowance for Korea Patent Application No. 10-2021-0085119, mailed Jul. 19, 2023.
Office Action for Taiwan Patent Application No. 110131742, mailed Mar. 14, 2022.
Office Action for Taiwan Patent Application No. 111133028, mailed May 12, 2023.
Search Report for Taiwan Patent Application No. 111133028, mailed May 12, 2023.
Office Action for Taiwan Patent Application No. 111133029, mailed May 12, 2023.
Search Report for Taiwan Patent Application No. 111133029, mailed May 16, 2023.
Office Action for Taiwan Patent Application No. 111133030, mailed May 12, 2023.
Search Report for Taiwan Patent Application No. 111133030, mailed May 16, 2023.

* cited by examiner

【FIG. 1】
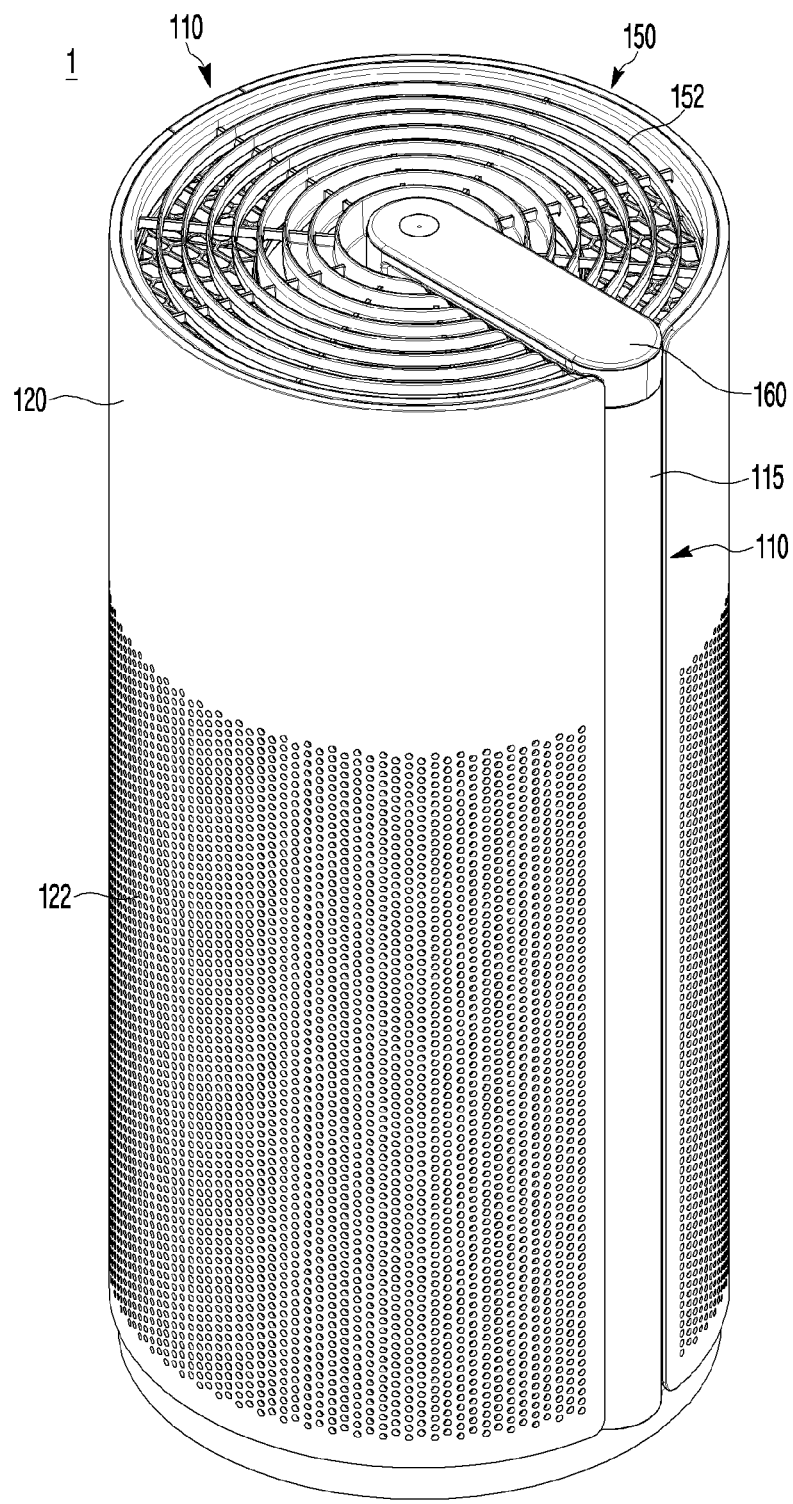

[FIG. 2]
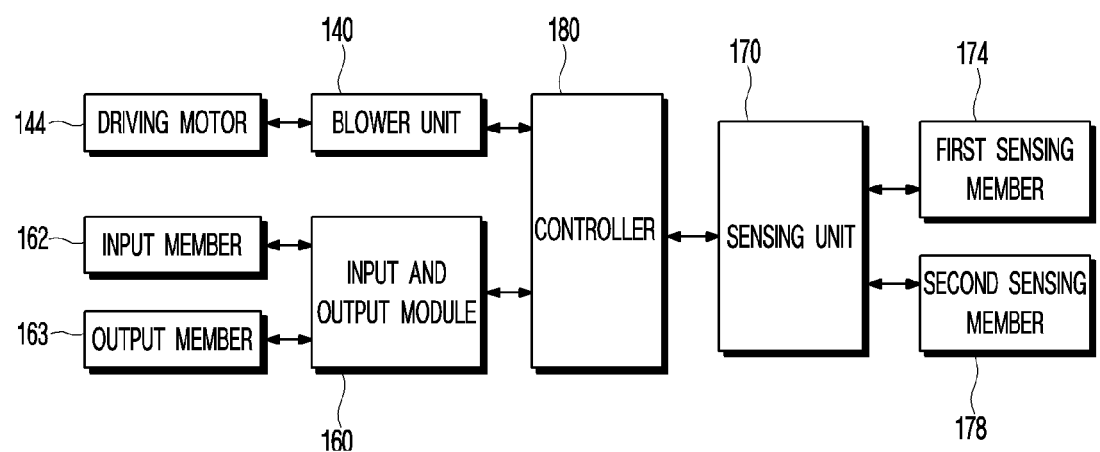

[FIG. 3]
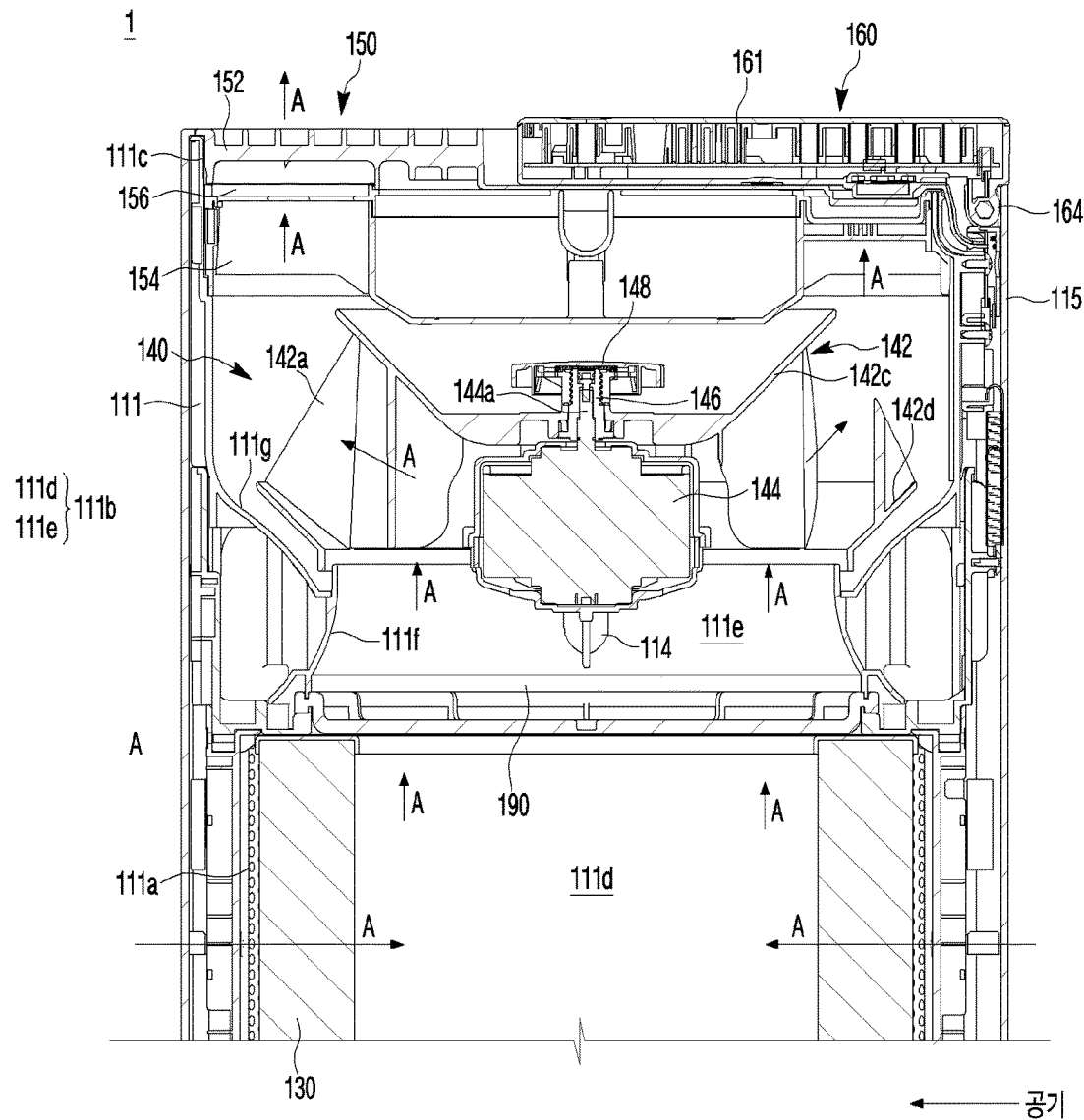

[FIG. 4]
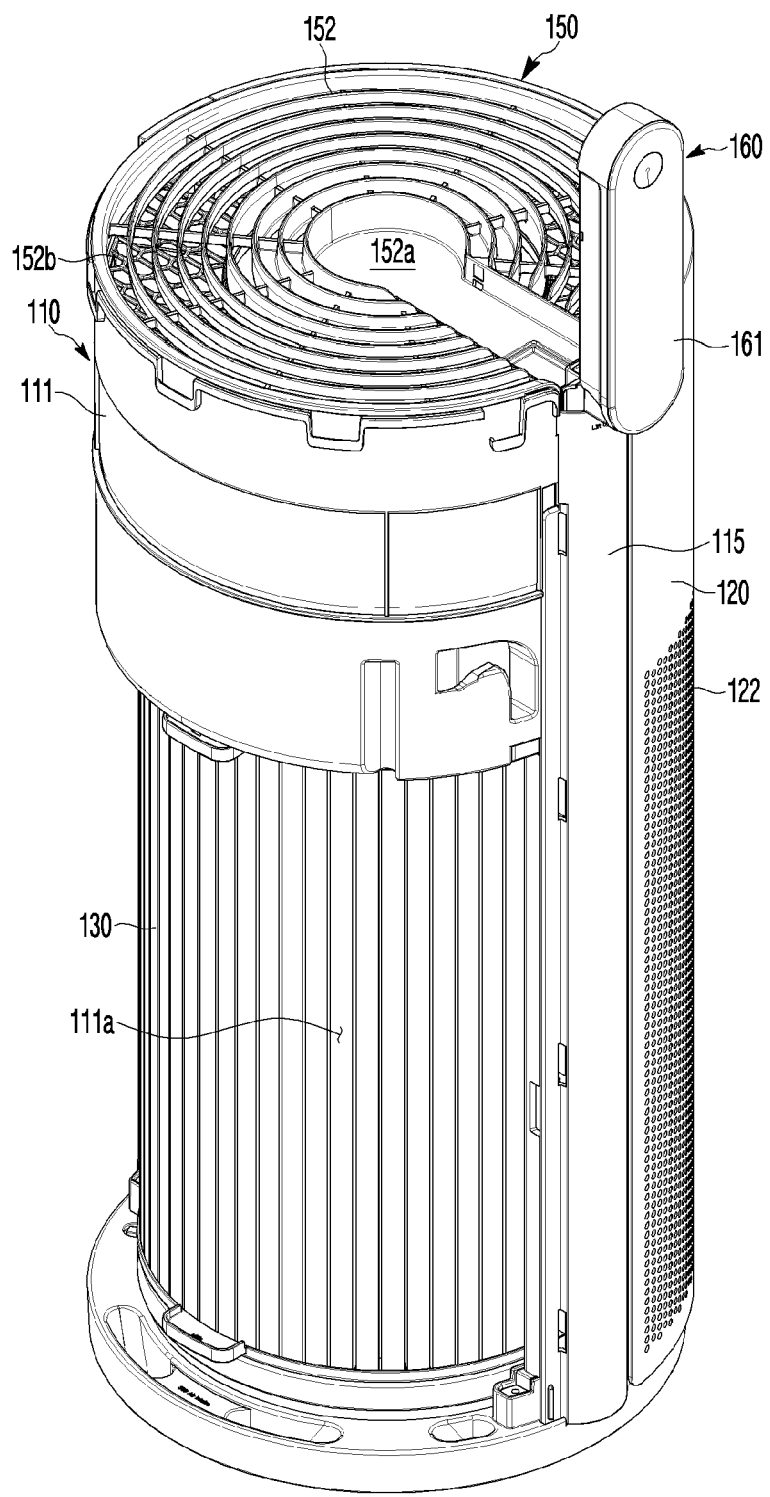

[FIG. 5]
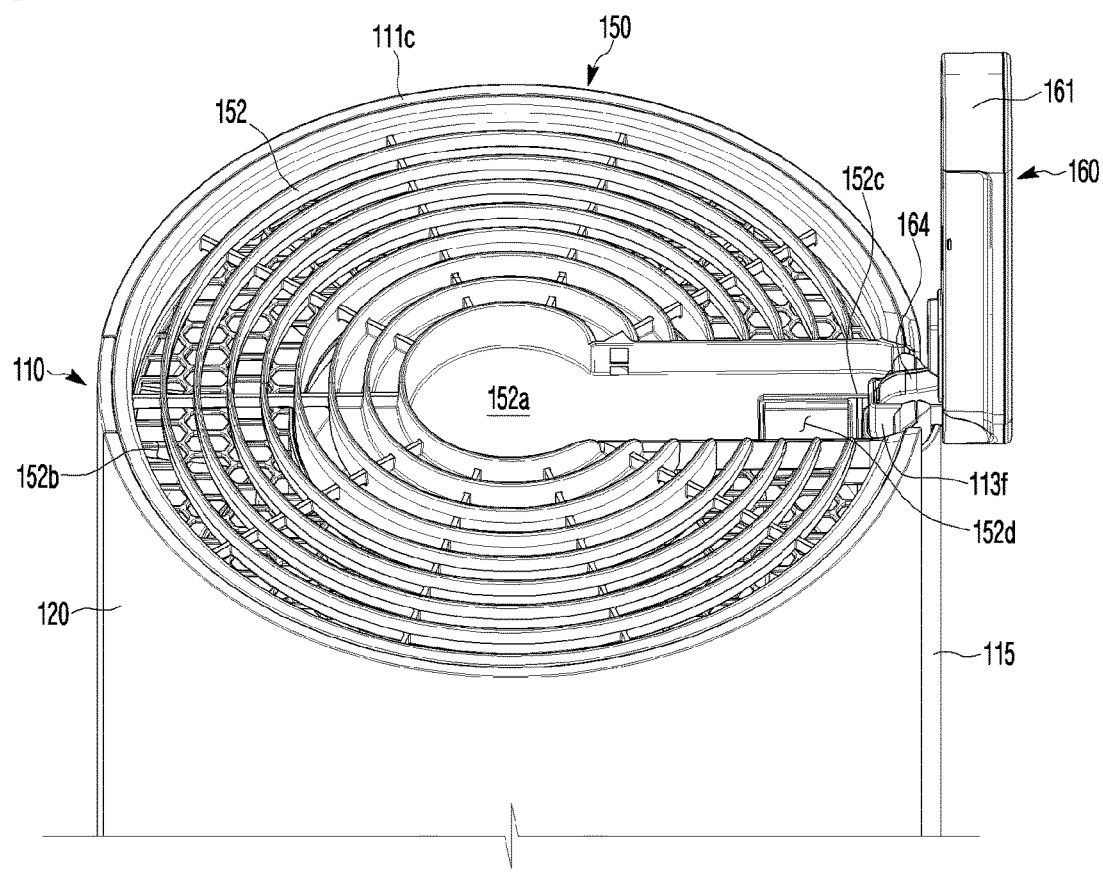

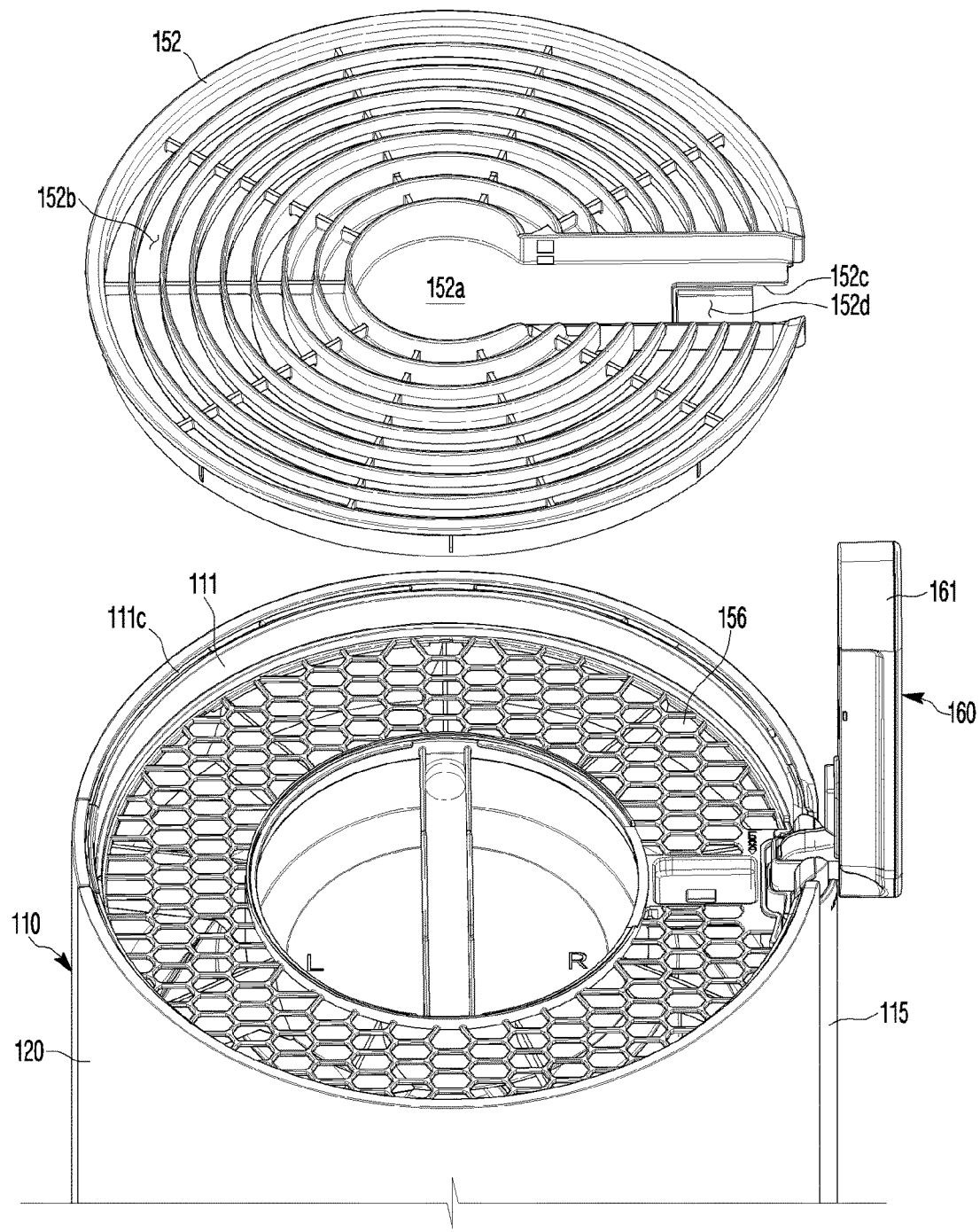
[FIG. 6]

[FIG. 7]
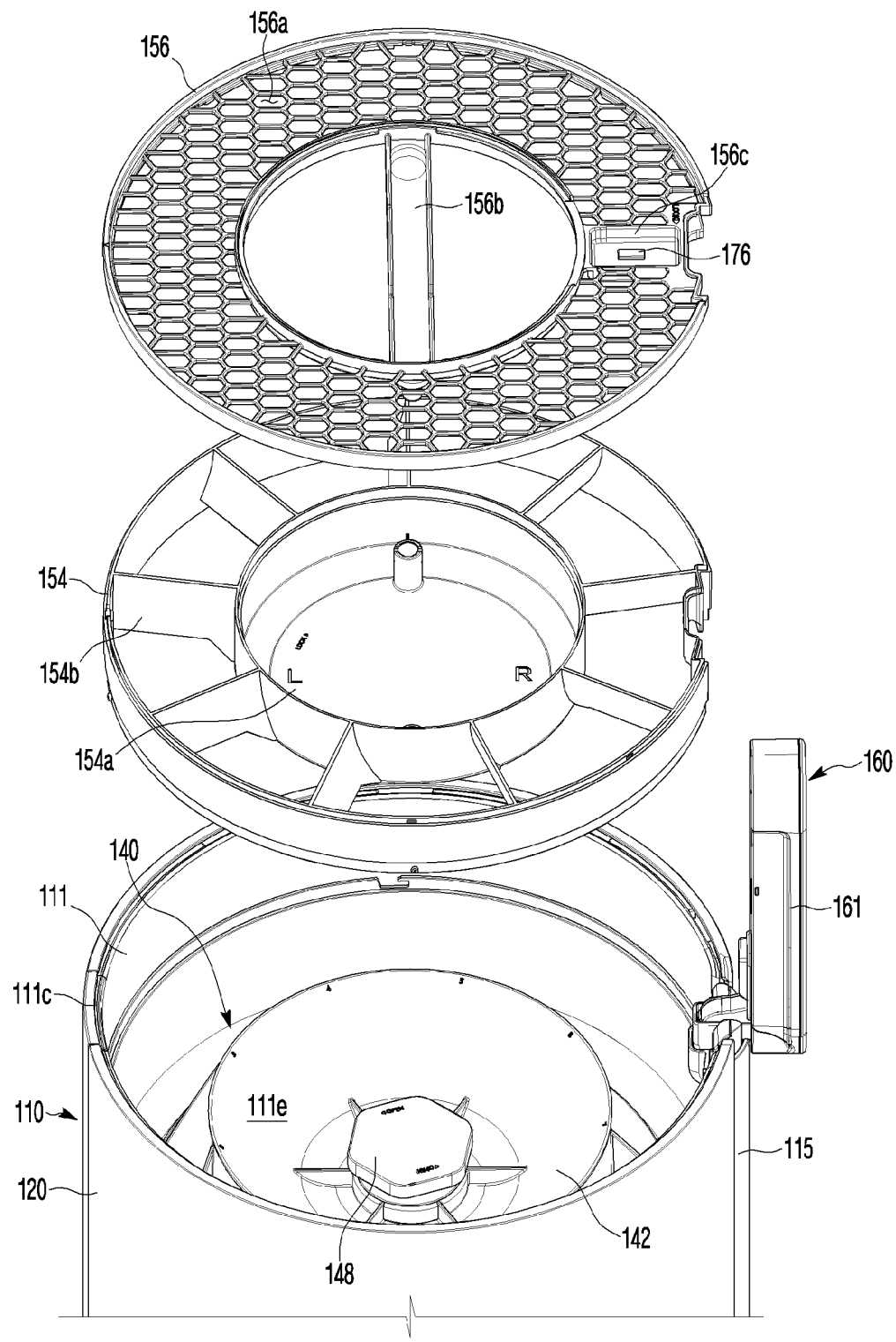

[FIG. 8]
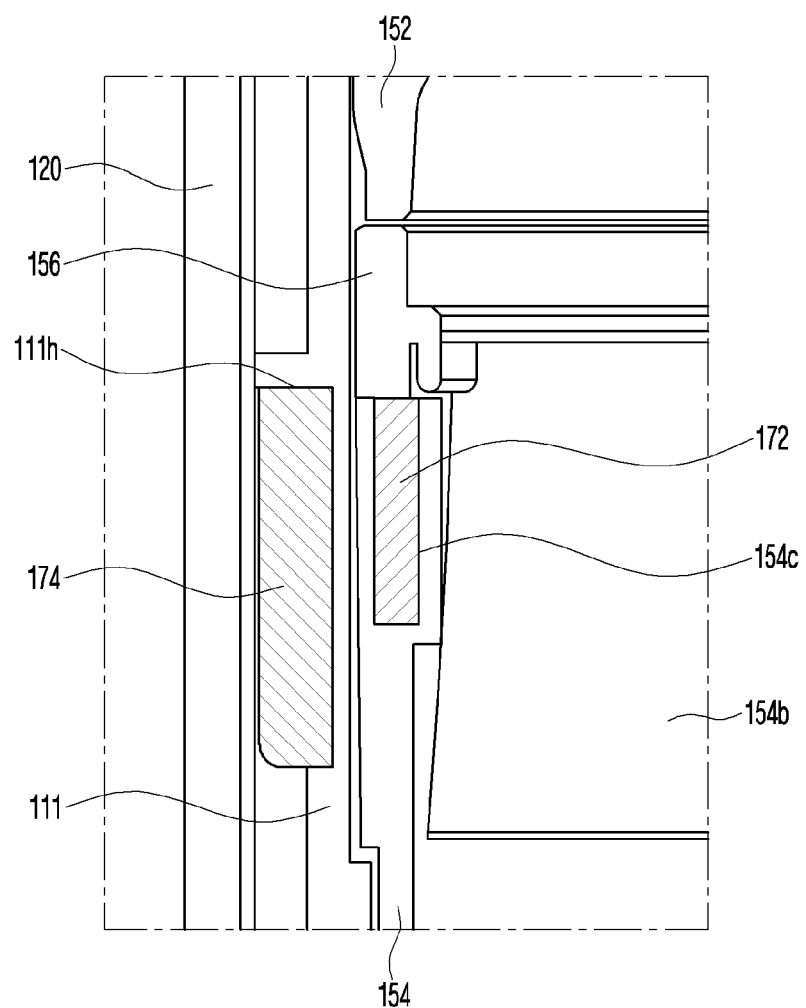

【FIG. 9】
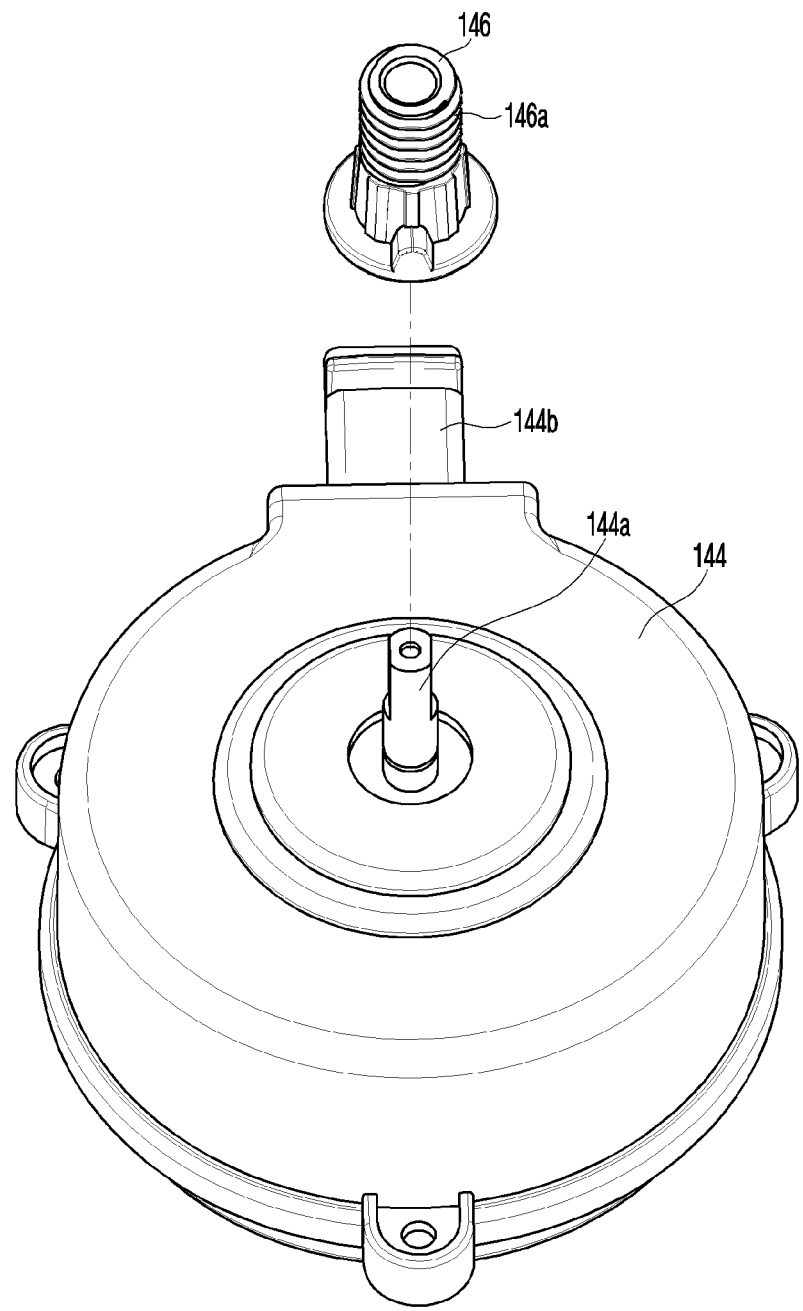

[FIG. 10]
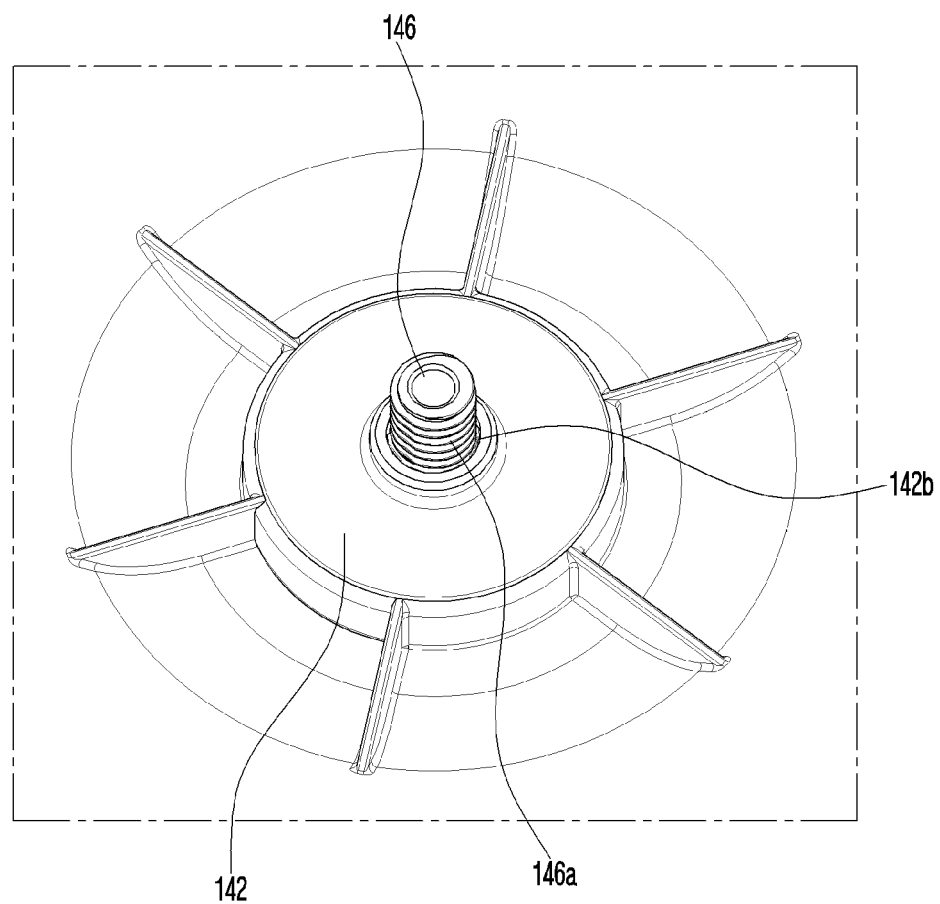

【FIG. 11】
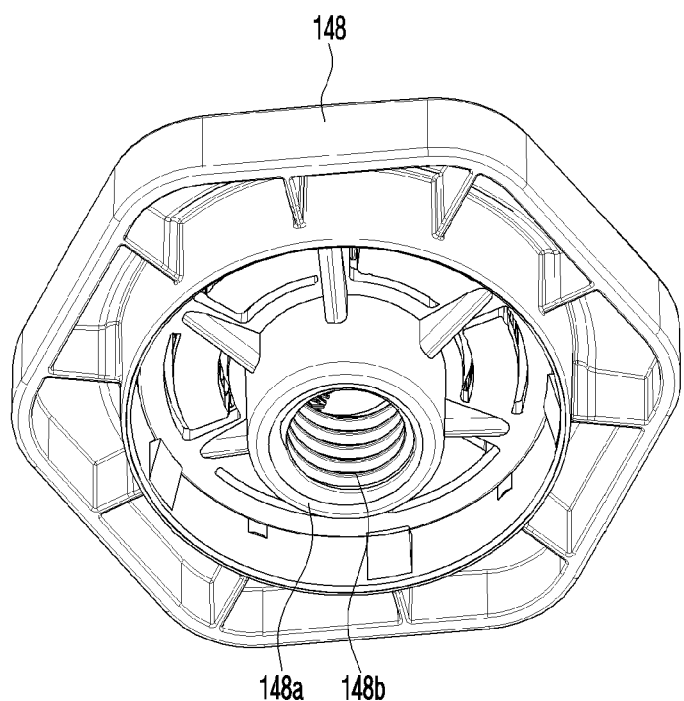

【FIG. 12】
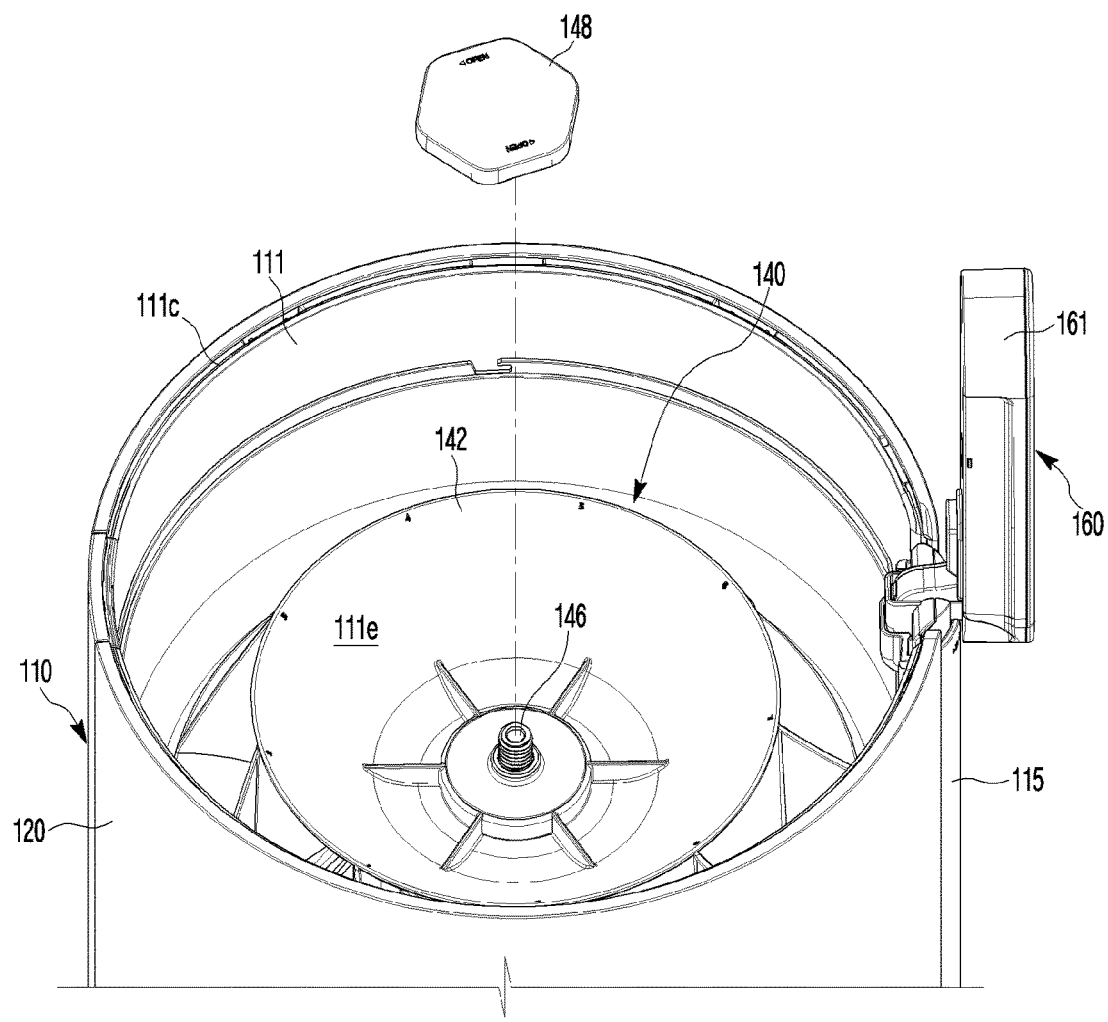

【FIG. 13】
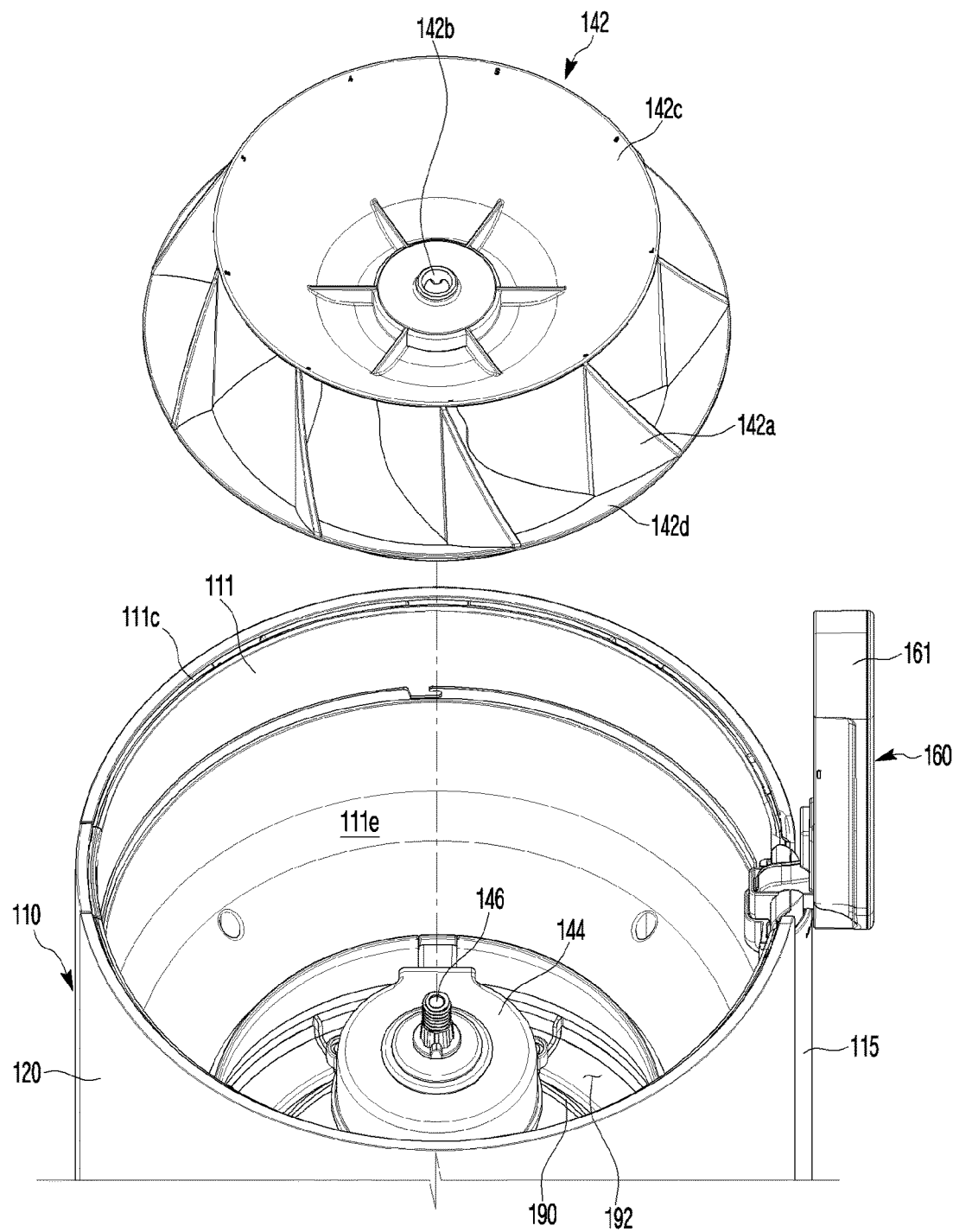

[FIG. 14]
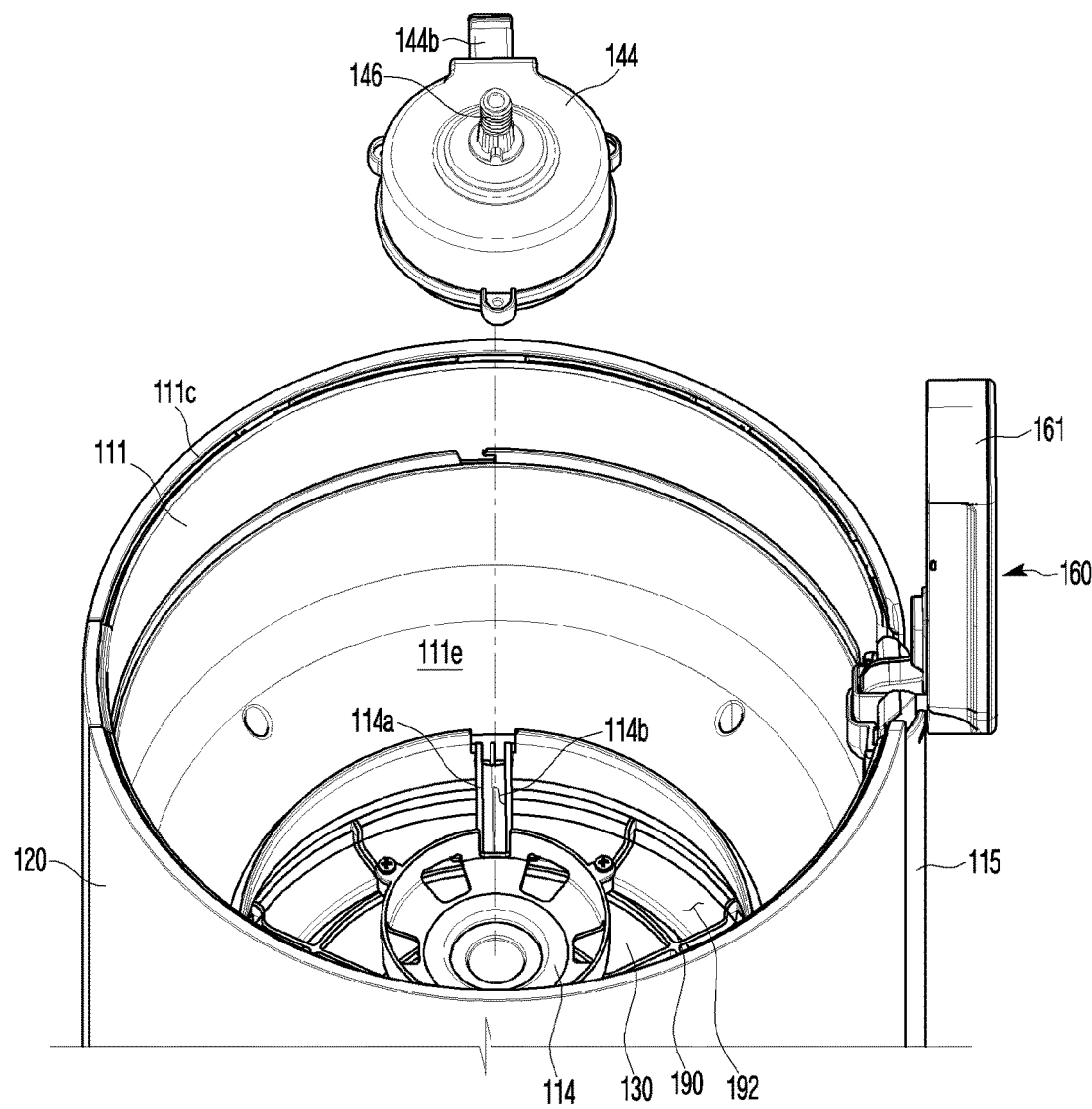

[FIG. 15]
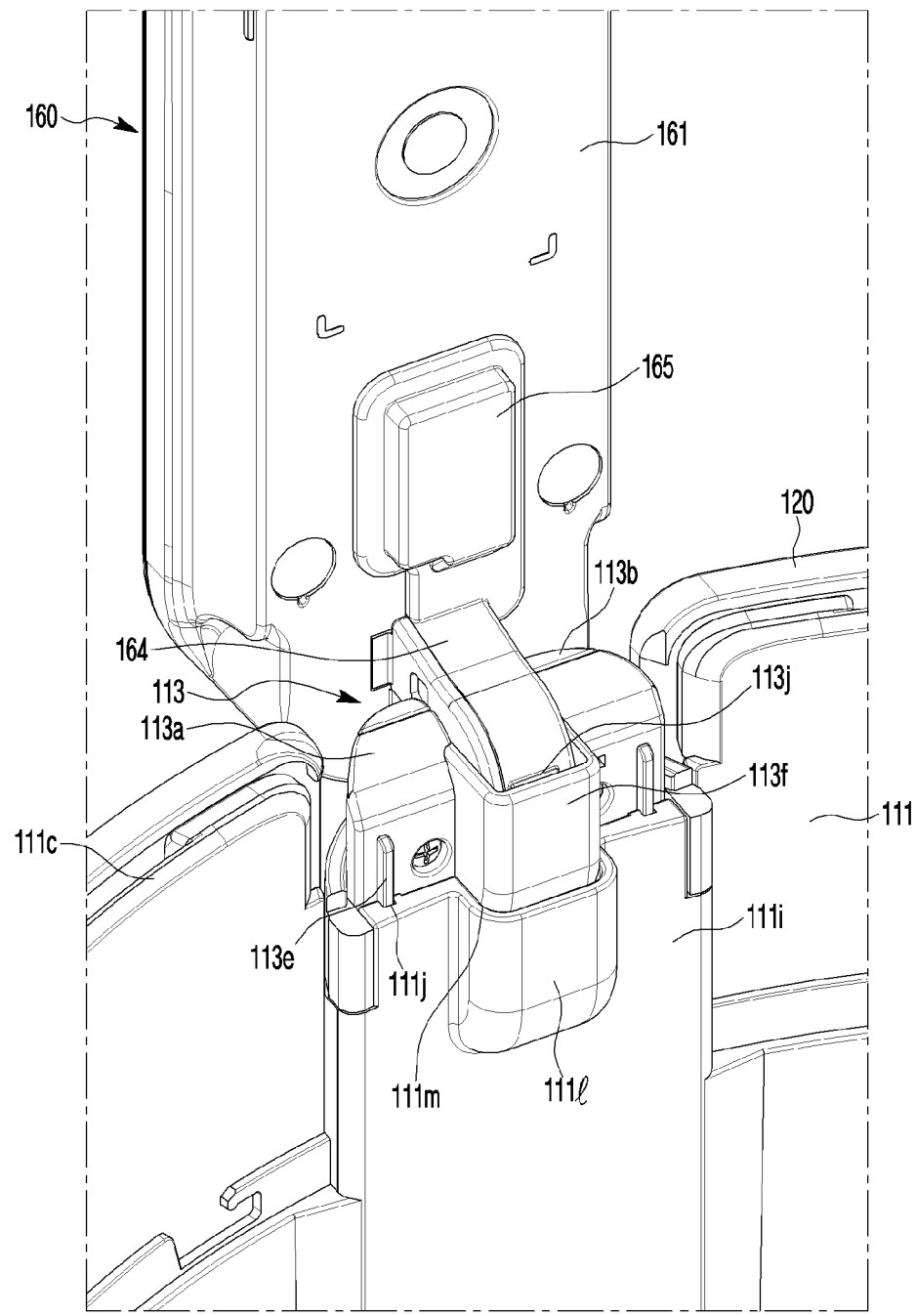

【FIG. 16】
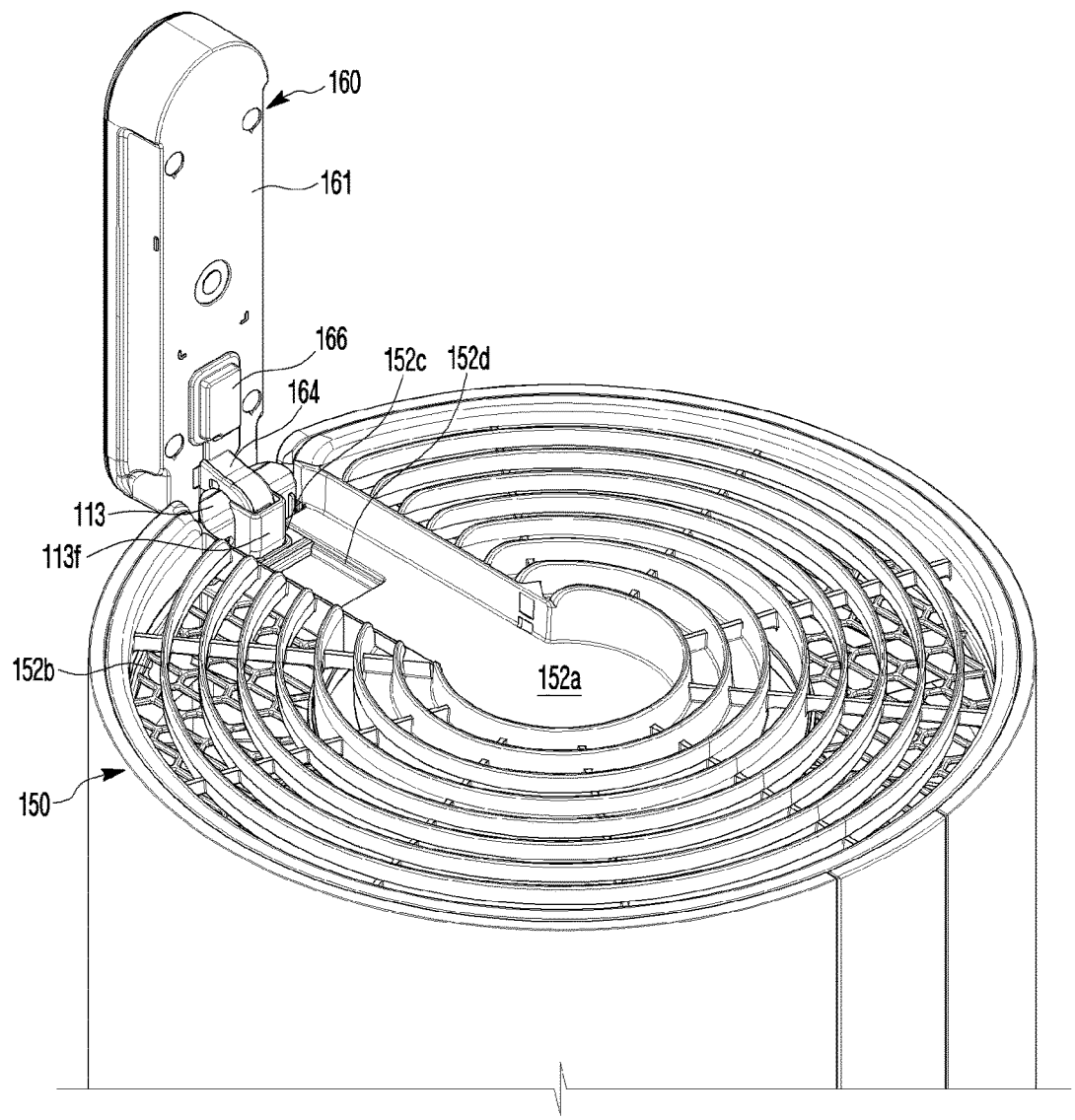

[FIG. 17]
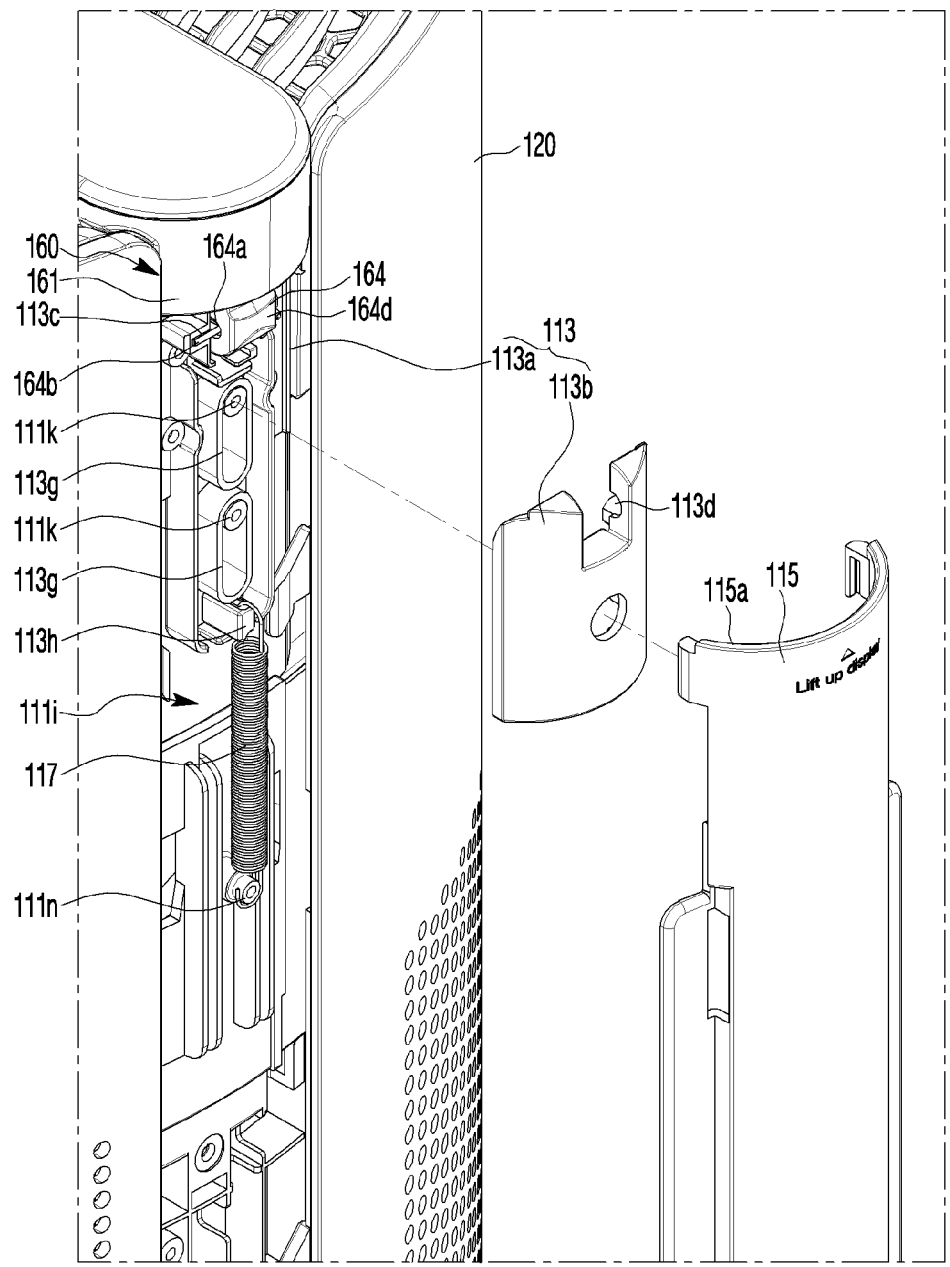

[FIG. 18]
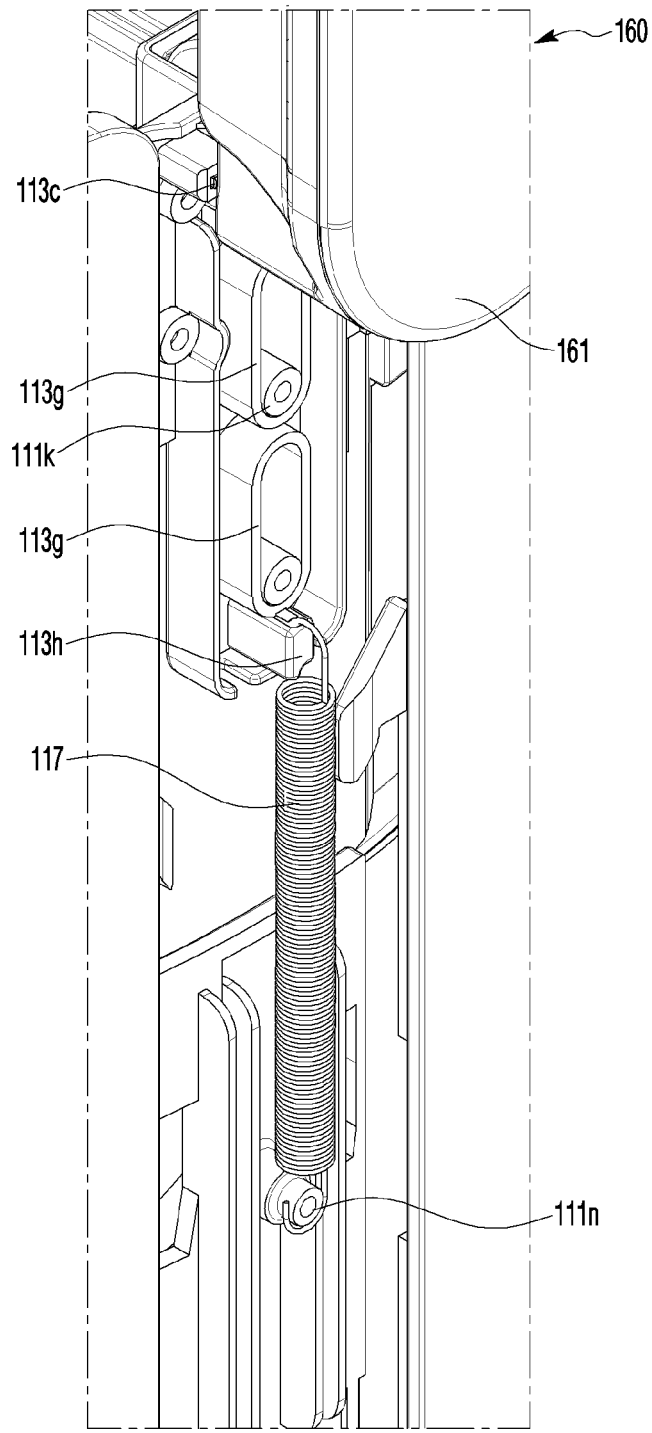

[FIG. 19]
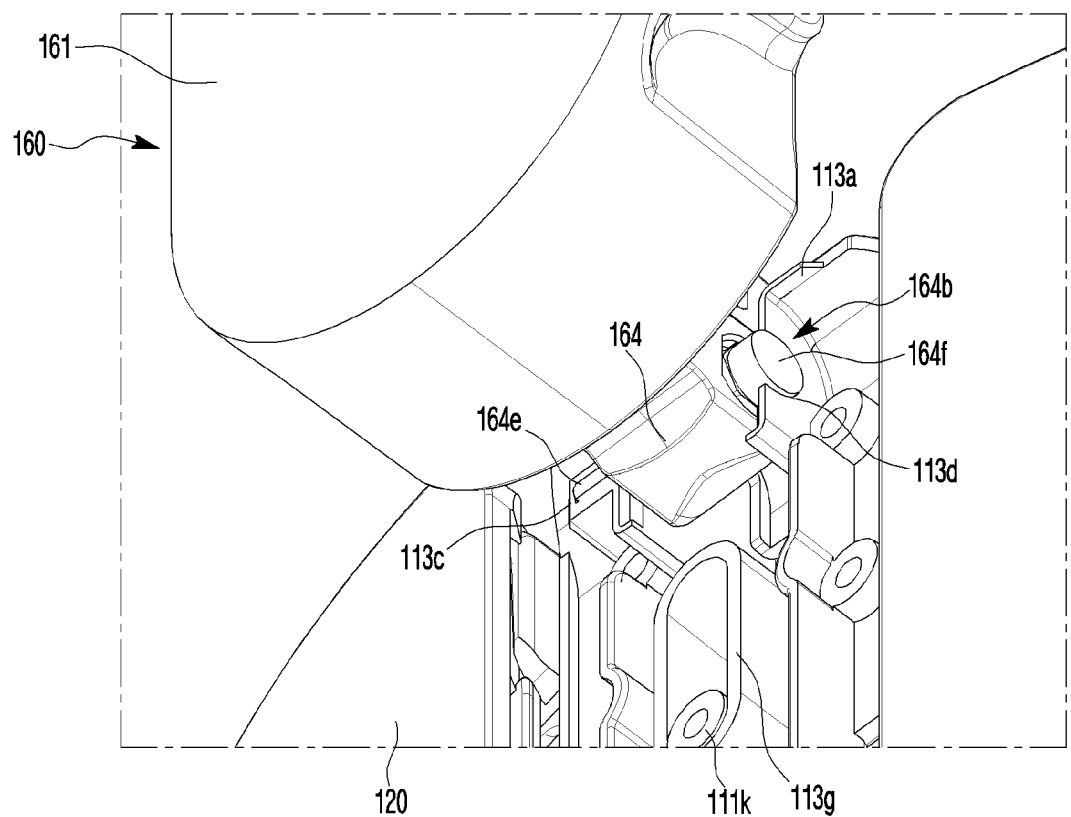

[FIG. 20]
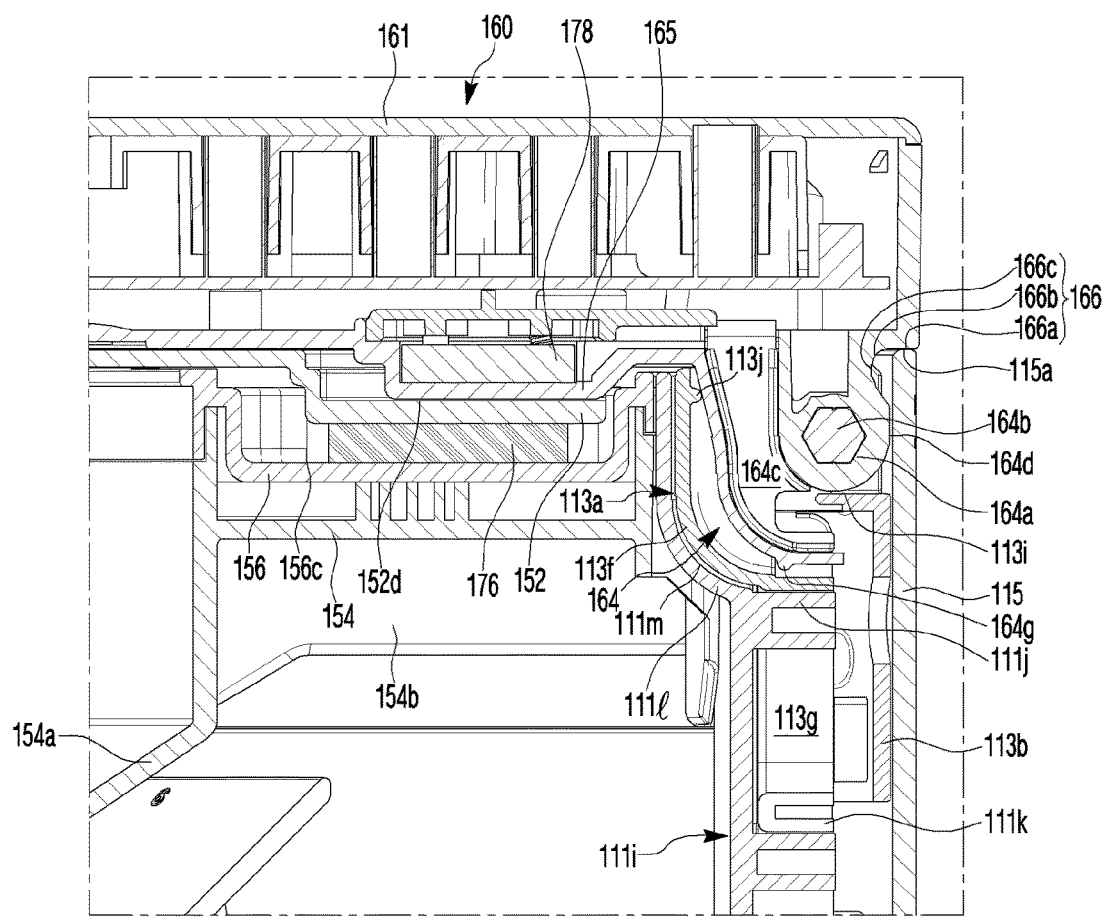

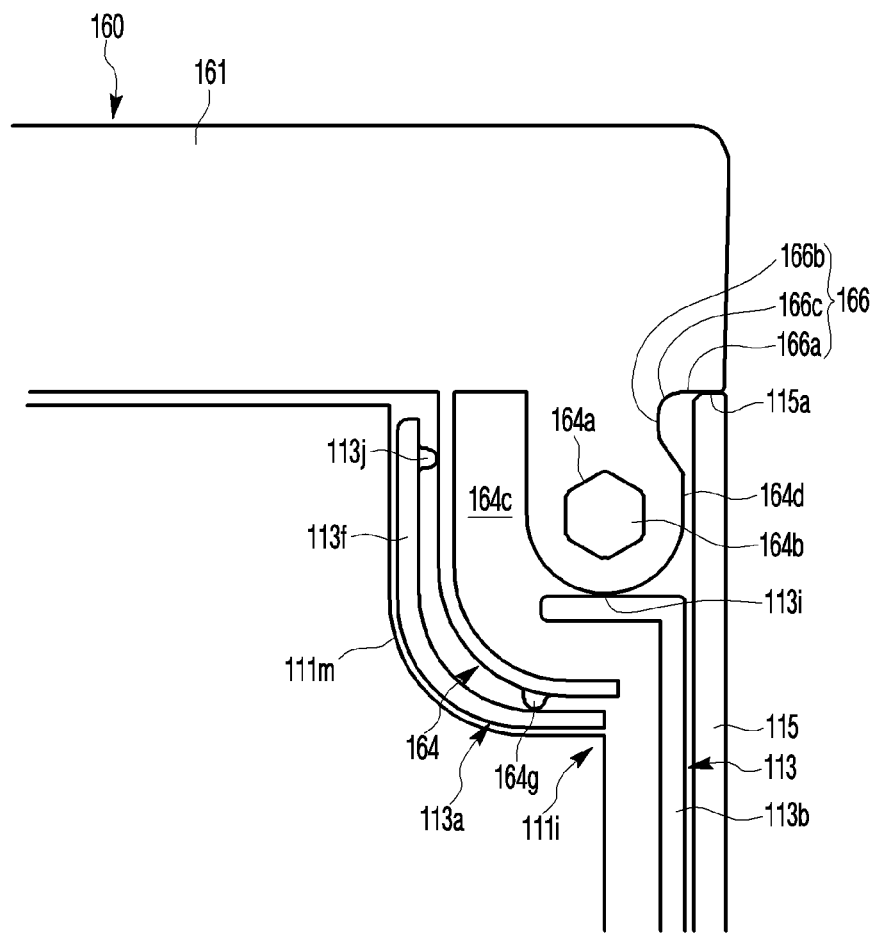
[FIG. 21]

[FIG. 22]
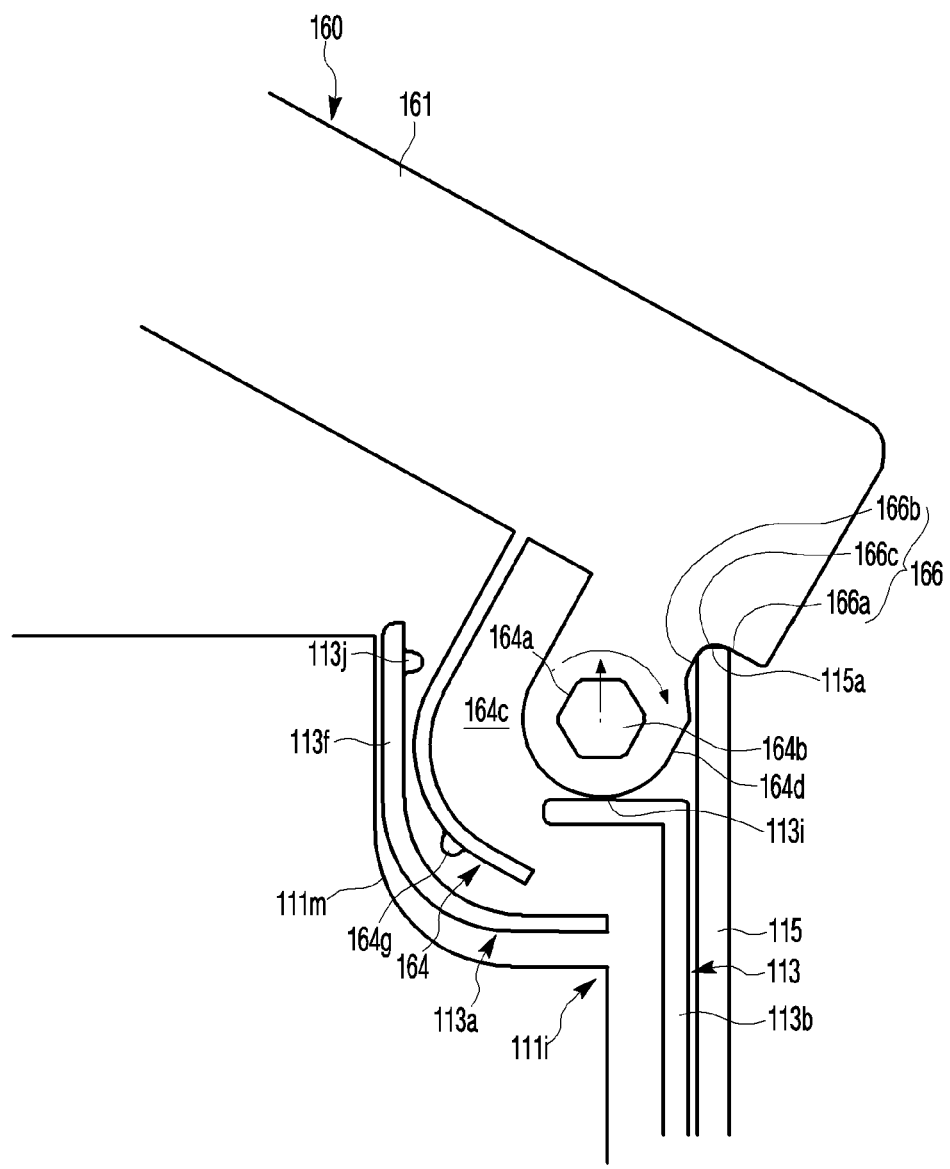

[FIG. 23]
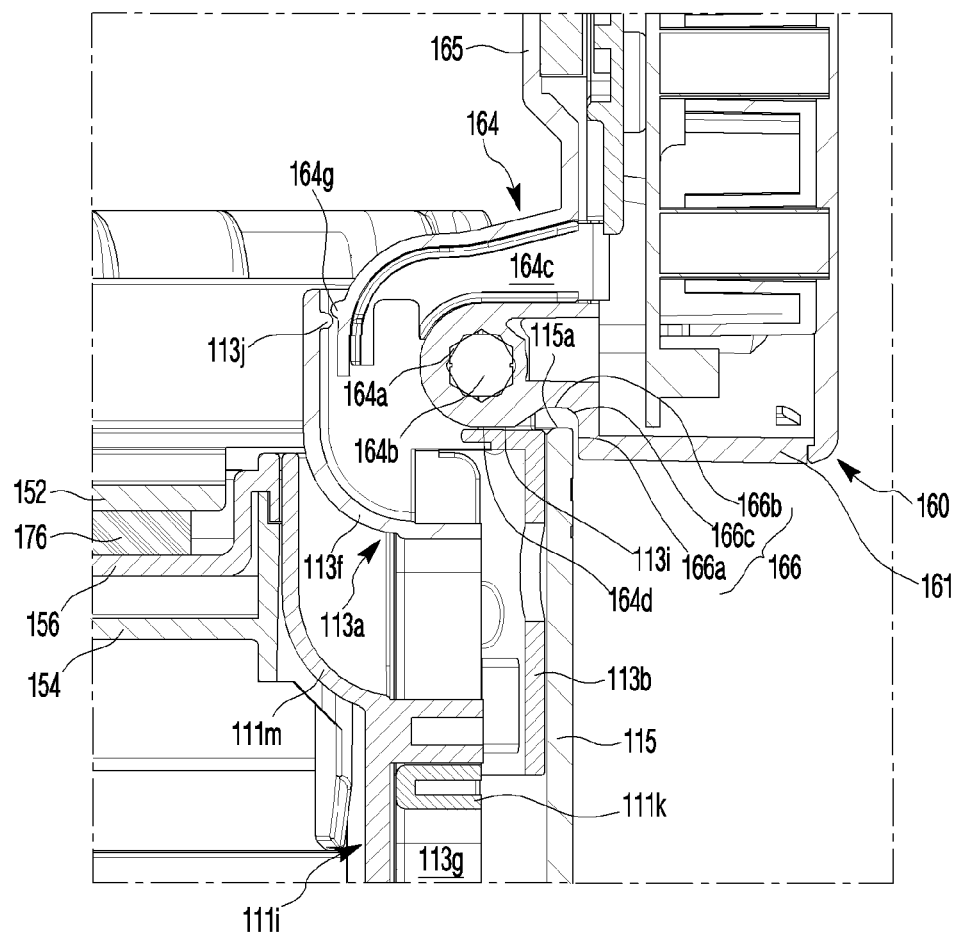

[FIG. 24]
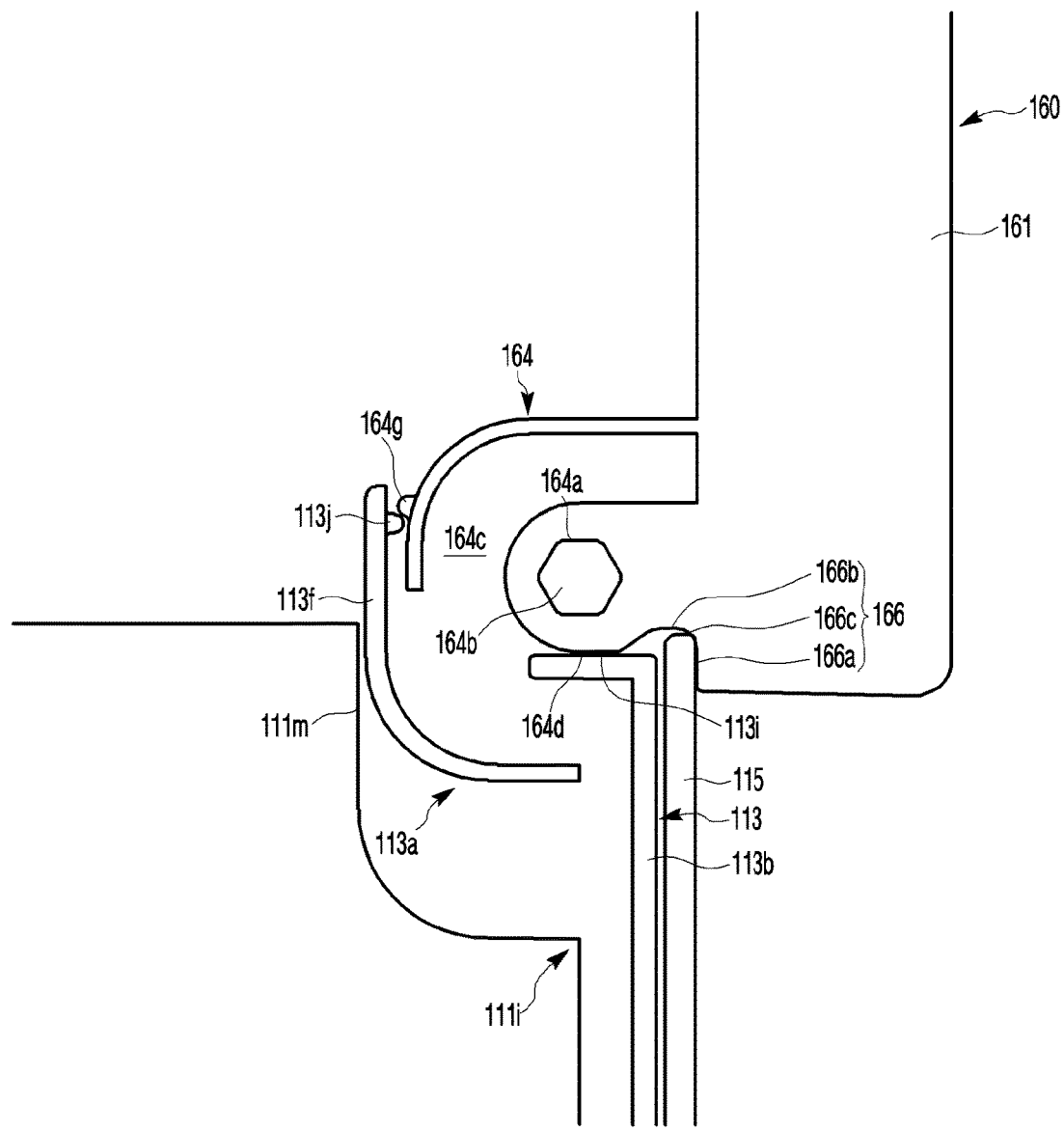

【FIG. 25】
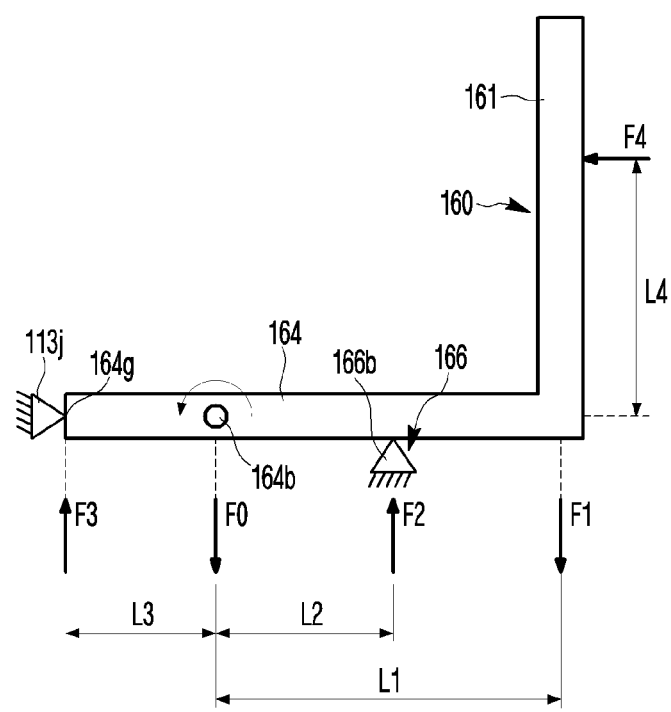

[FIG. 26]
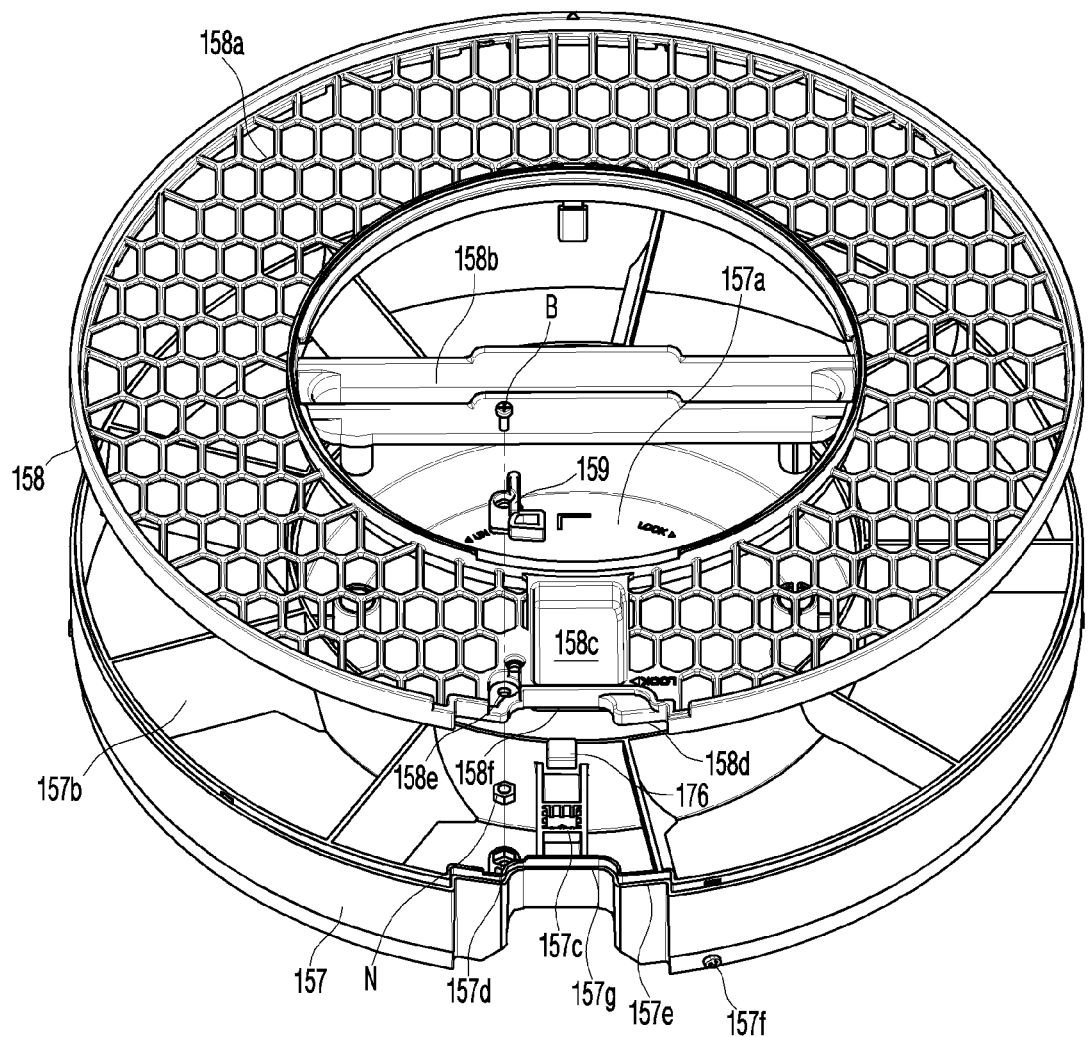

[FIG. 27]
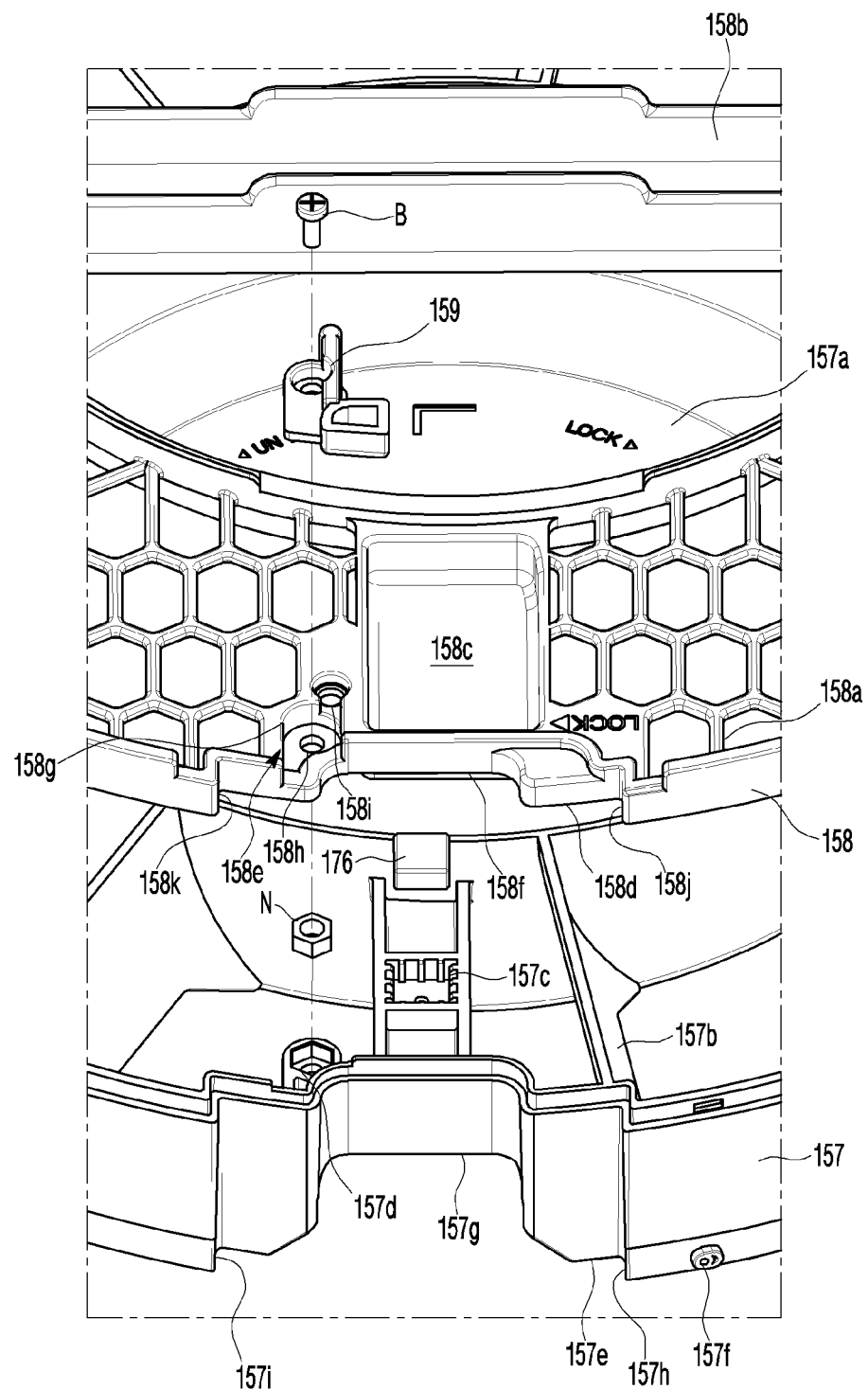

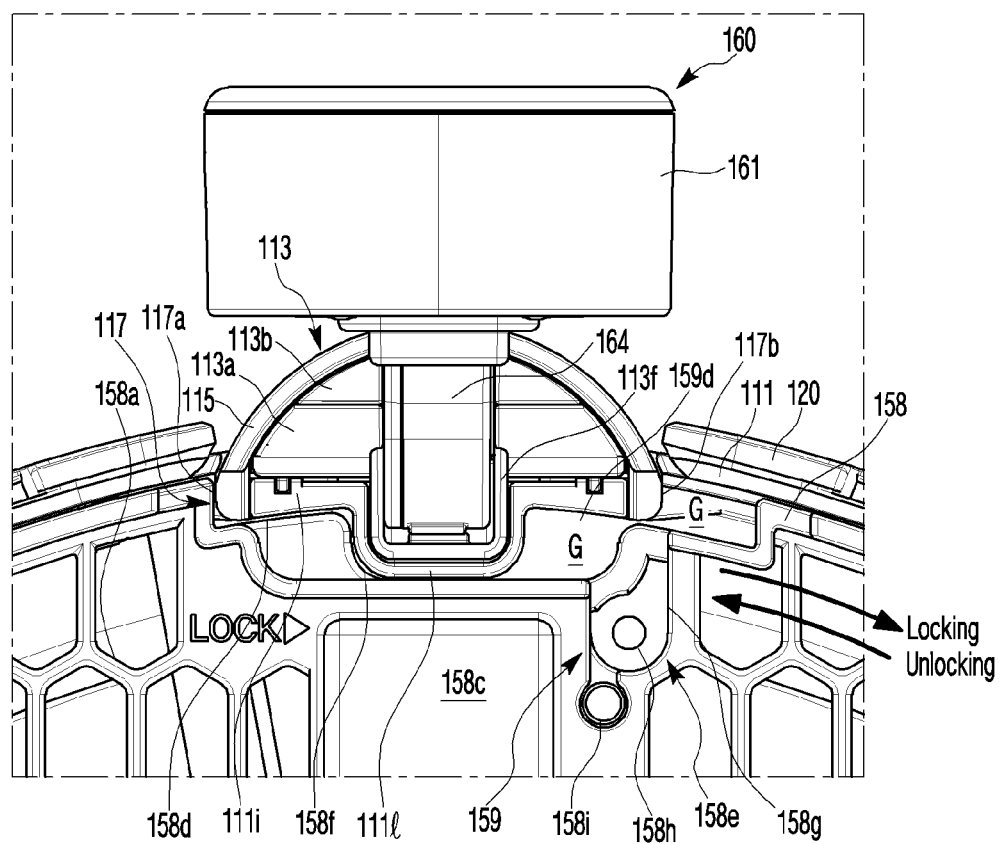
[FIG. 28]

[FIG. 29]
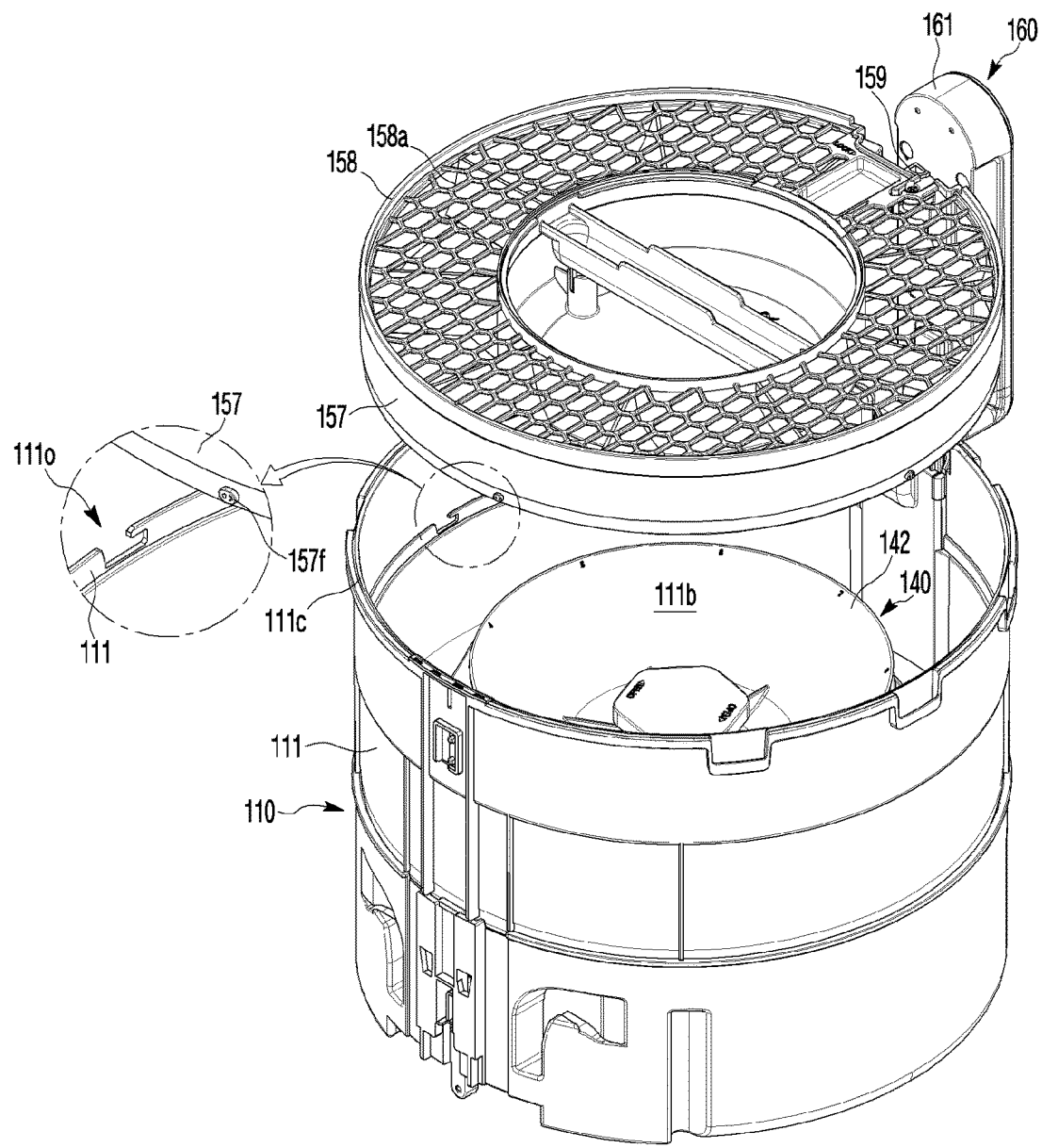

[FIG. 30]
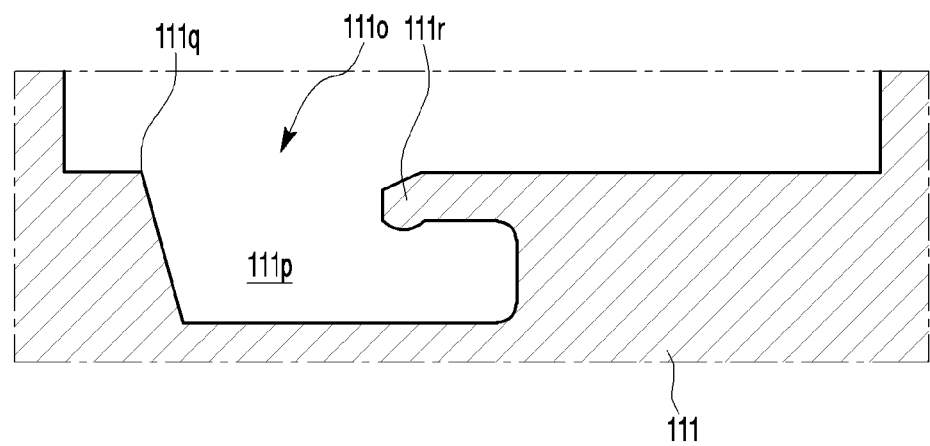

[FIG. 31]
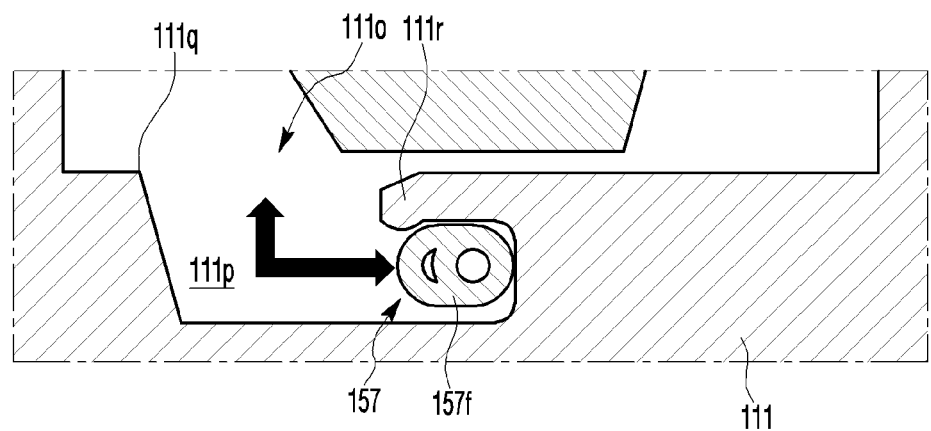

[FIG. 32]
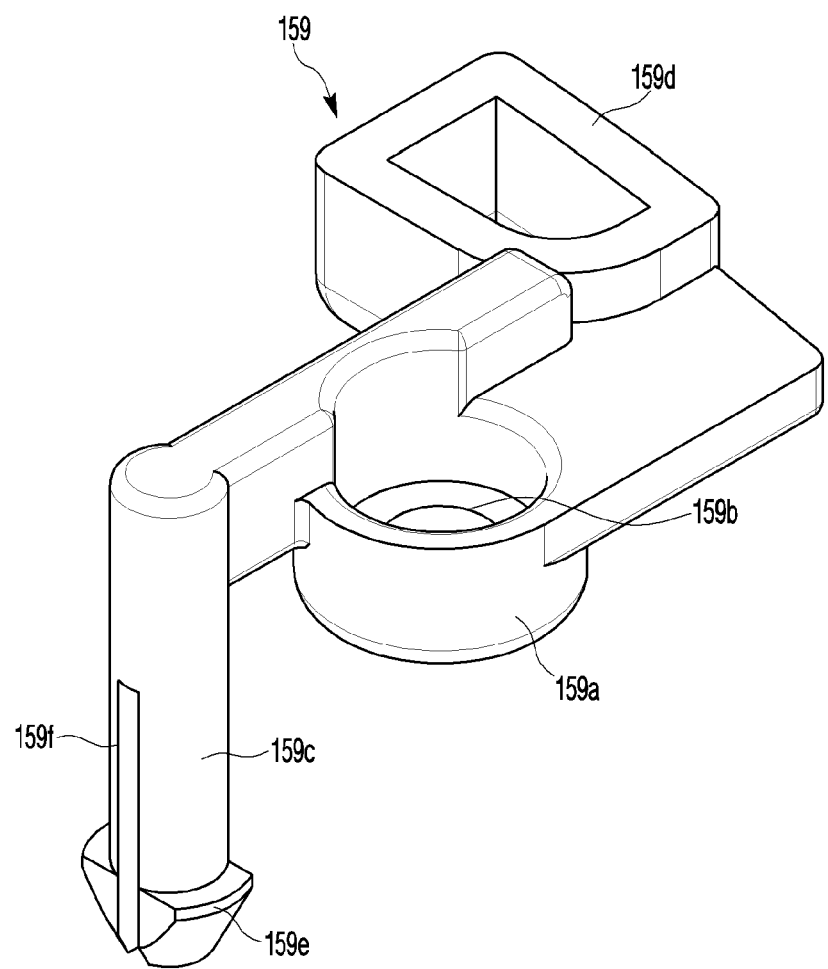

【FIG. 33】
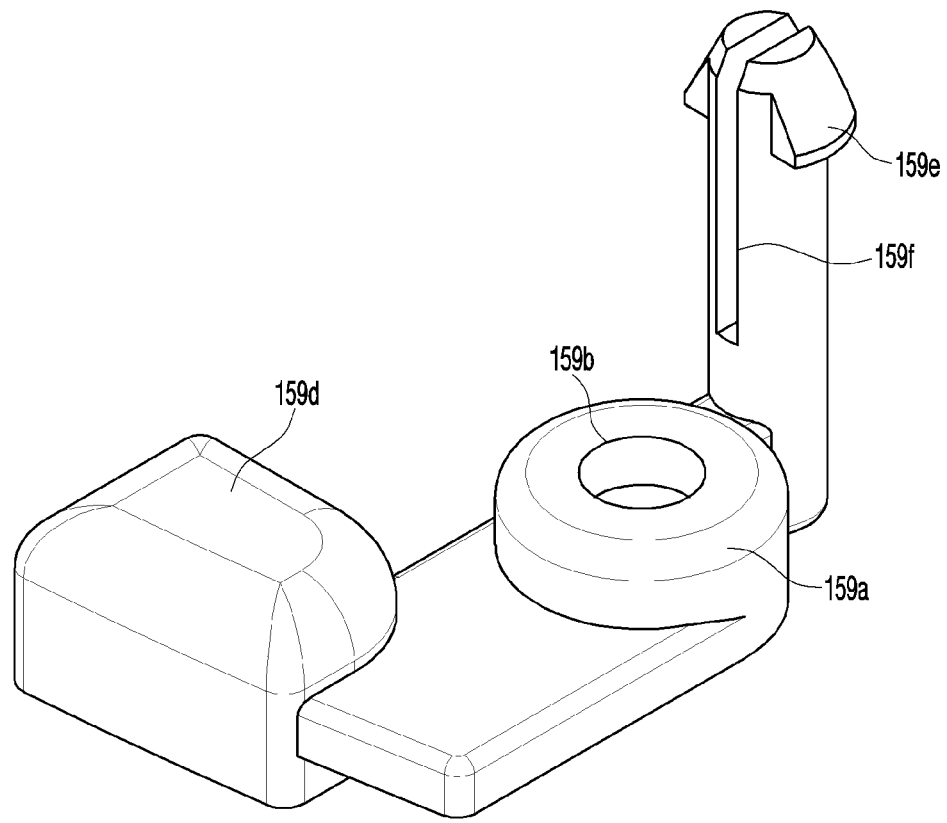

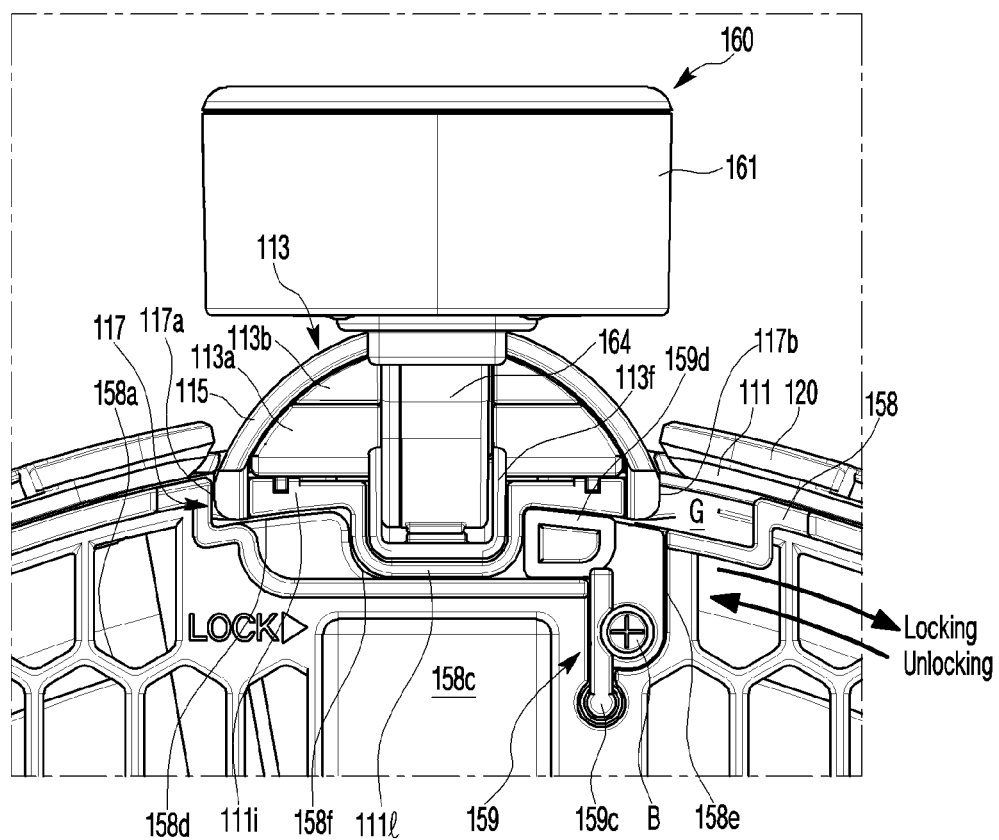
[FIG. 34]

[FIG. 35]
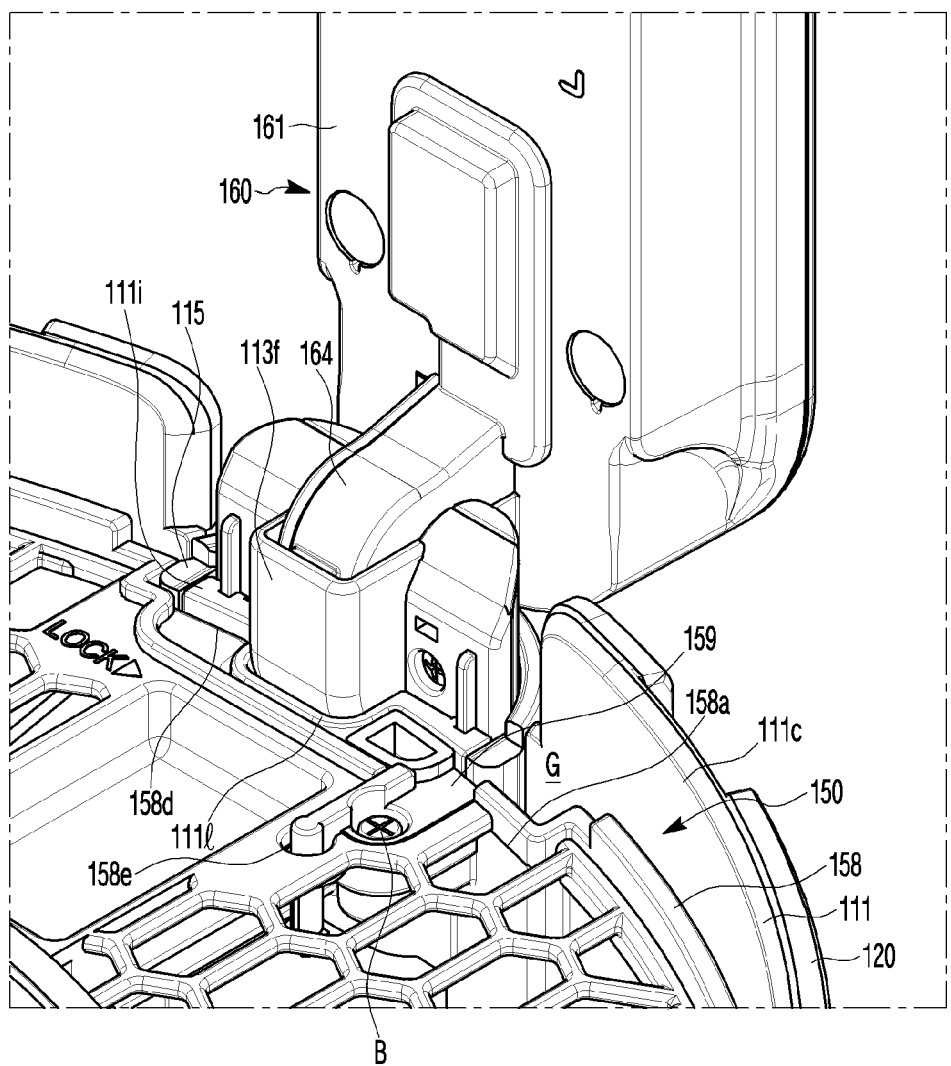

[FIG. 36]
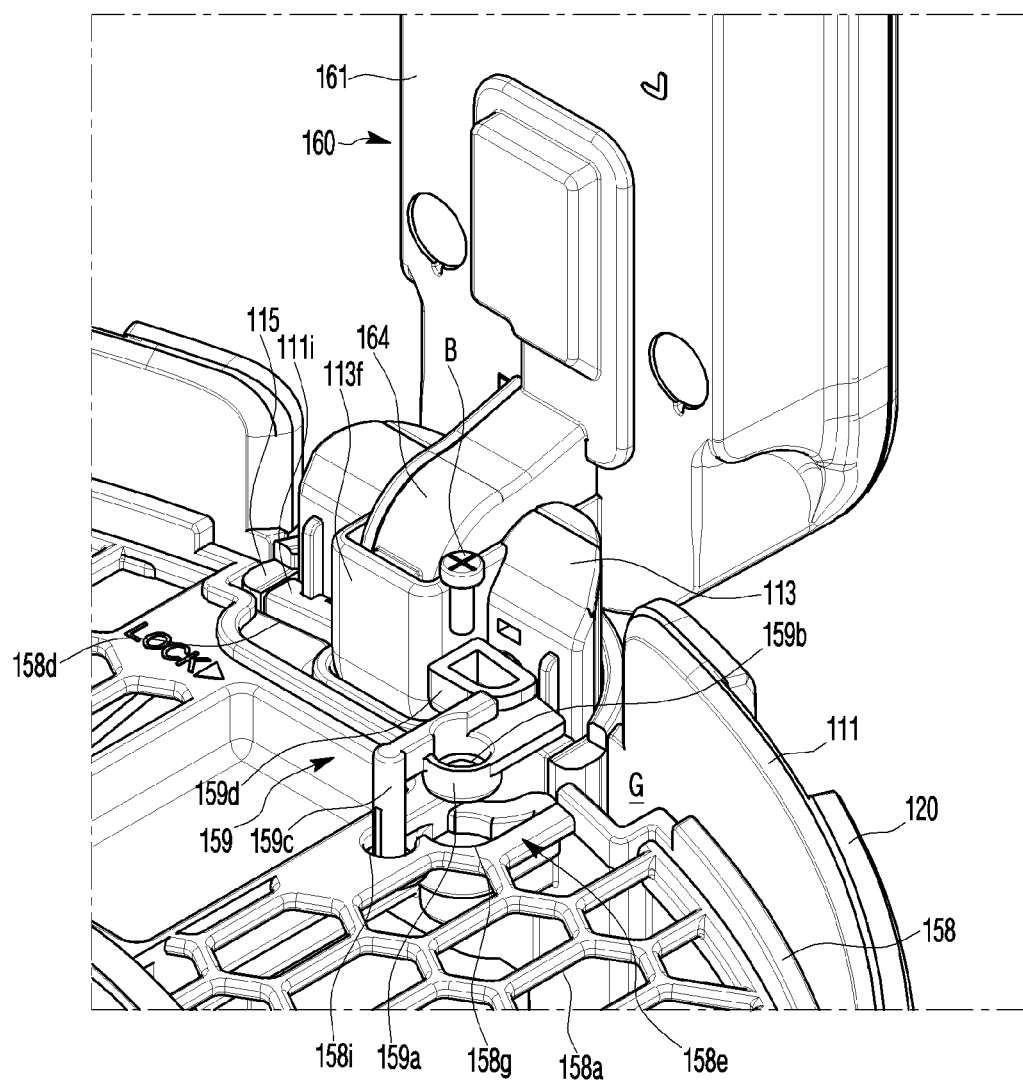

[FIG. 37]
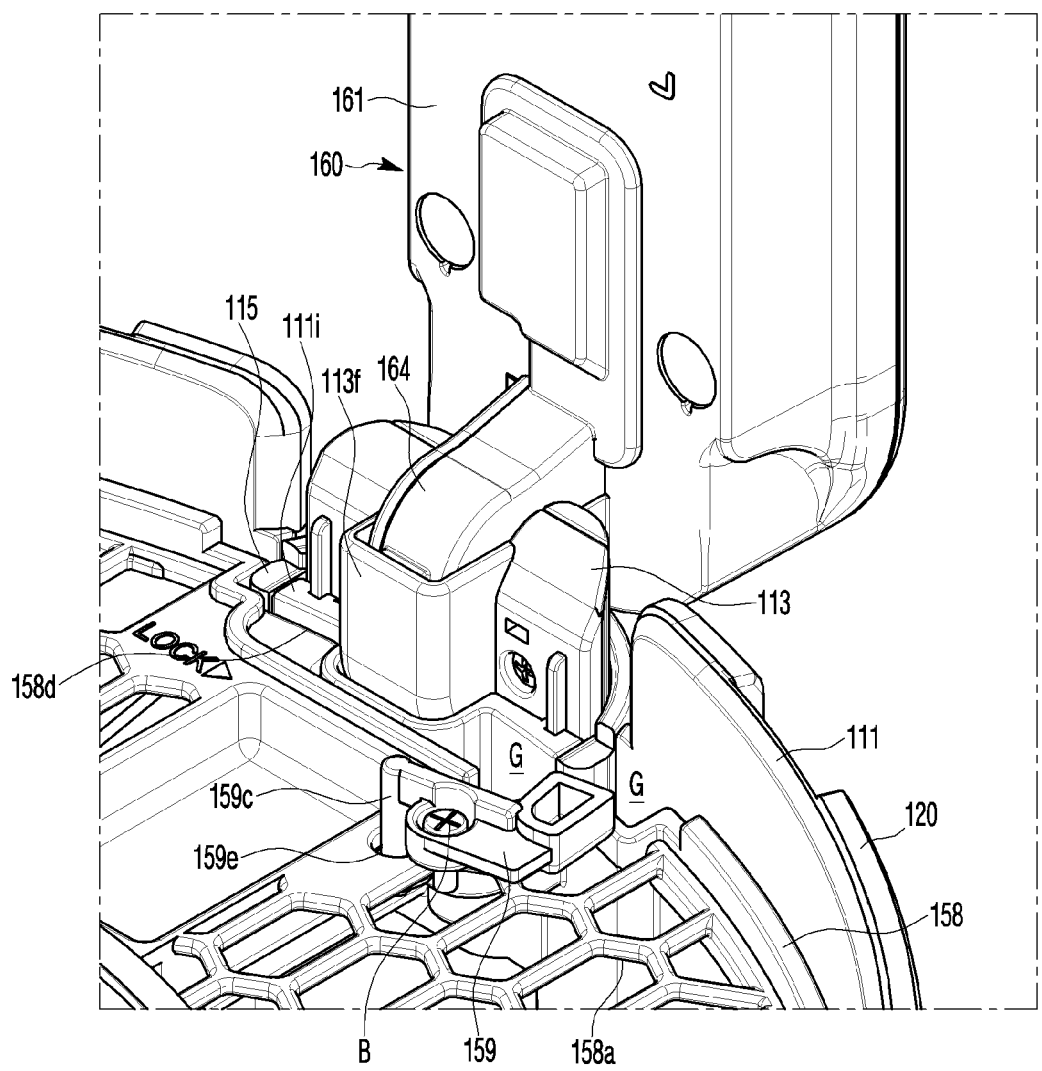

[FIG. 38]
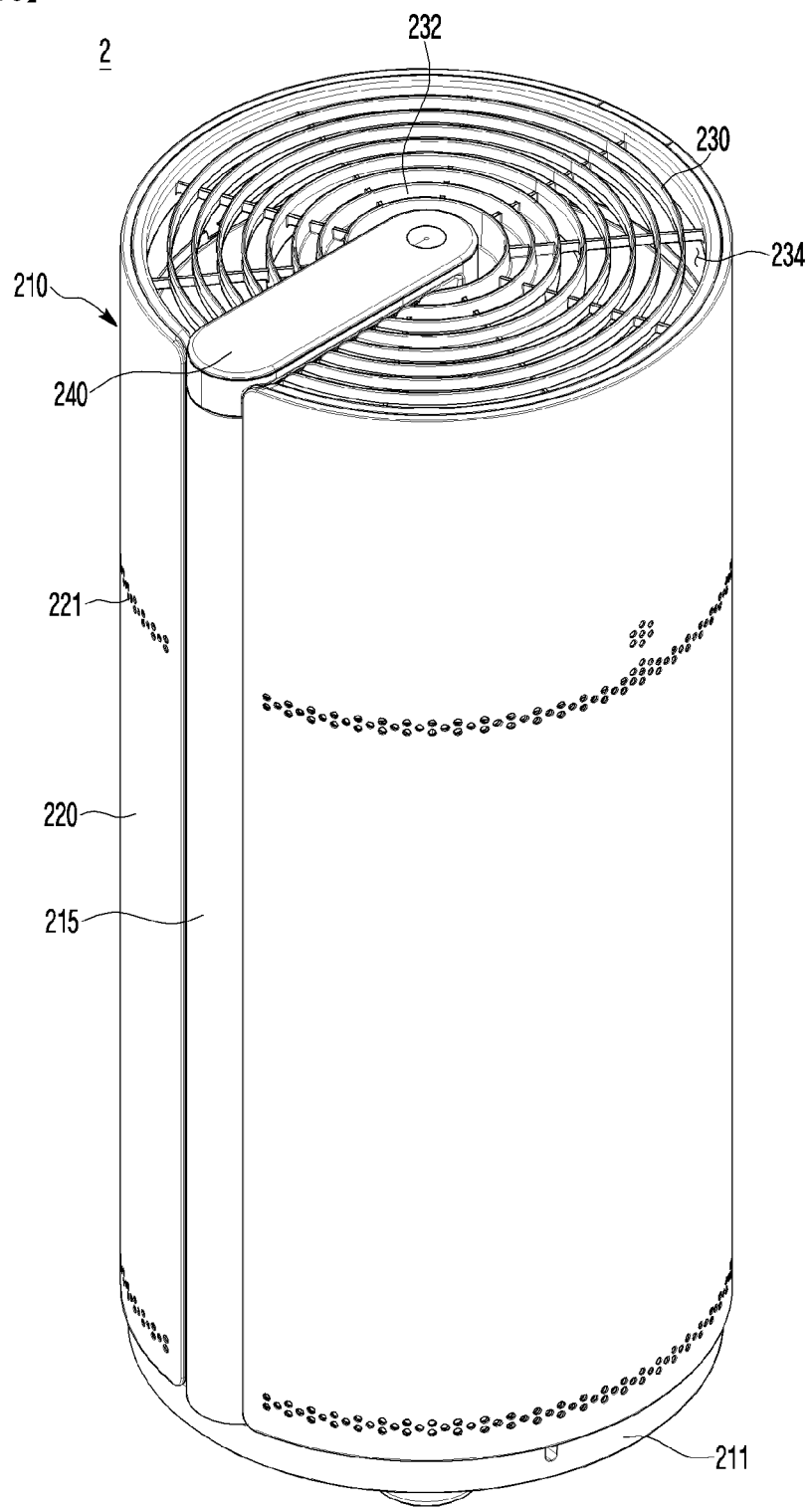

[FIG. 39]
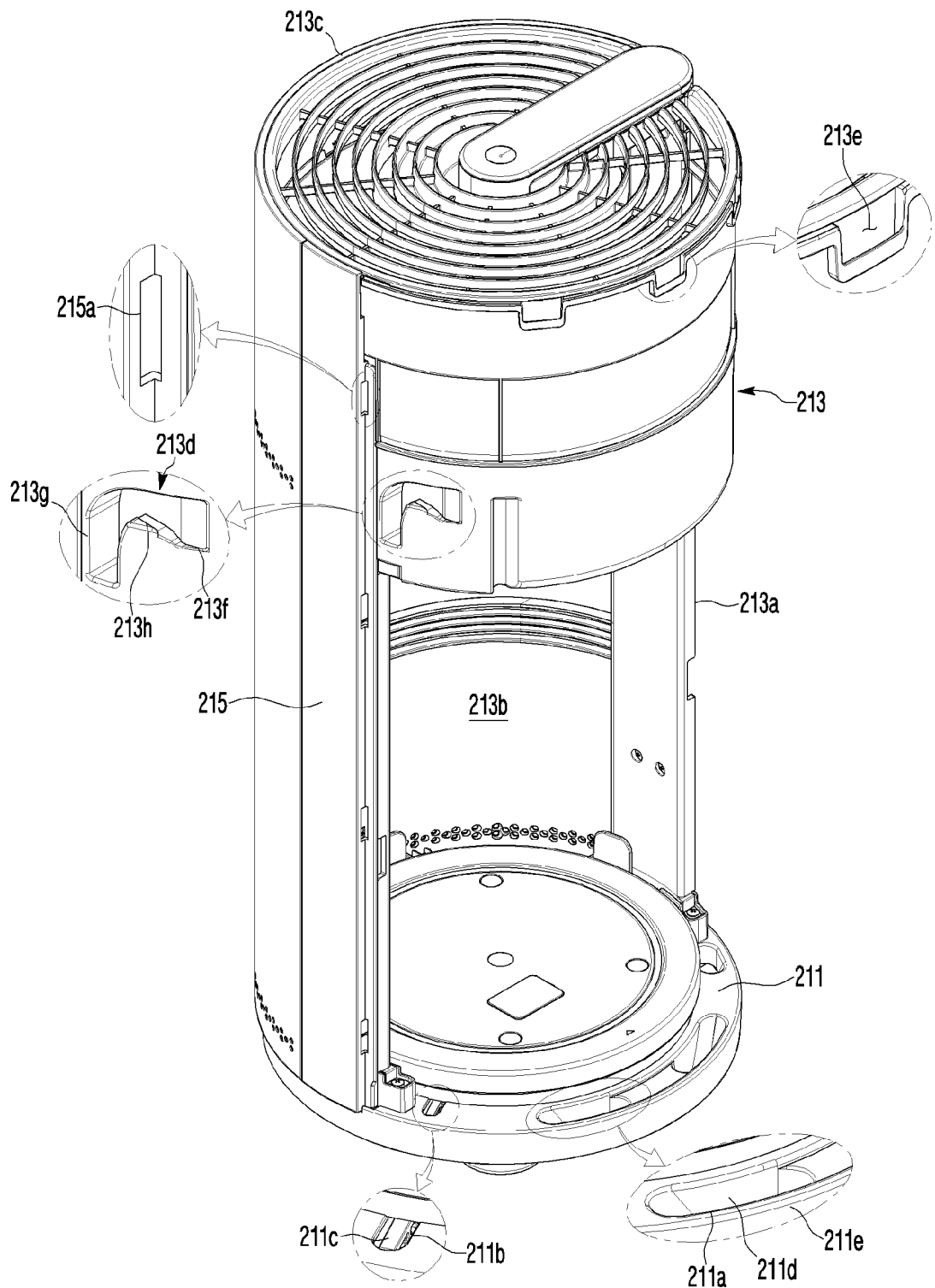

[FIG. 40]
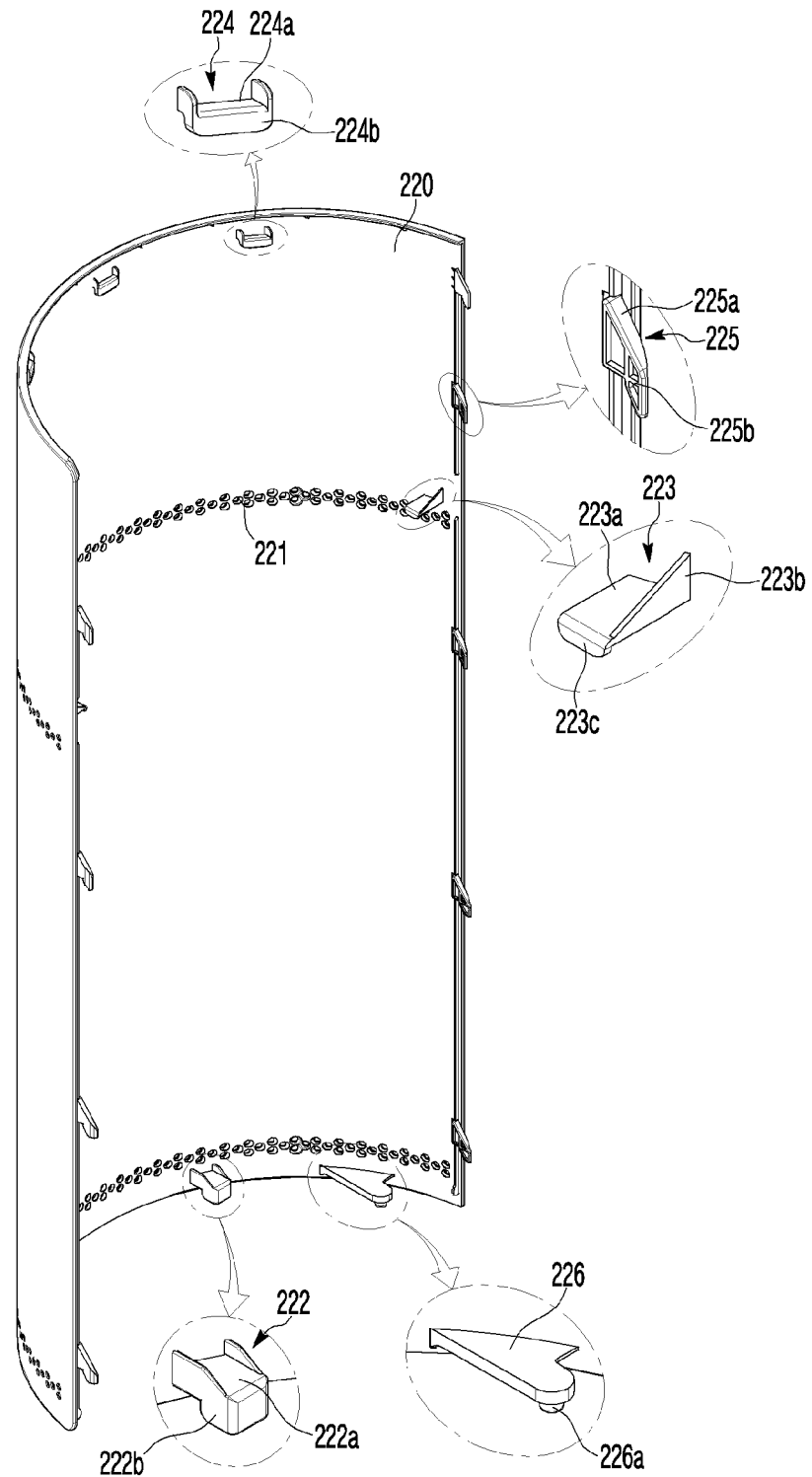

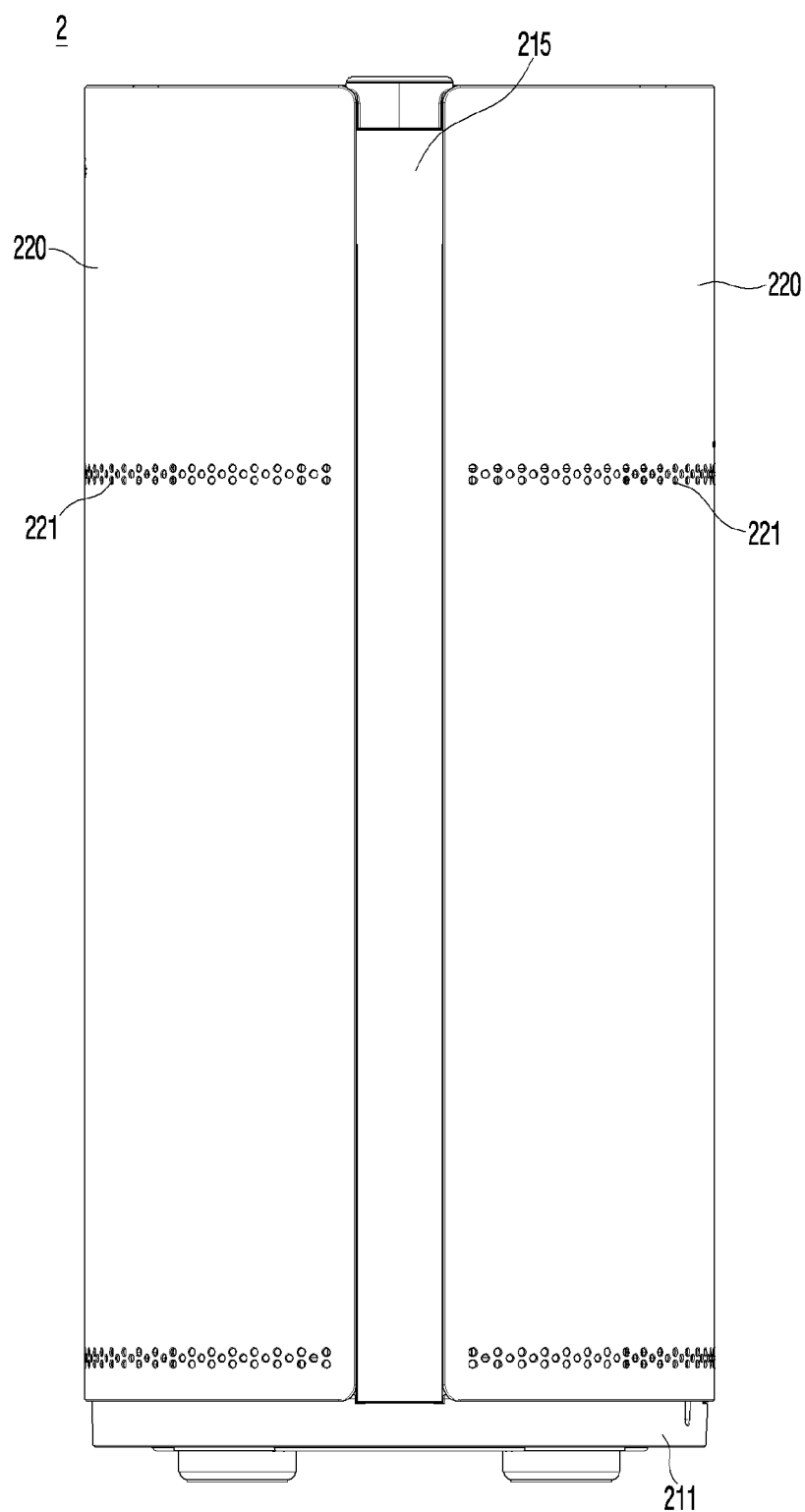
[FIG. 41]

【FIG. 42】
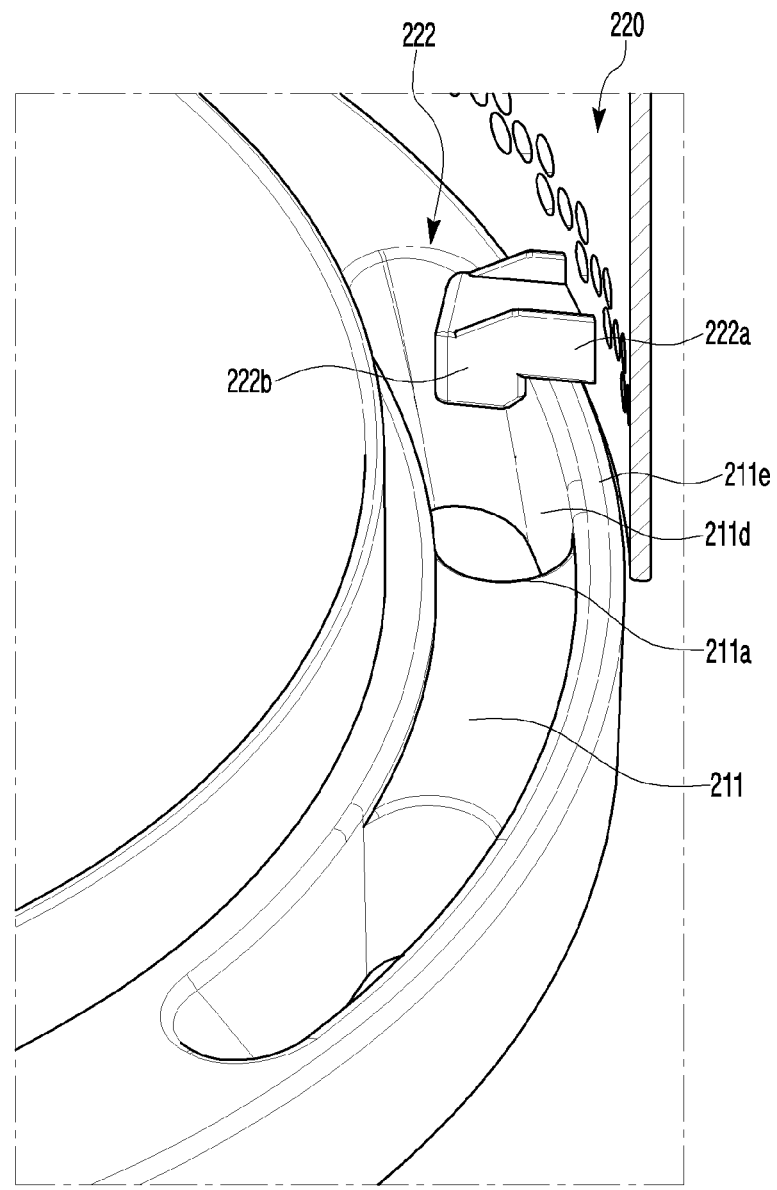

[FIG. 43]
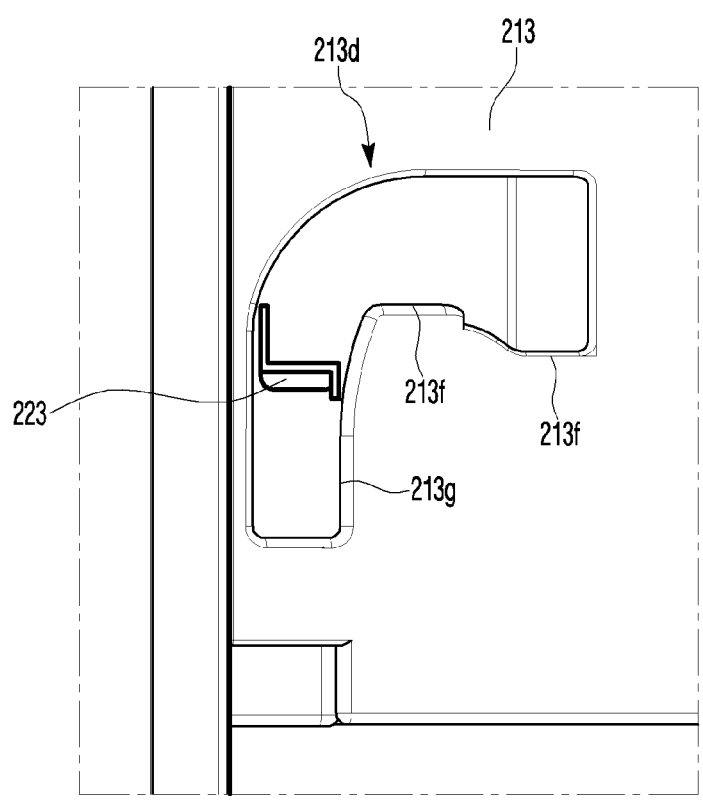

[FIG. 44]
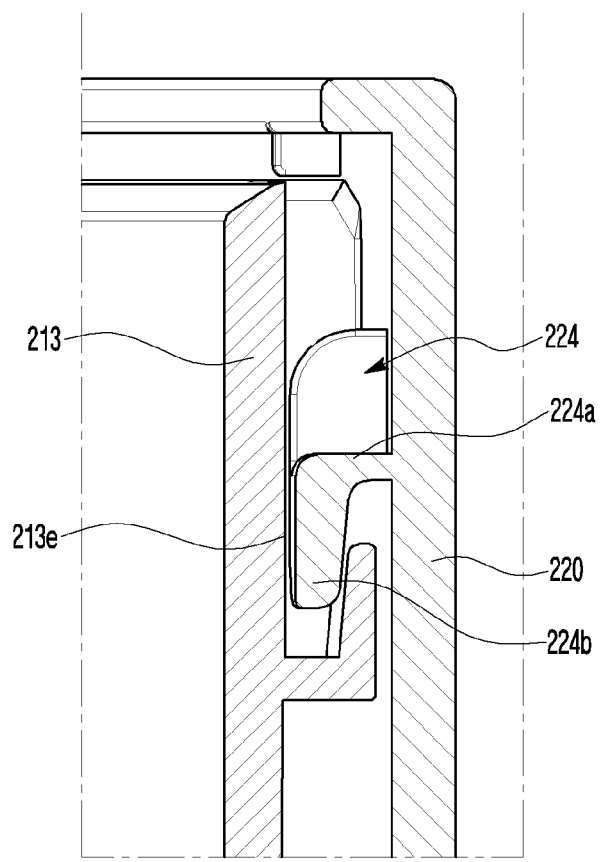

[FIG. 45]
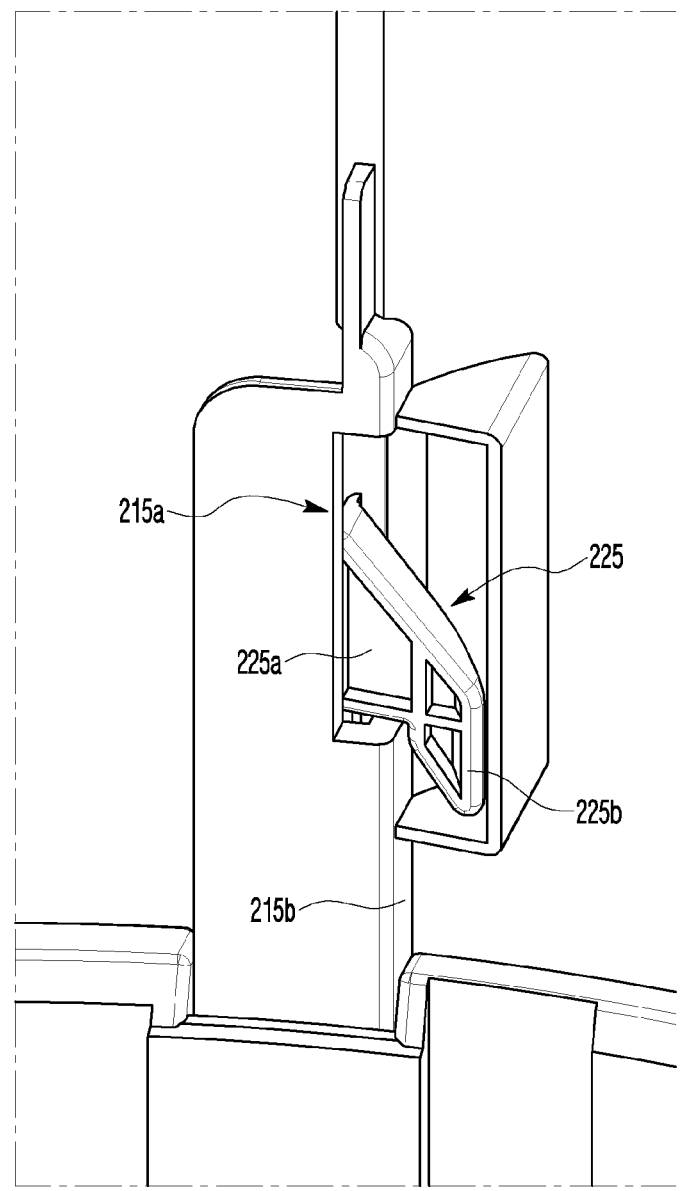

[FIG. 46]
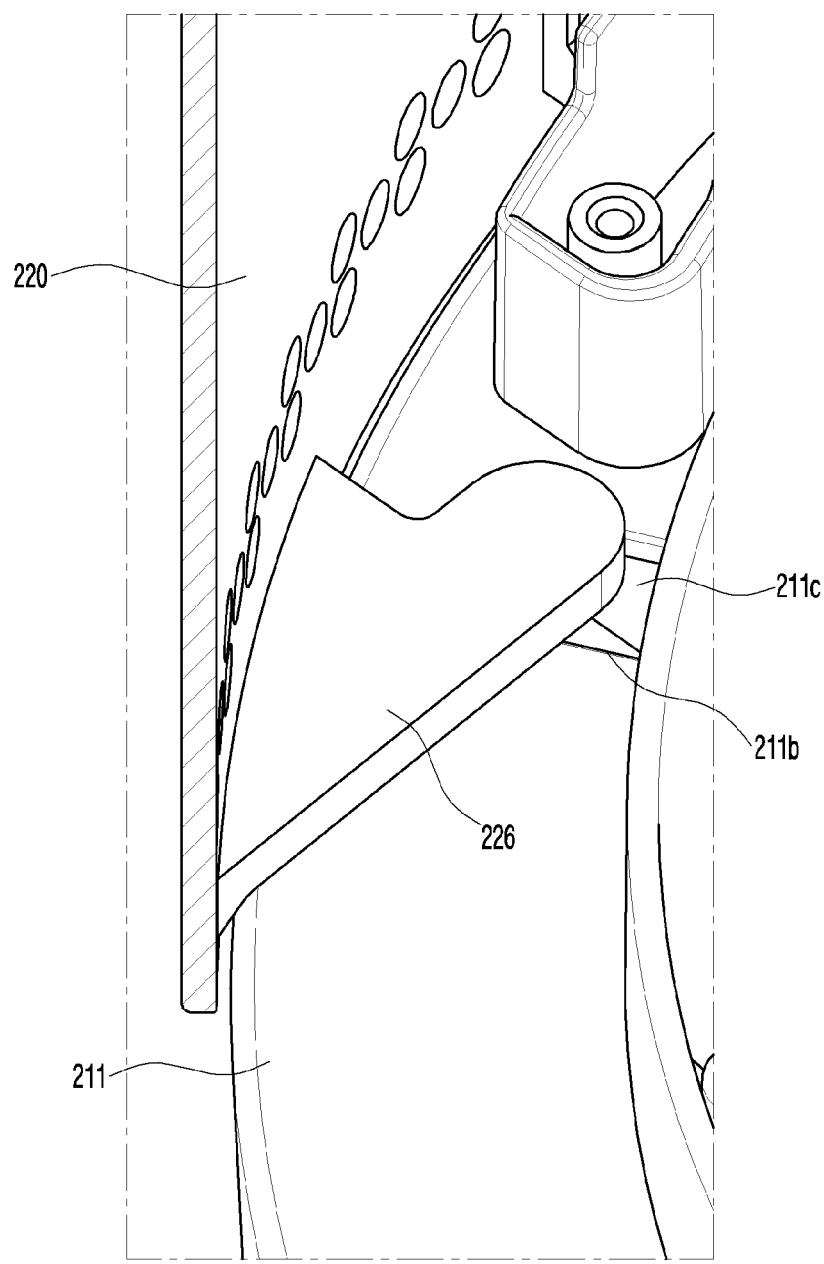

[FIG. 47]
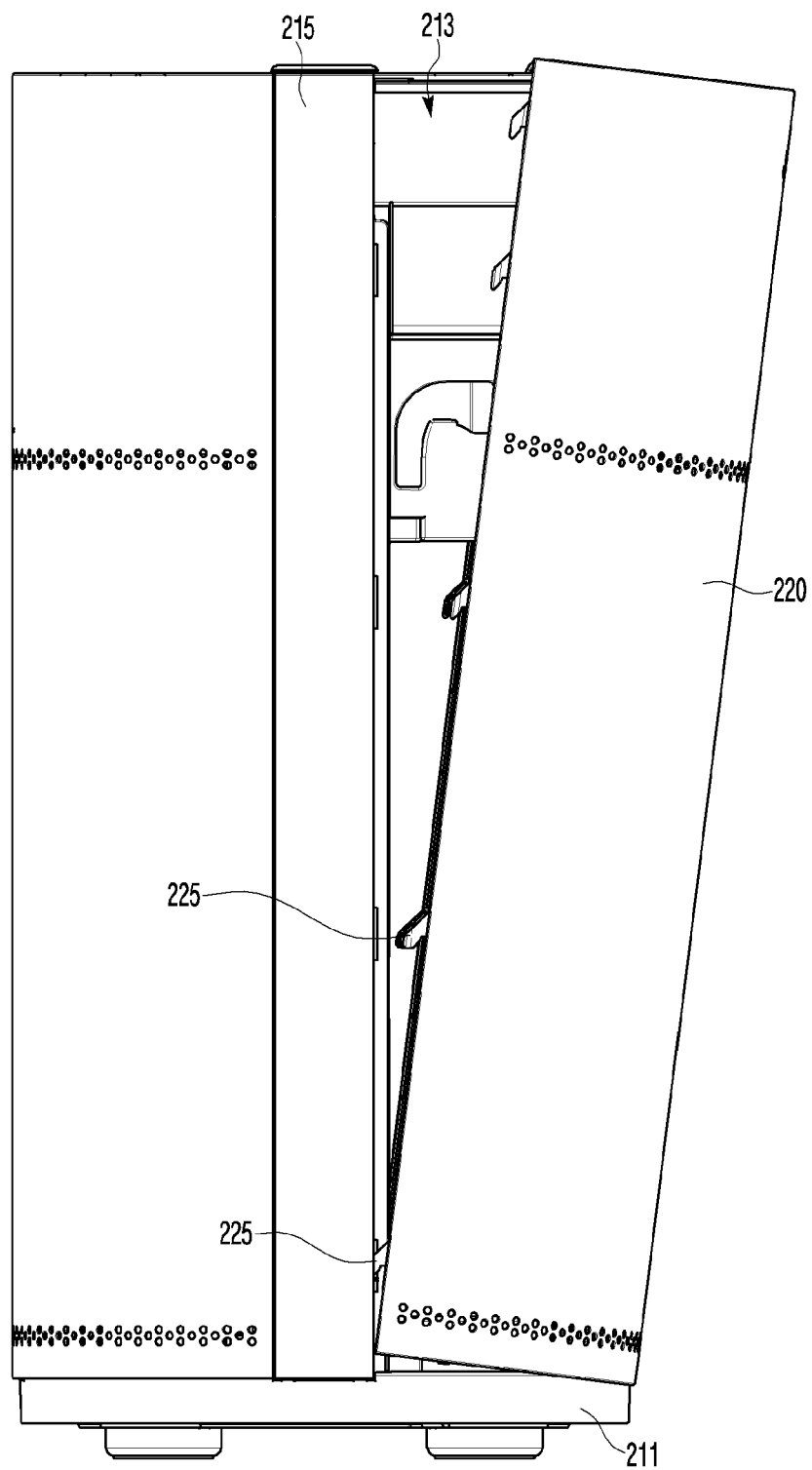

[FIG. 48]
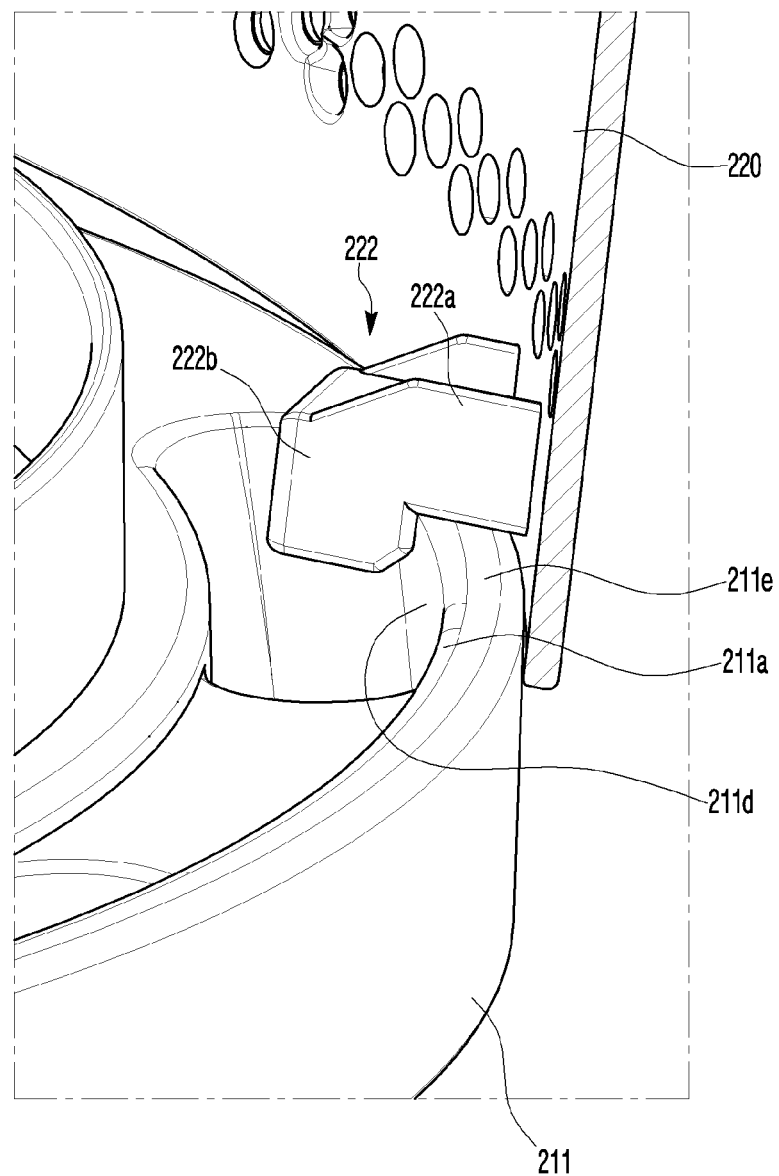

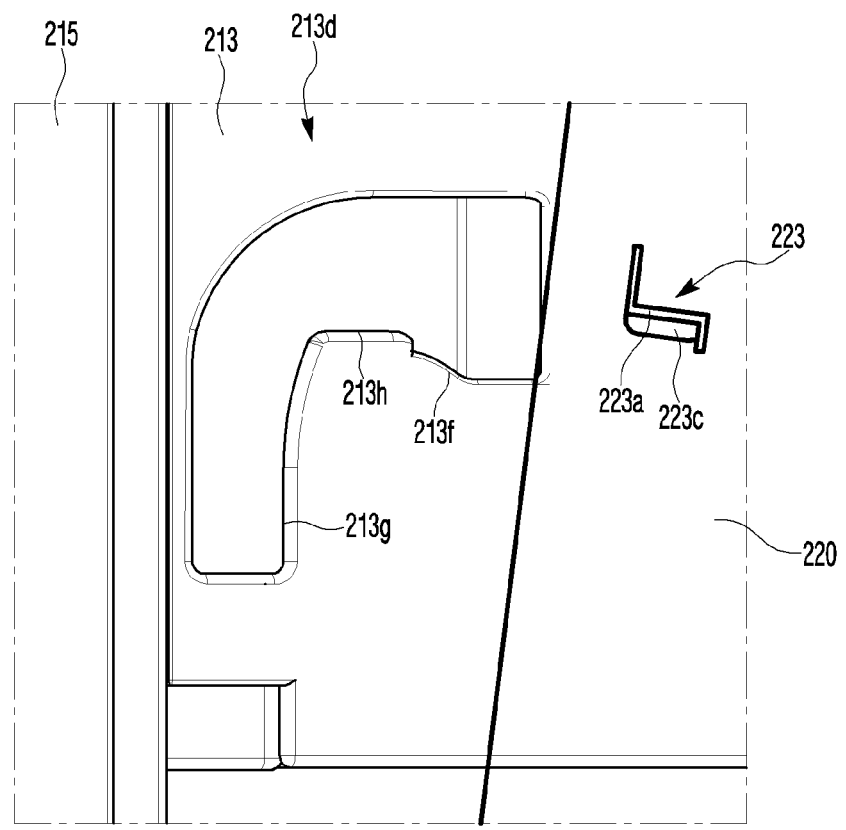
[FIG. 49]

[FIG. 50]
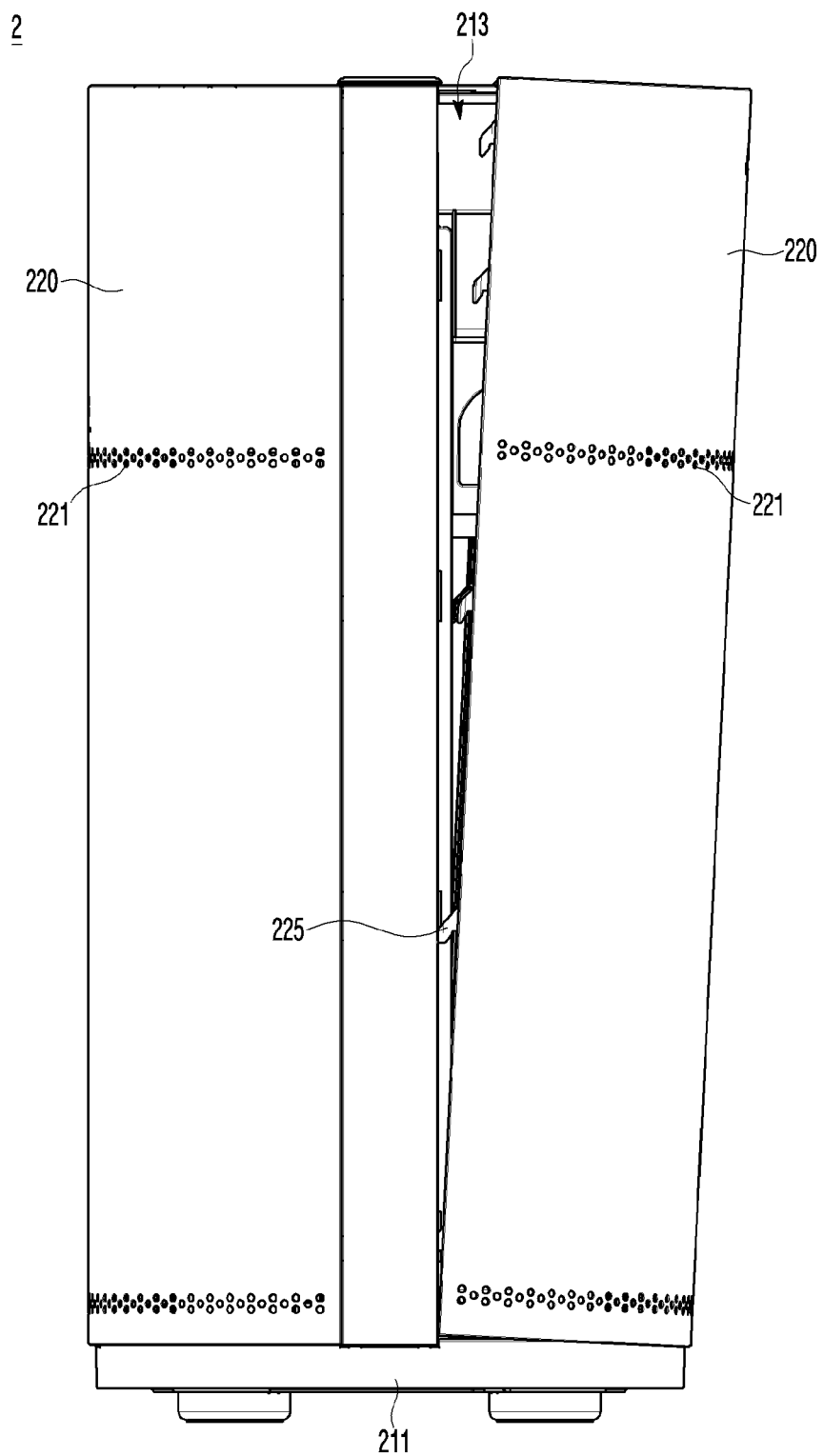

[FIG. 51]
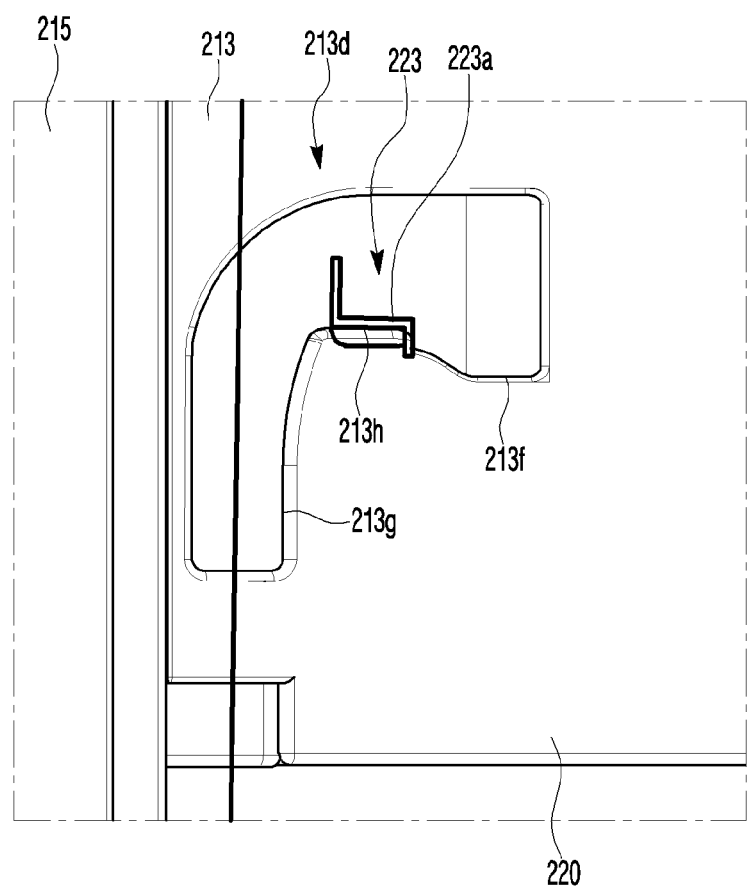

[FIG. 52]
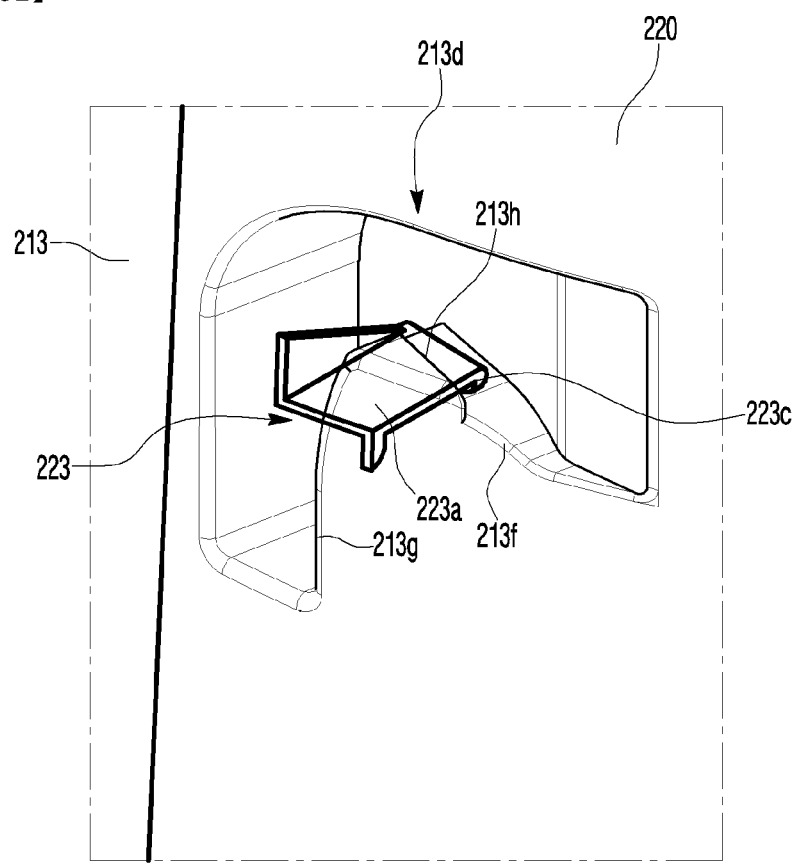

[FIG. 53]
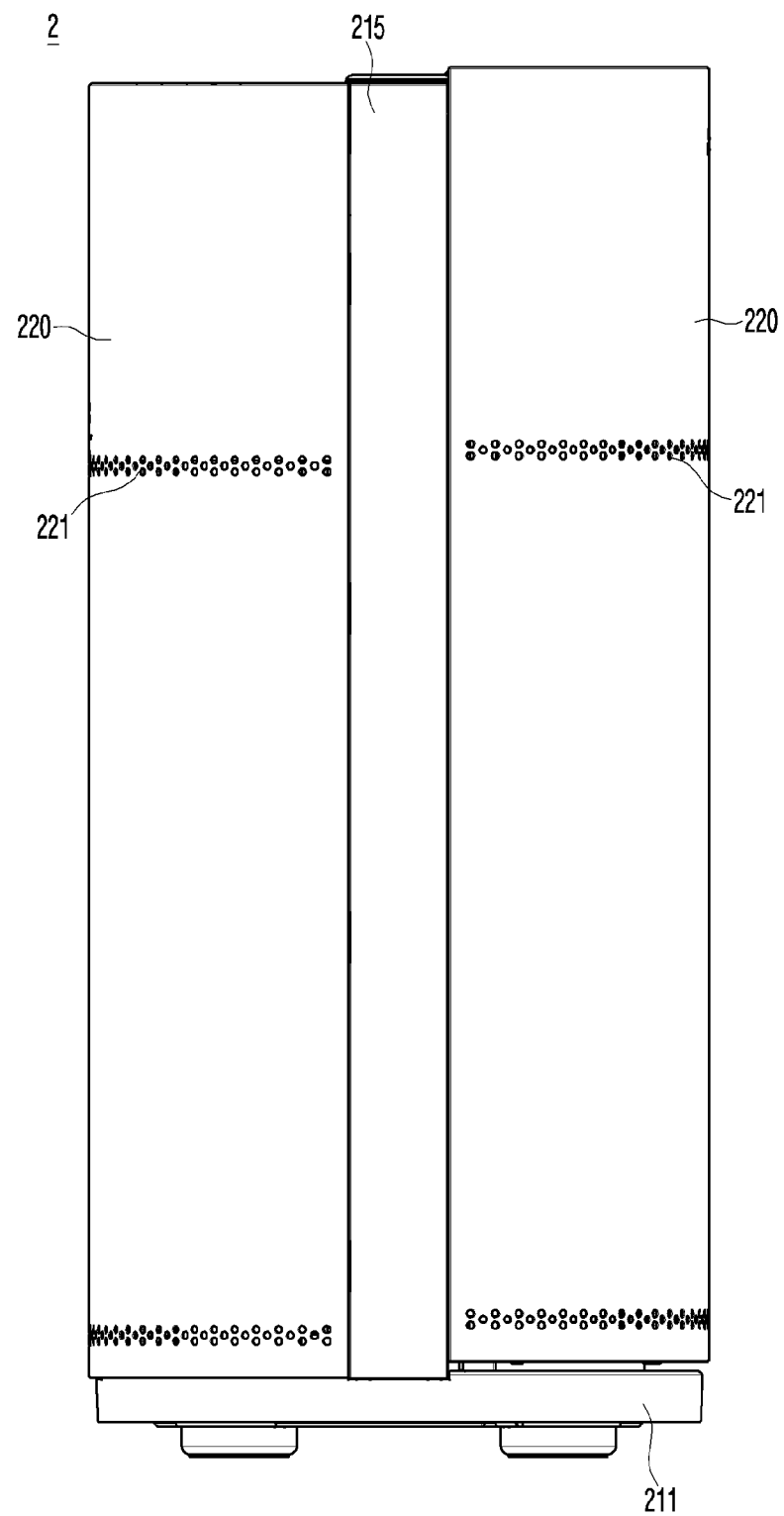

[FIG. 54]
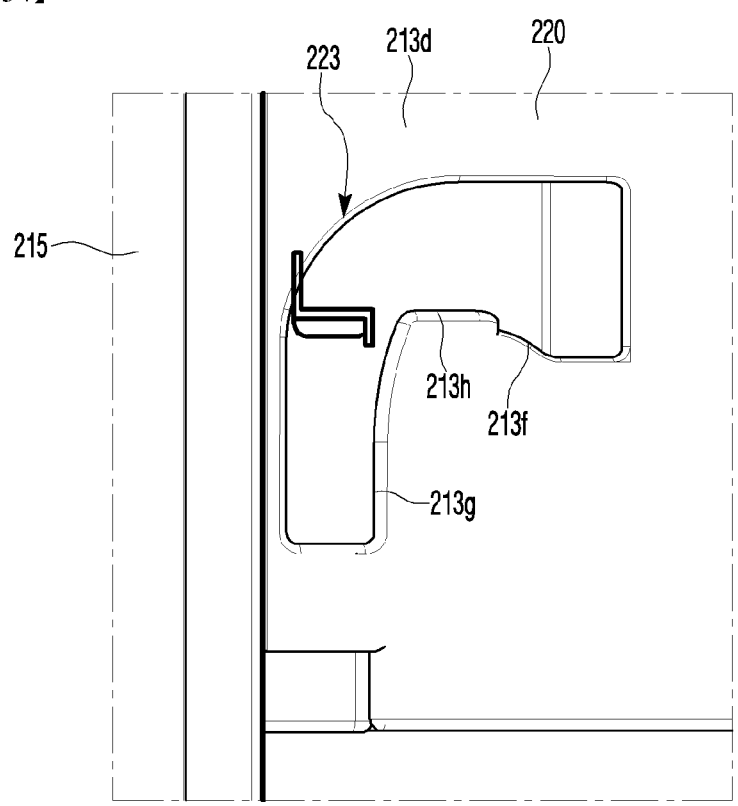

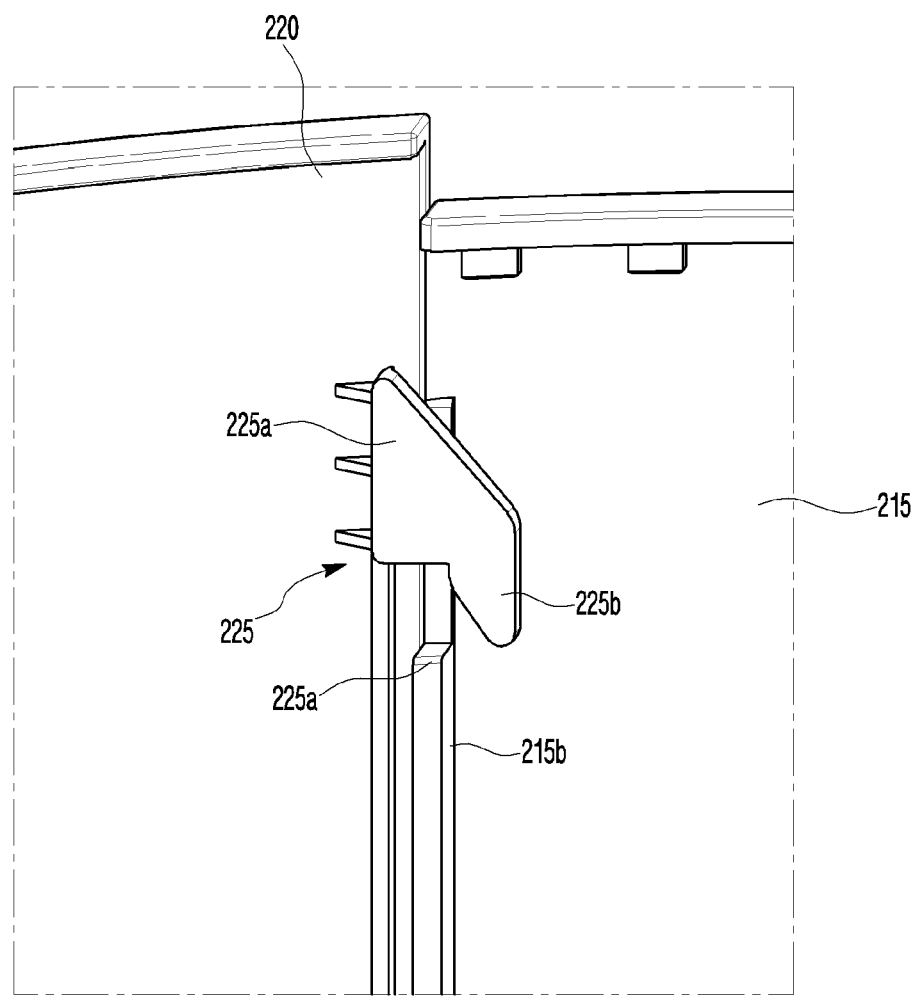
[FIG. 55]

【FIG. 56】
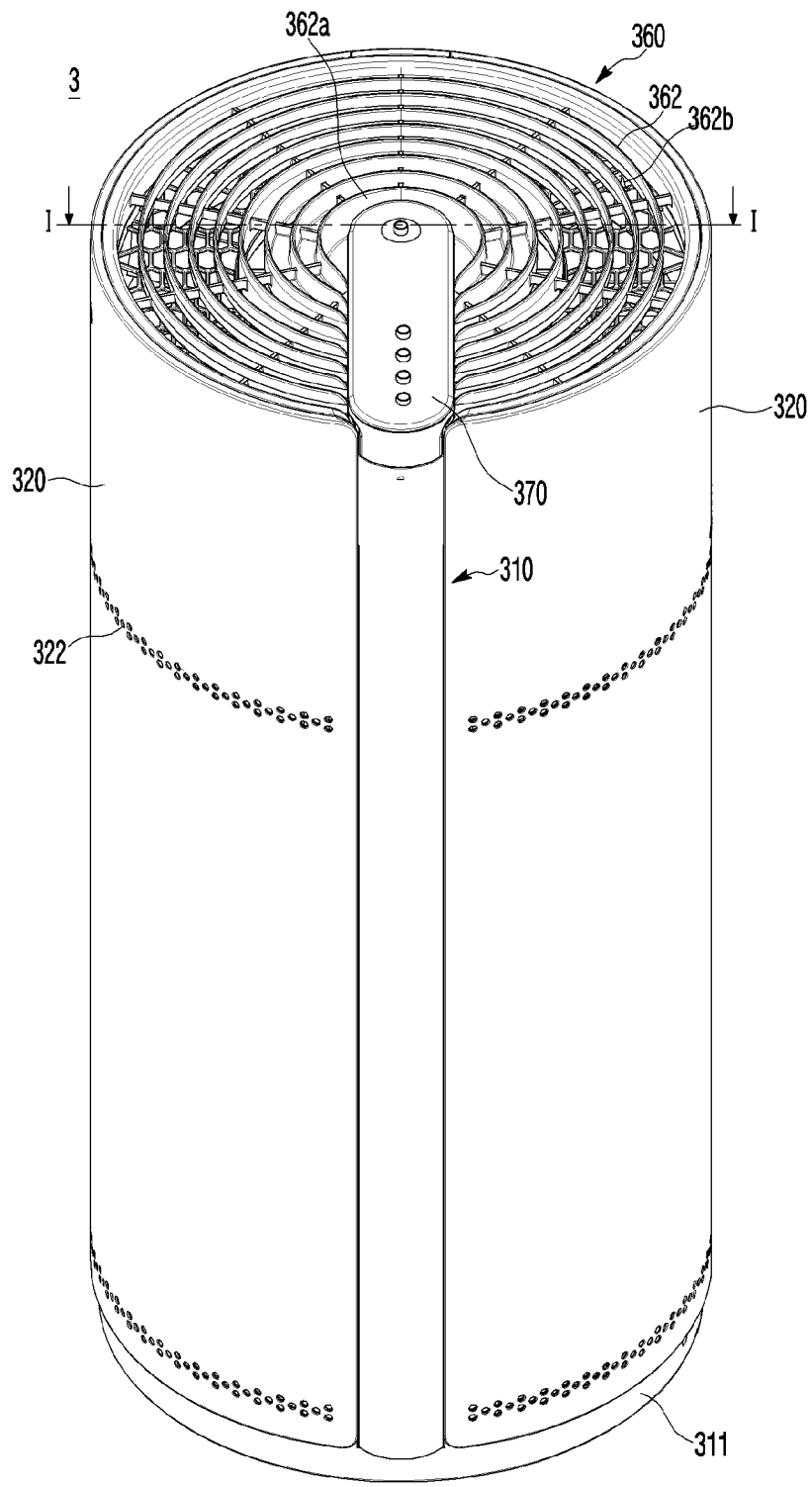

[FIG. 57]
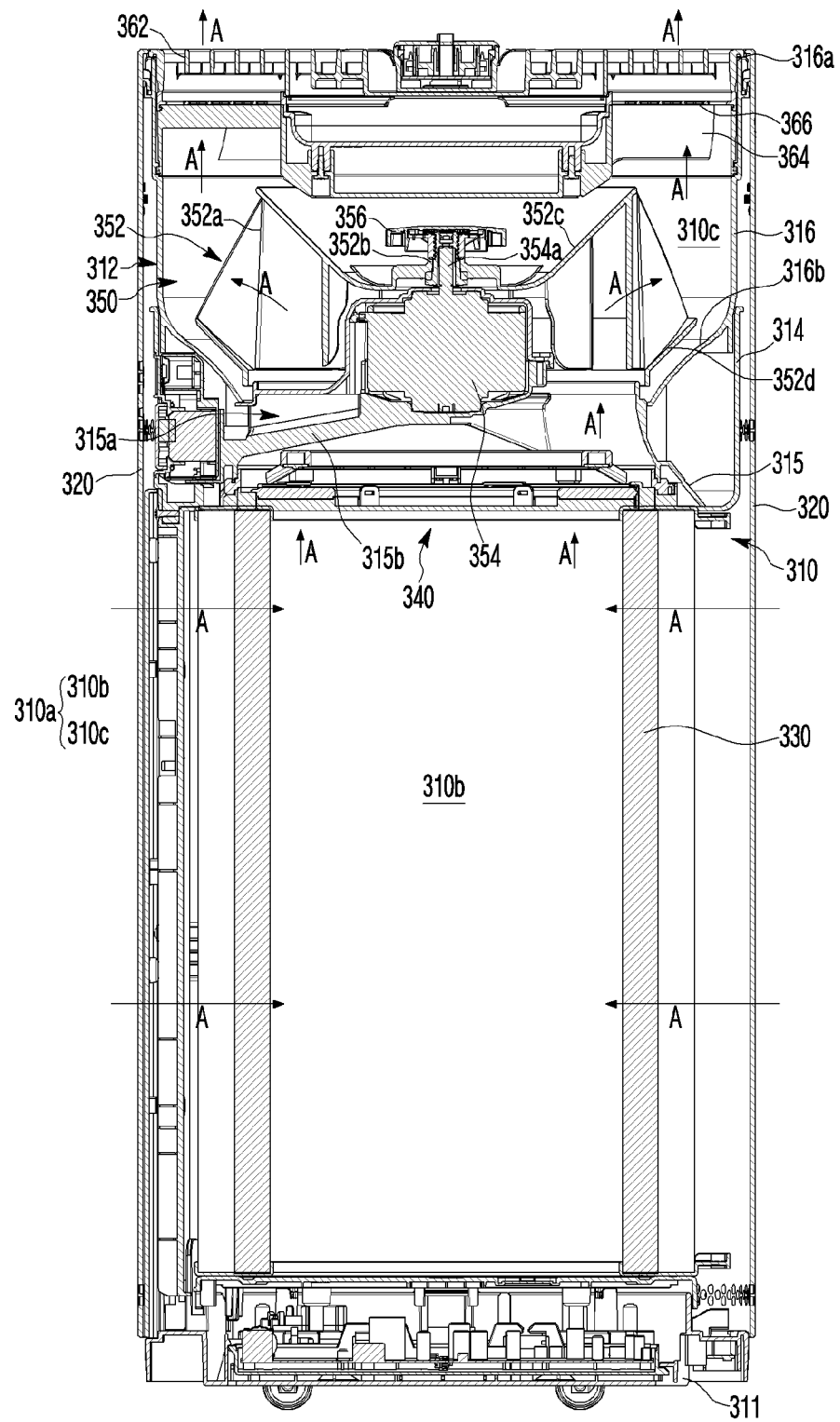

[FIG. 58]
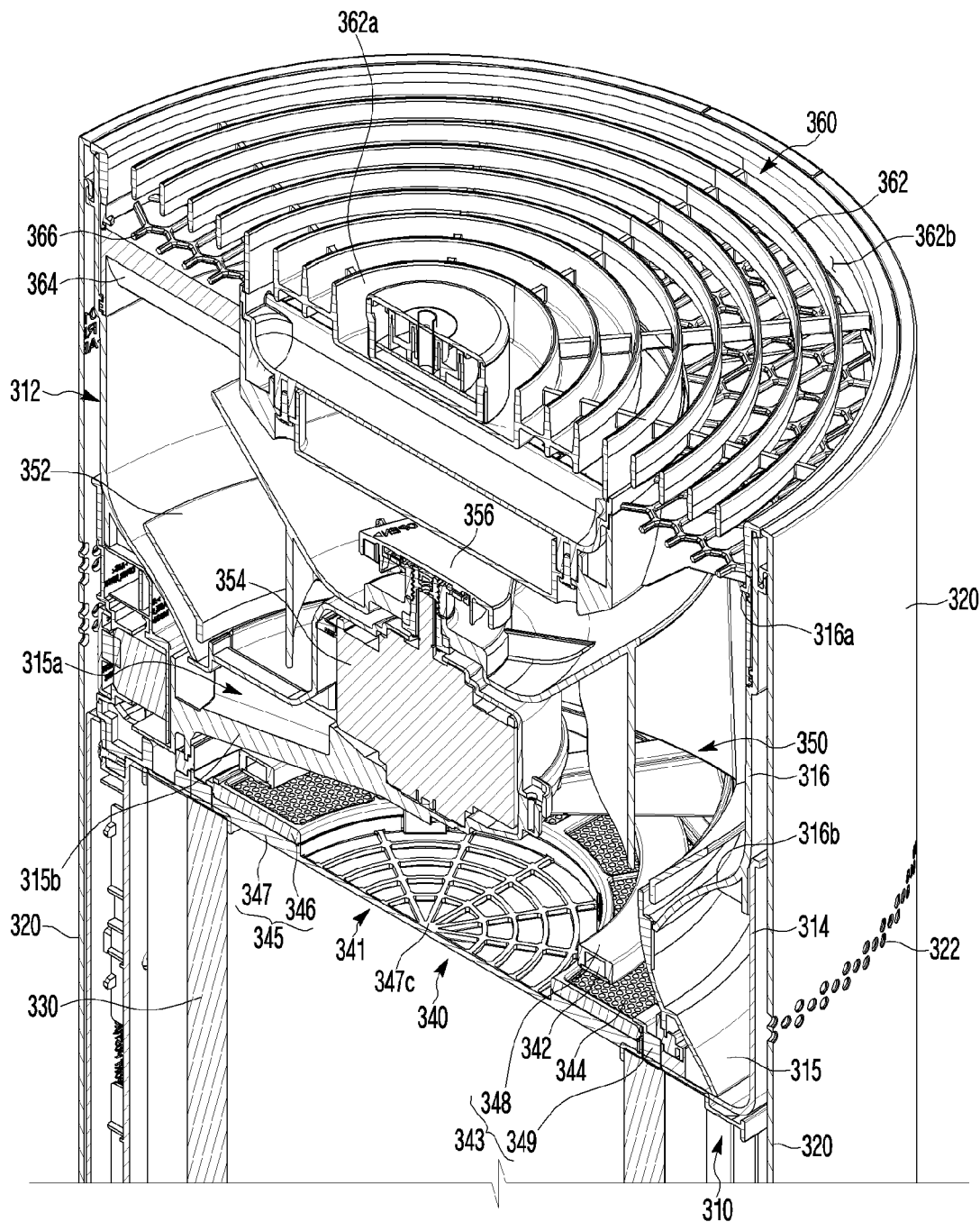

【FIG. 59】
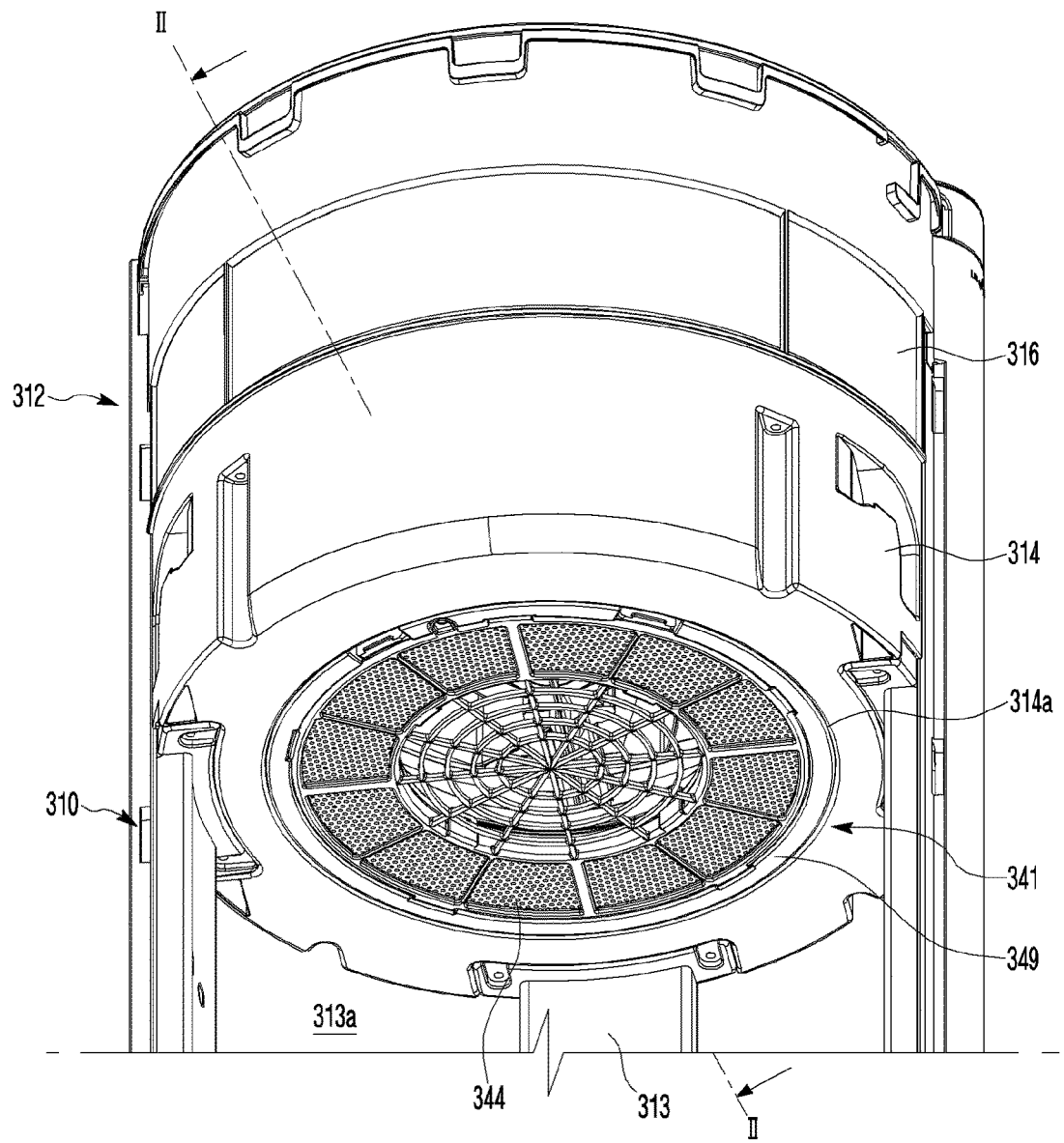

【FIG. 60】
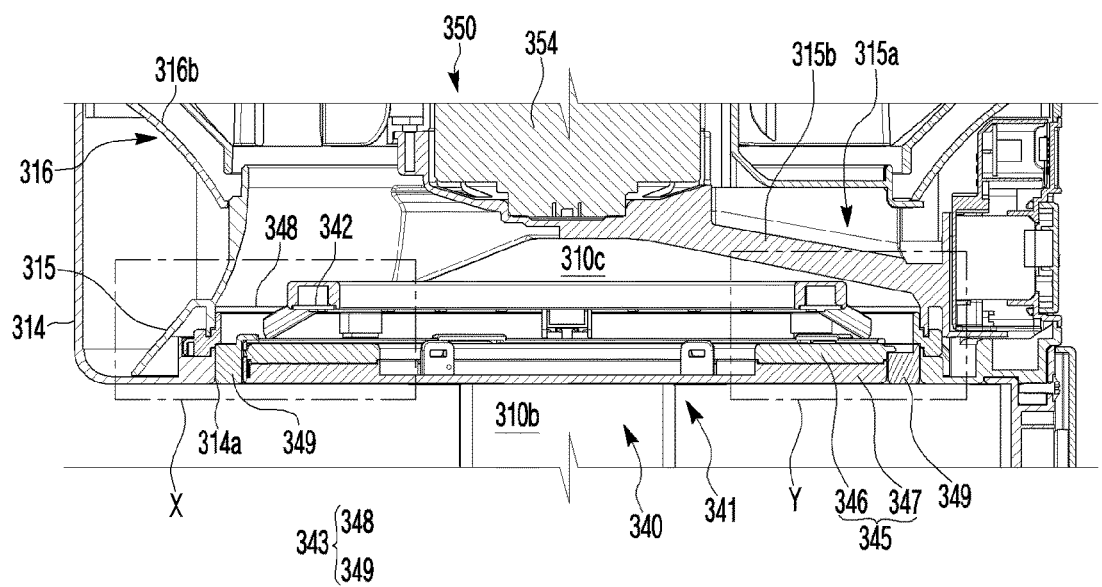

[FIG. 61]
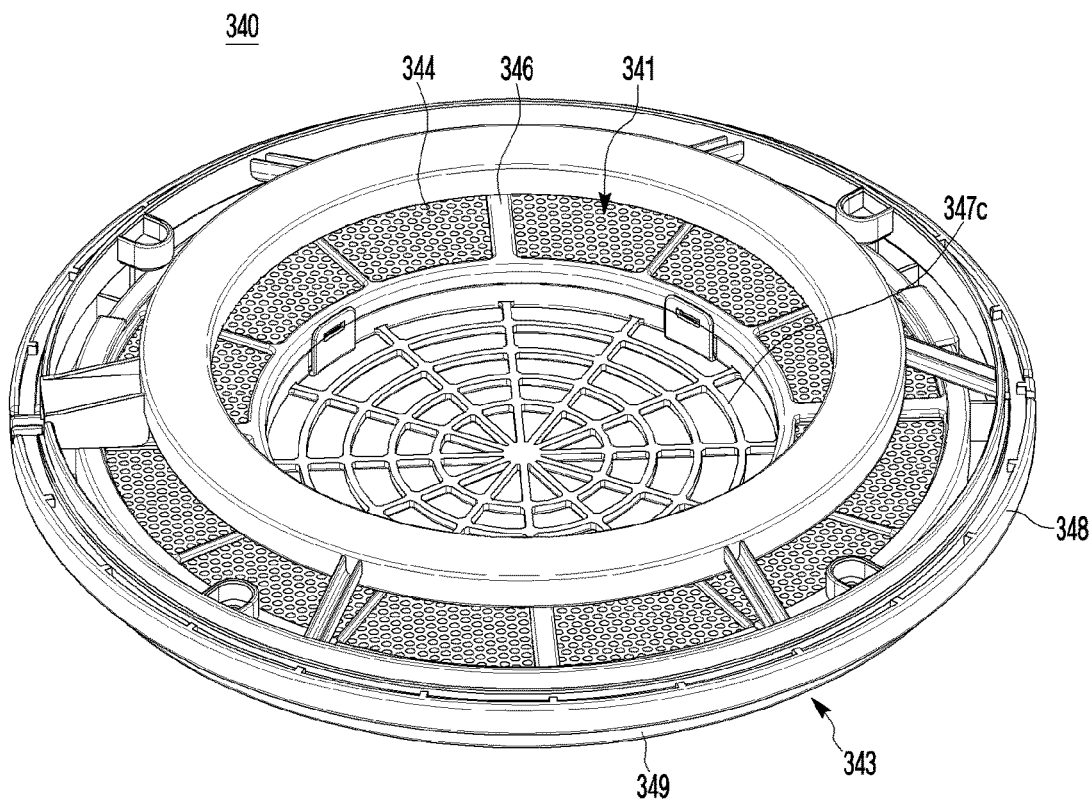

[FIG. 62]
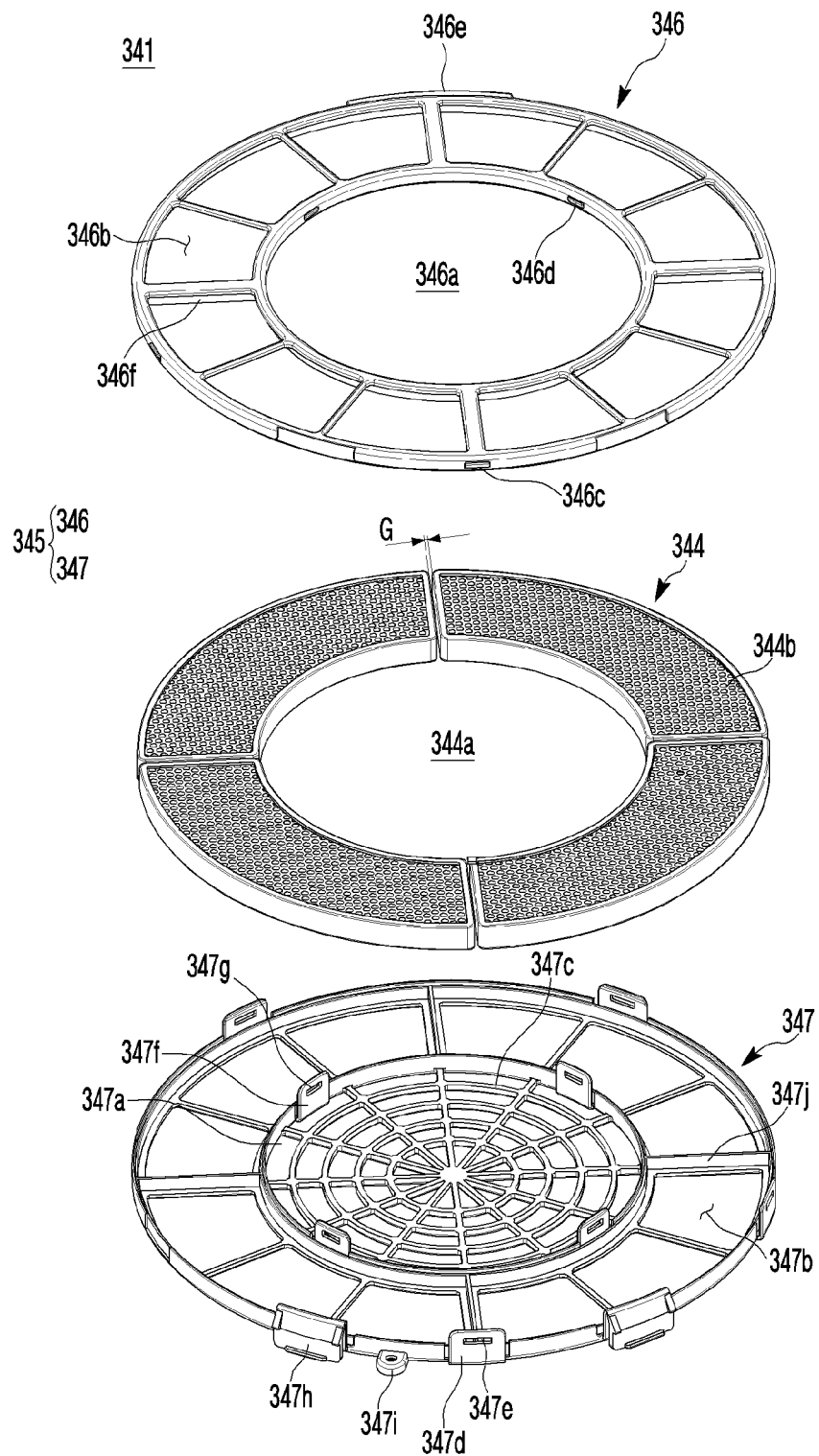

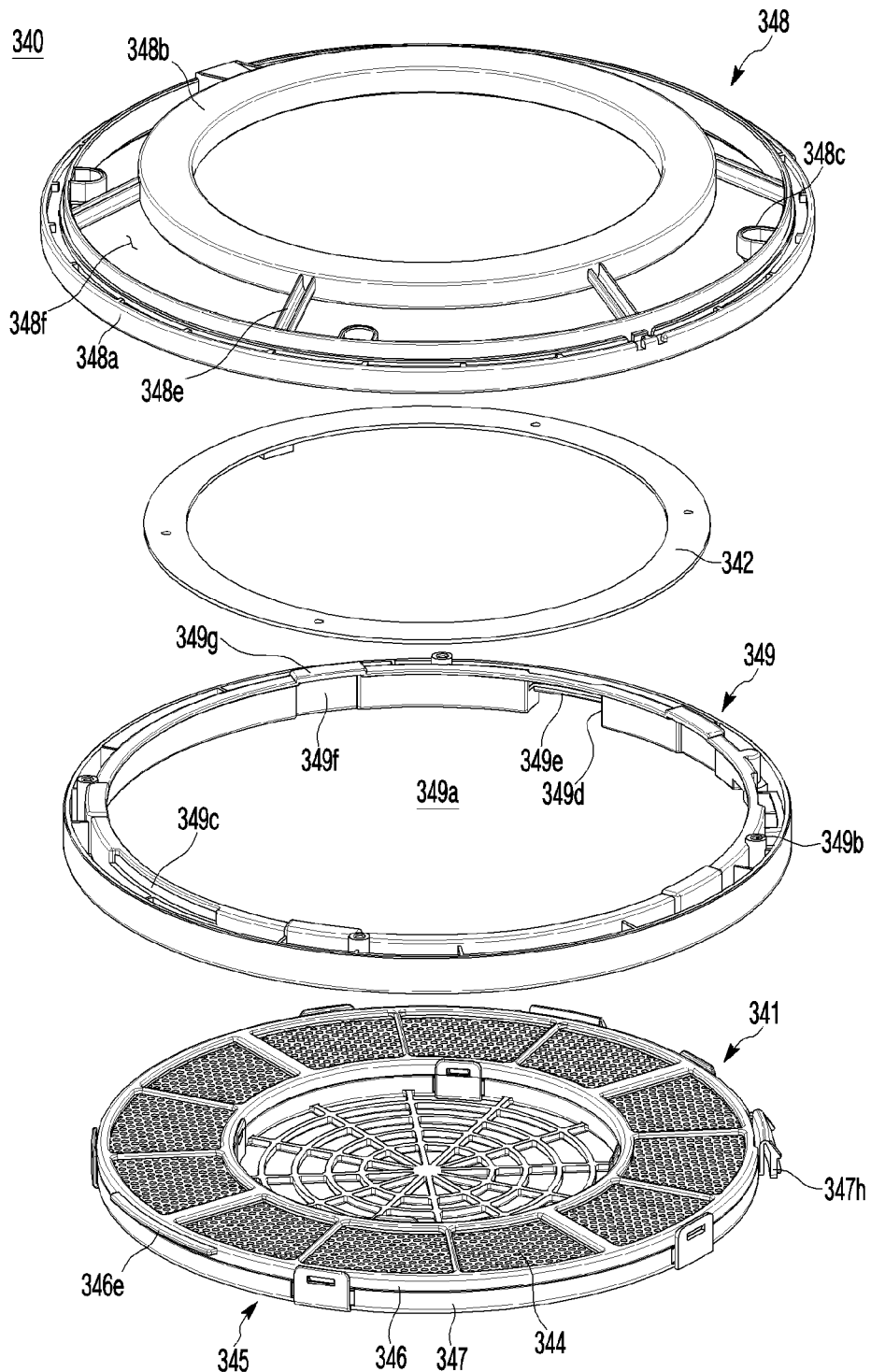
[FIG. 63]

[FIG. 64]
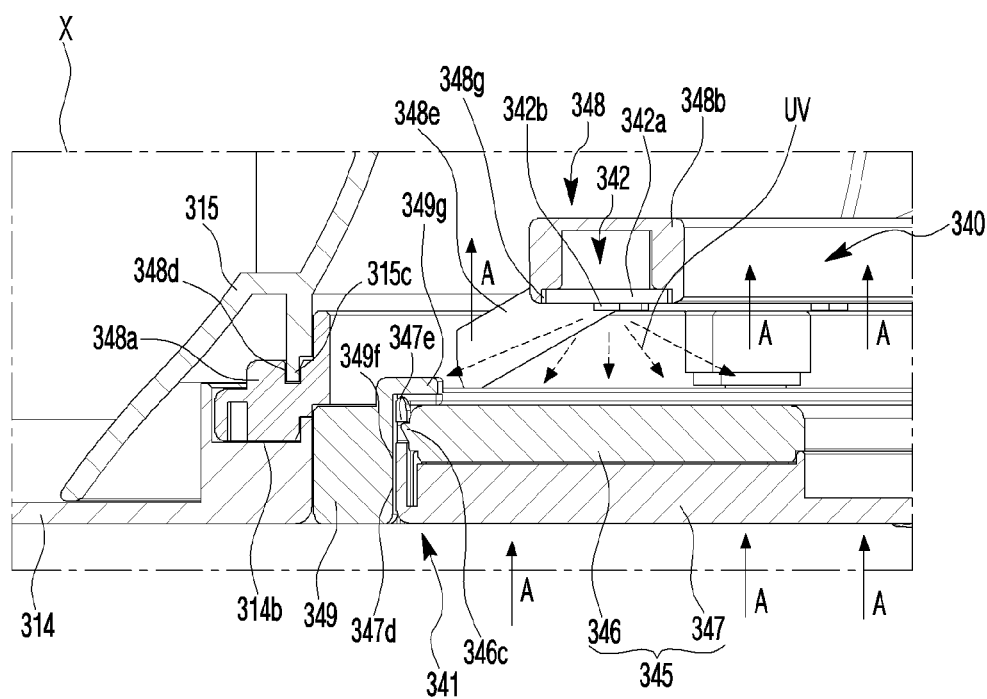

[FIG. 65]
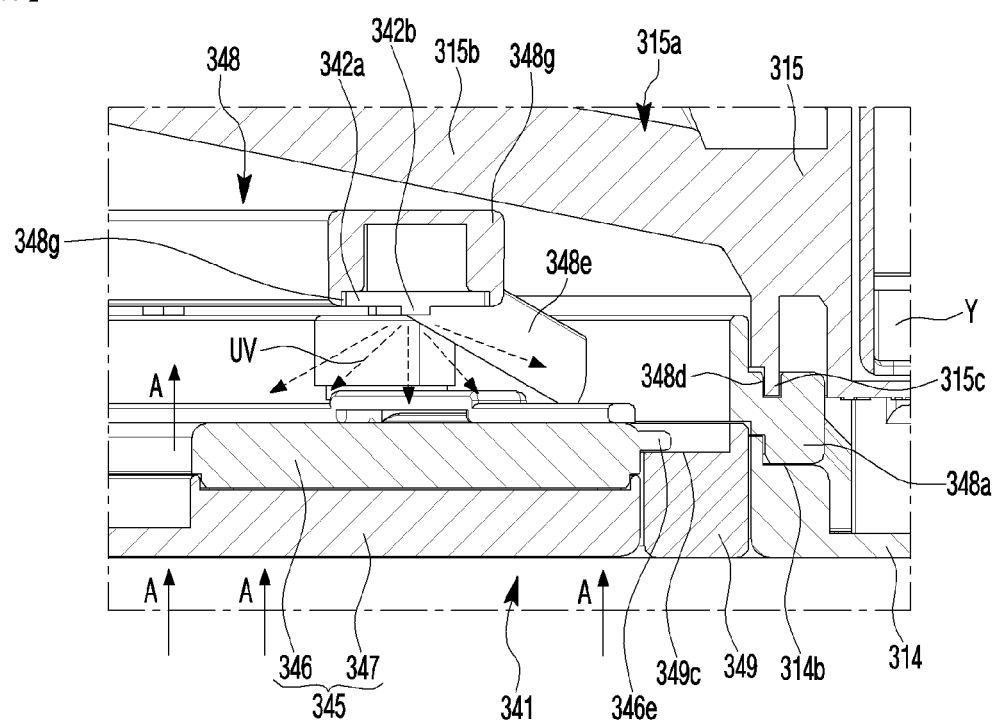

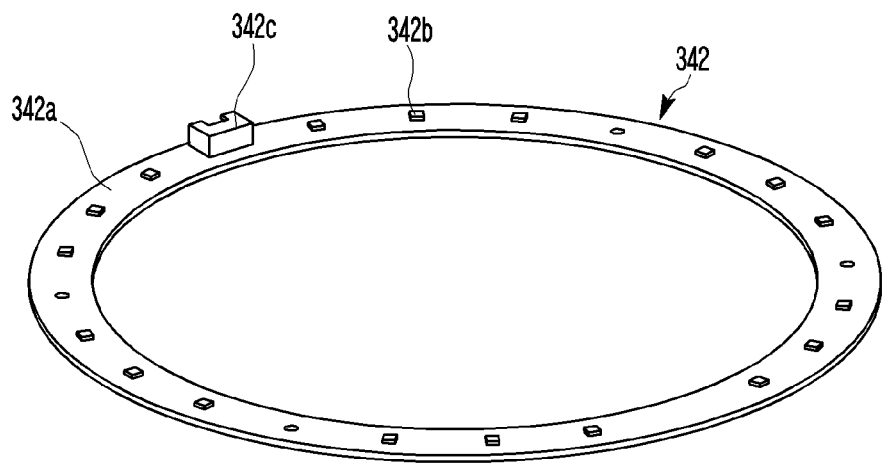
[FIG. 66]

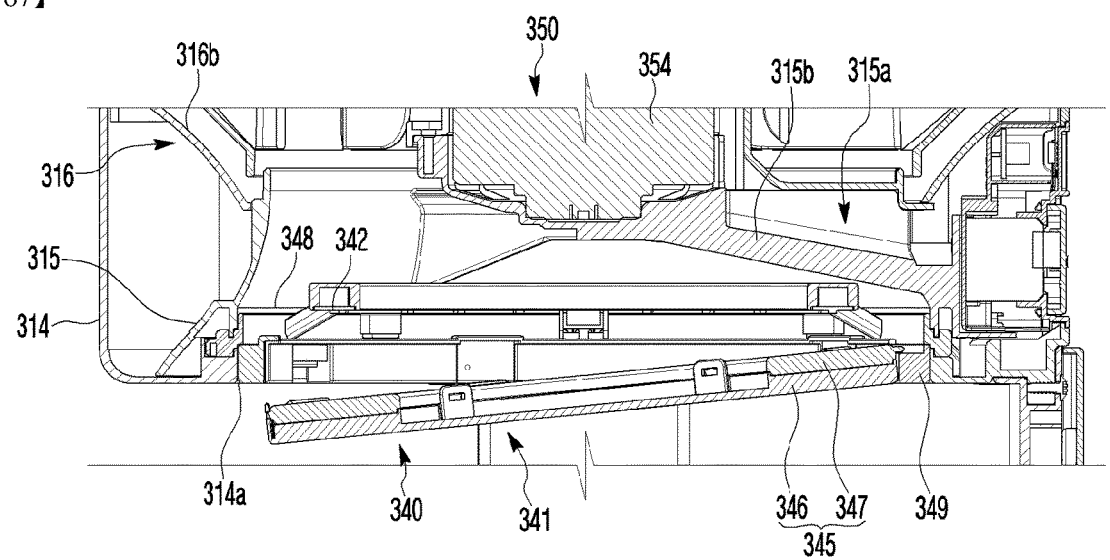
[FIG. 67]

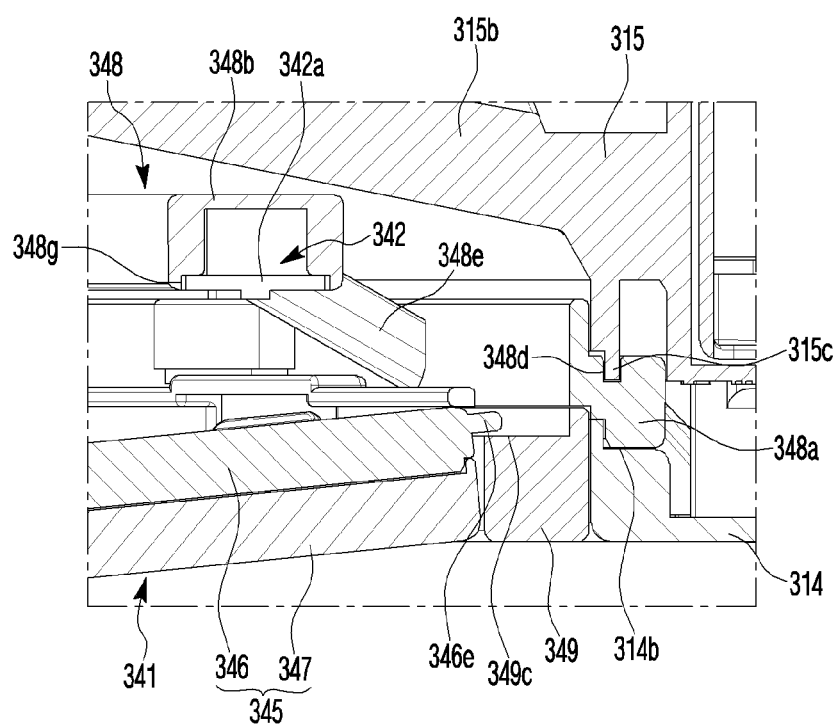
【FIG. 68】

【FIG. 69】
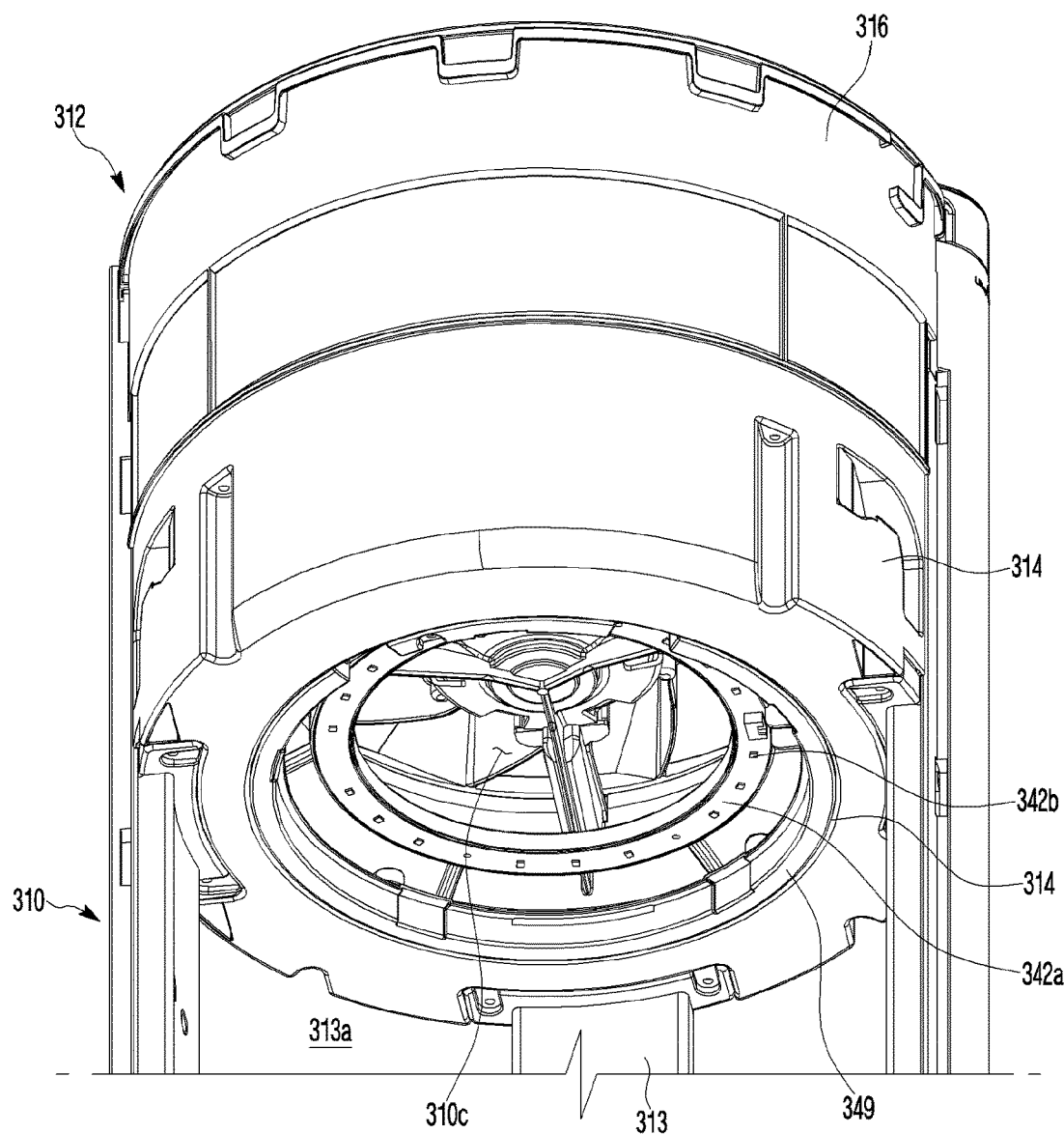

[FIG. 70]
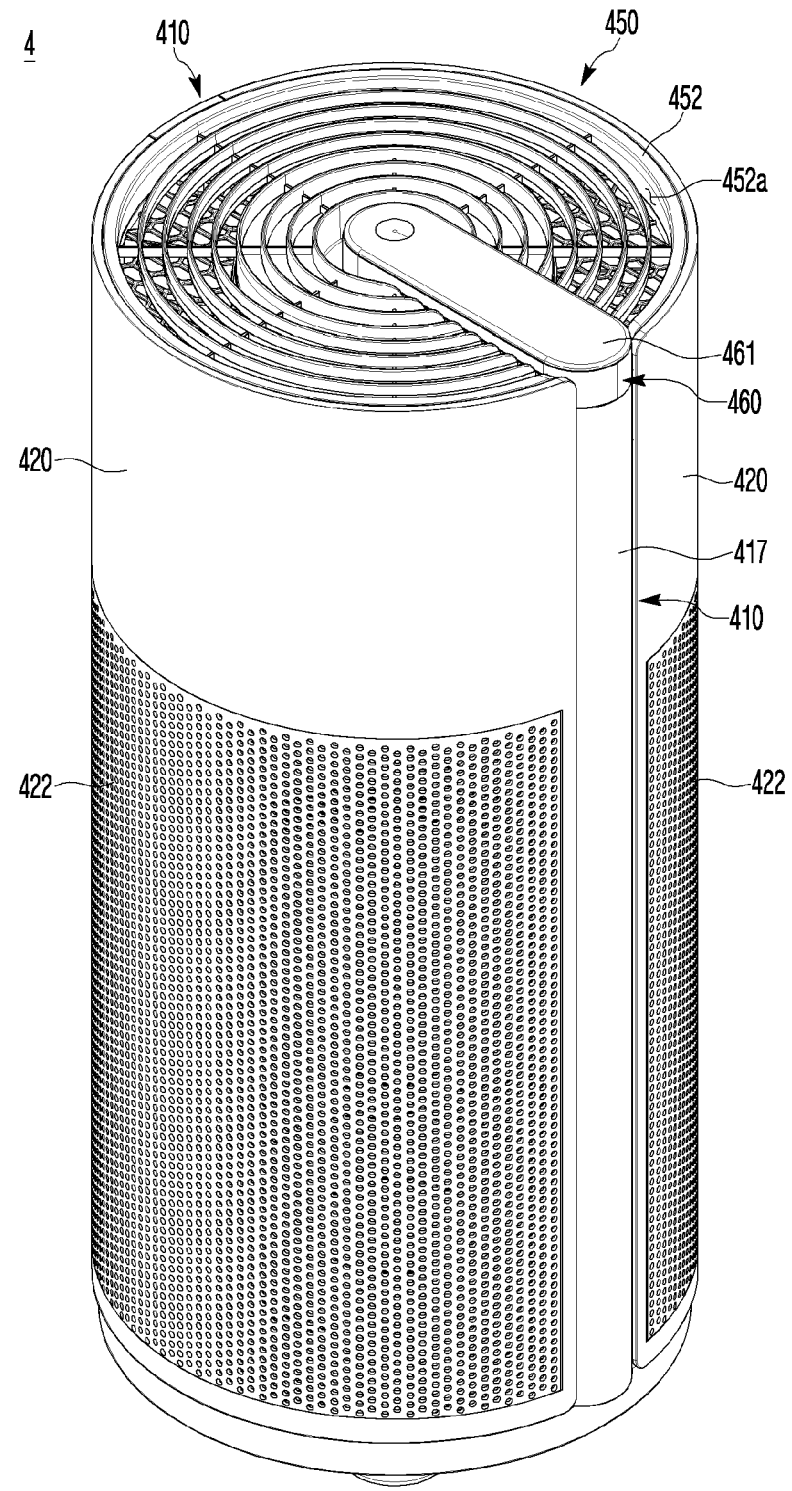

[FIG. 71]
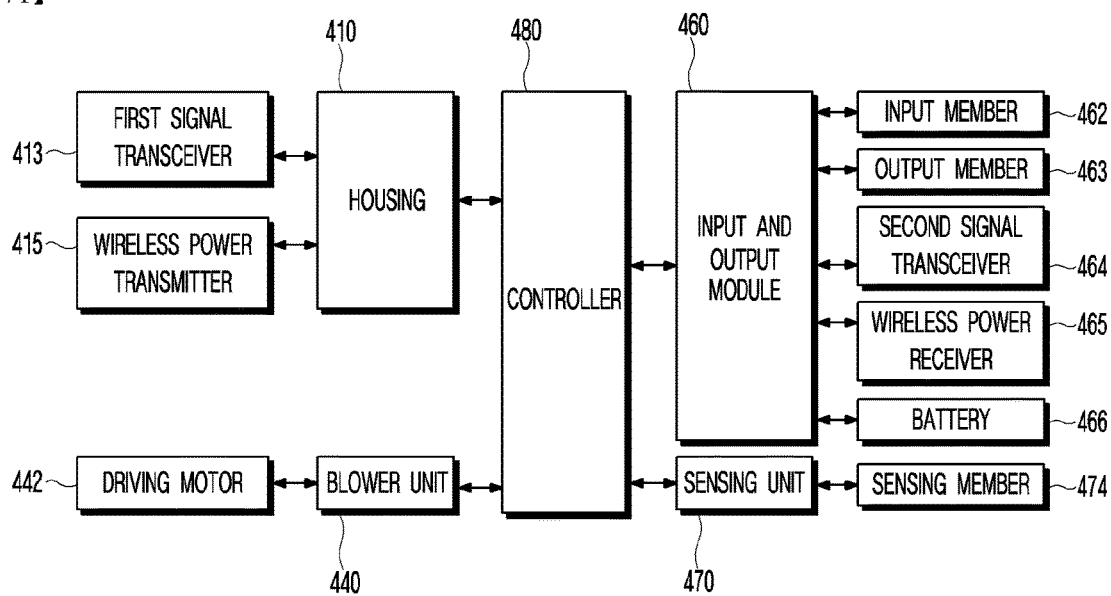

[FIG. 72]
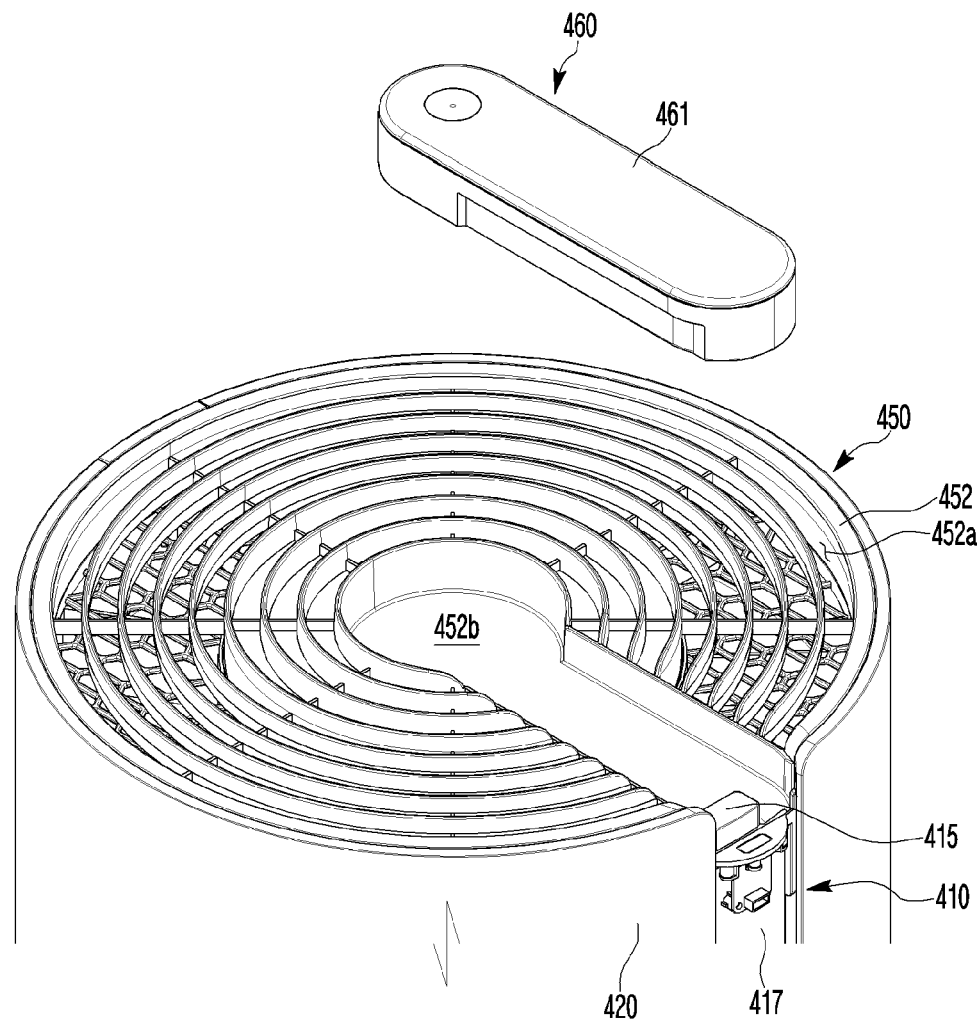

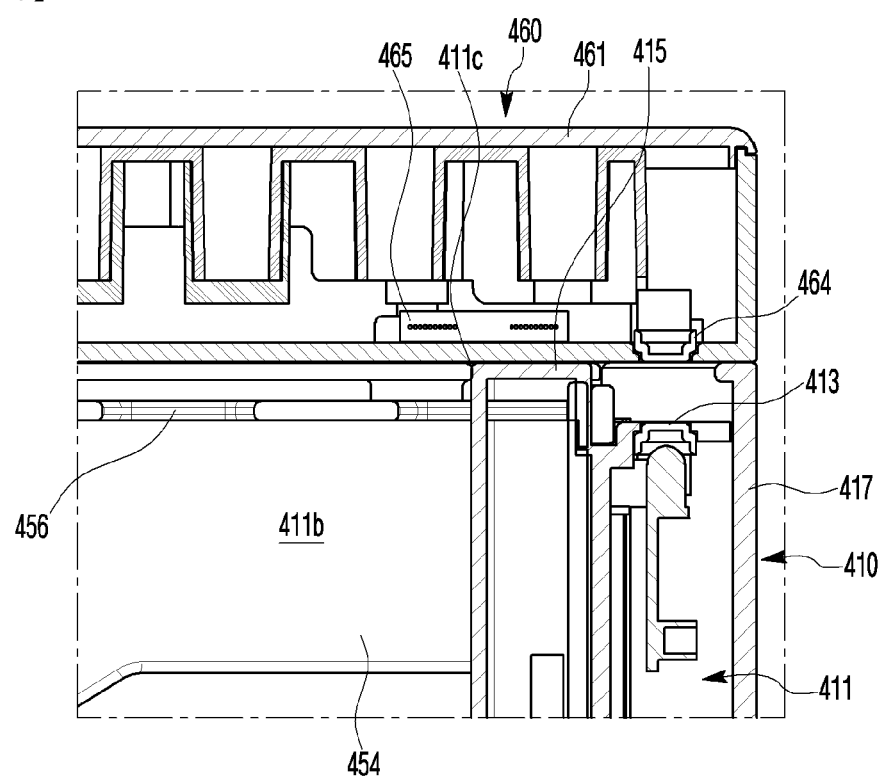
[FIG. 73]

[FIG. 74]
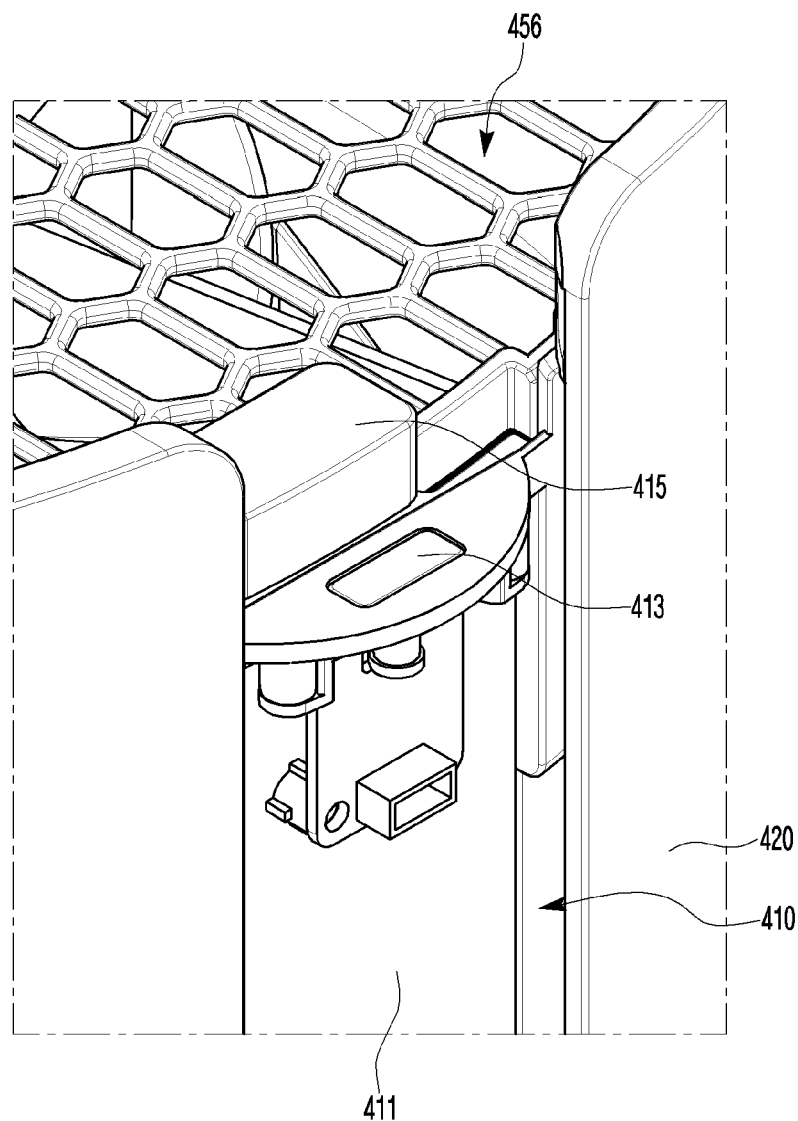

[FIG. 75]
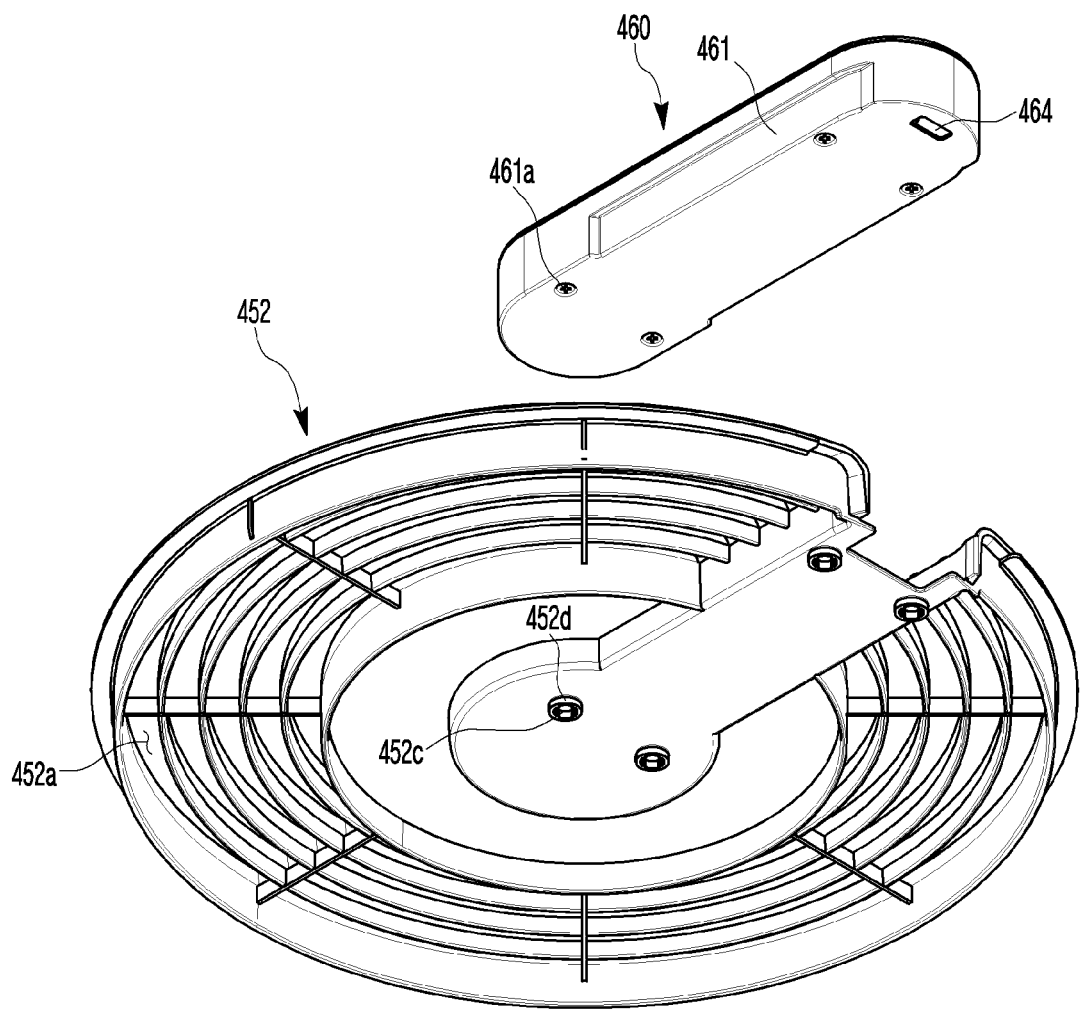

【FIG. 76】
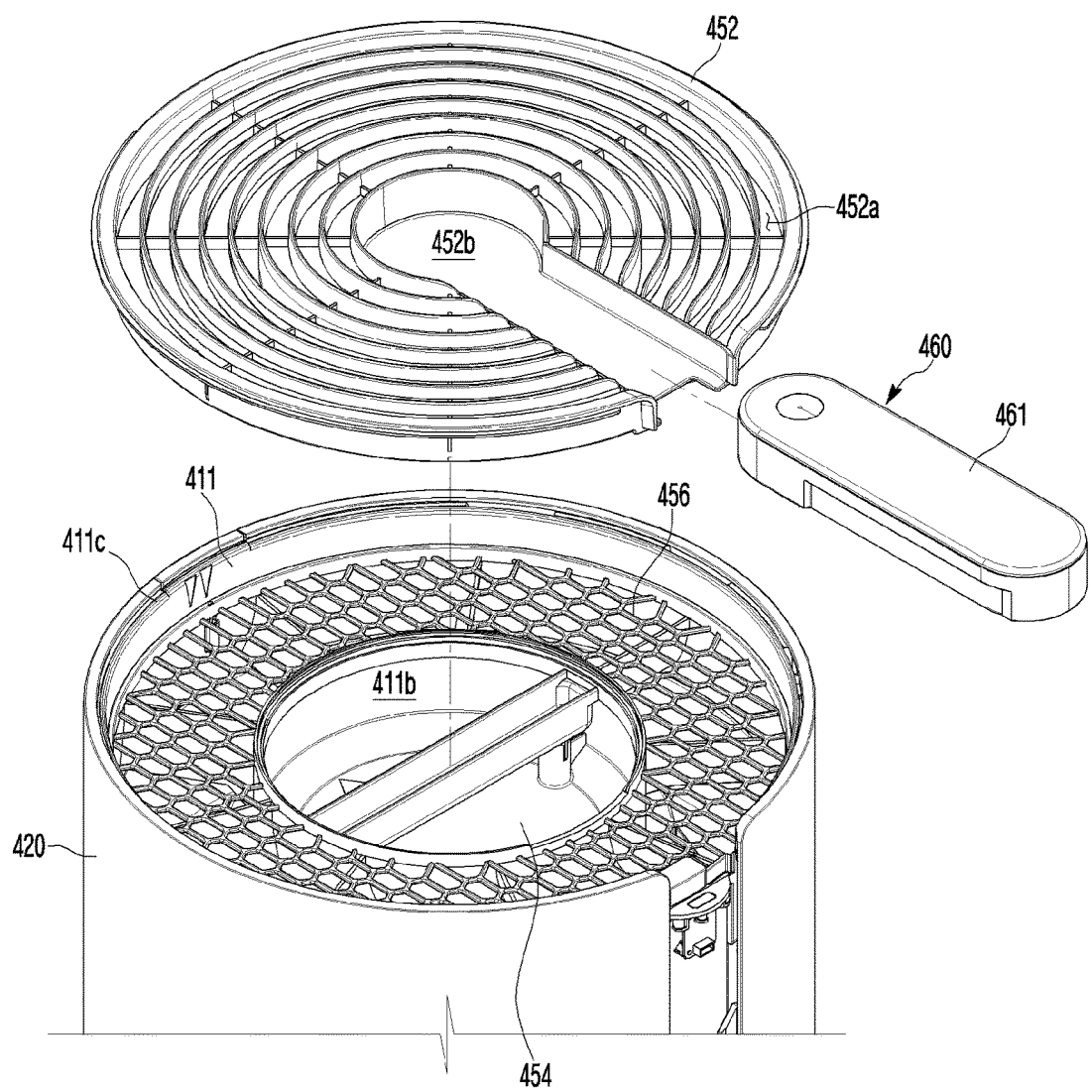

AIR CLEANING APPARATUS

FIELD OF THE INVENTION

The present invention relates to an air cleaner.

BACKGROUND OF INVENTION

An air cleaner is a device for improving indoor air quality by absorbing and purifying indoor air polluted by dust and other contaminants, and then discharging the purified air into a room.

In general, an air cleaner includes a filter for collecting contaminants contained in air and purifying air, a blowing fan for discharging the air purified by the filter back into a room while providing absorption force for absorbing the air in the room, a driving motor for rotating and driving the blowing fan, and a housing in which various parts include in the air cleaner, such as the filter, the blowing fan, and the driving motor, are installed.

Recently, a tower-type air cleaner provided to purify air absorbed from a room through an absorption hole formed in side and/or lower surfaces of the housing using a filter and then discharge the purified air back into the room through a discharge grille installed on an upper surface of the housing has been developed and used.

However, the tower-type air cleaner is formed in such a way that that the discharge grille is opened in an upward direction of the air cleaner, and when the cleaner is not used for a long period of time, the discharge grille, an internal flow path of the air cleaner, connected to the discharge grille, the blowing fan, and other parts installed on the internal flow path, etc. are contaminated by dust that has settled on the discharge grille from the air, and contaminants such as liquids spilled on the discharge grille due to the user's carelessness. In addition, due to change in a shape of the filter due to long-term use, the internal flow path and parts installed therein are contaminated due to contaminants contained in air that do not pass through the filter and enter the internal flow path as is.

In a conventional tower-type air cleaner, a cover panel having an absorption hole formed therein and installed on a side surface of a housing, a filter installed on an internal flow path to allow air flowing through the absorption hole to pass therethrough, etc. are separated from the air cleaner, the internal flow path is opened in a horizontal direction of the housing, and then the user's hand and cleaning tools are inserted into the opened internal flow path to clean the internal flow path and parts installed therein.

In general, the blowing fan is not only installed in the internal flow path to face the discharge grille, but also has a large volume compared to other parts installed in the internal flow path, and thus needs to be cleaned to the highest degree. However, electrical parts such as a driving motor and many other parts are installed between the blowing fan and an opening of the internal flow path opened in a horizontal direction of the housing when the cover panel and the filter are separated from the air cleaner. Thus, in order to clean the blowing fan and a specific region of the internal flow path, adjacent to the blowing fan, a plurality of parts needs to be separated from the air cleaner, and thus there is a risk of an electric shock accident due to electrical parts such as driving motors, and also, there is a risk of short circuit, disconnection, and other damage to electrical wiring due to the separation and assembly of electrical parts. Thus, in the conventional tower-type air cleaner, the internal flow path and parts installed therein are cleaned only by a professional, and thus, there is a problem in that it takes a lot of time and money to maintain the product, and also, there is a problem in that a hygiene condition of the product is degraded and breakdown of the product frequently occurs because it is difficult to clean the air cleaner in a timely manner.

The conventional tower-type air cleaner further includes an inner grille installed inside the housing compared to the discharge grille to block contaminants that are not blocked by the discharge grille and enter the interior of the housing. However, the conventional tower-type air cleaner does not include a separate safety device for preventing the inner grille from being arbitrarily separated from the housing. Thus, the tower-type air cleaner has a problem in that a user may be injured by parts exposed to the outside as the internal grille is arbitrarily separated from the housing irrespective of the user's intention.

The conventional tower-type air cleaner includes an air cleaner using a first method, which includes a fixed cover panel fixedly installed to a housing and a detachable cover panel detachably installed on the fixed cover panel, and an air cleaner using a second method, which includes a plurality of detachable cover panels provided to be combined with each other.

However, the air cleaner using the first method has a problem in that it is difficult to clean the fixed cover panel. The air cleaner using the second method has a problem in terms of a high unit price because the installation cost of auxiliary materials for mutual coupling of detachable cover panels such as magnets and magnetic materials for attaching the magnets, and labor costs for assembling these auxiliary materials are required, and also, has a problem in terms of a high possibility of defects in an outer appearance, such as a step difference between coupled parts of detachable cover panels.

In general, for dust collection and sterilization of air, the air cleaner includes a dust collection filter that collects and removes dust and foreign substances contained in air, and a photocatalytic filter that sterilizes and deodorizes air using radicals generated by photochemical reactions of photocatalysts activated by ultraviolet rays and other excitation light. However, the conventional air cleaner has a problem in that dust collection performance of the dust collection filter is lowered as flow resistance to air is increased due to the photocatalytic filter.

In the conventional air cleaner, the photocatalytic filter is fixedly installed inside the air cleaner in a non-detachable form. Thus, the conventional air cleaner has a problem in that sterilization and deodorization performance of photocatalytic filter is degraded because excitation light is not smoothly emitted to photocatalyst coated on the photocatalytic filter due to dust and other foreign substances that are accumulated in the photocatalytic filter and has a problem in that dust collection performance of the dust collection filter is worsened due to the photocatalytic filter as flow resistance to air gradually increases depending on usage time of the air cleaner.

TECHNICAL SOLUTION

The present invention provides an air cleaner having an improved structure to clean an internal flow path, and a blowing fan and other components installed in the internal flow path in the state in which a discharge grille is separated from an opening of a housing to open the internal flow path.

The present invention provides an air cleaner having an improved structure to automatically stop driving of a driving motor and other electrical parts or to block supply of power to other electrical parts when the internal flow path is cleaned.

The present invention provides an air cleaner having an improved structure to selectively lock or unlock a guide vane and an internal grille included in a discharge unit using a locking tab.

The present invention provides an air cleaner having an improved structure that does not require a separate member for fixing a cover panel.

In addition, the present invention provides an air cleaner having an improved structure to minimize reduction in dust collection performance of a dust collection filter due to a photocatalytic filter.

TECHNICAL GOAL OF THE INVENTION

To achieve the technical goal, according to an embodiment, an air cleaner includes a housing including a first opening configured to absorb outside air, a second opening configured to discharge the air outside, and a housing body having an internal flow path connecting the first opening and the second opening, a blower unit including a blowing fan configured to blow air accommodated in the internal flow path toward the second opening, and a driving motor disposed between the first opening and the blowing fan and detachably shaft-coupled to the blowing fan, and installed in the internal flow path, a filter installed in the internal flow path and configured to purify air absorbed through the first opening, and a discharge unit including a discharge grille having a plurality of discharge holes formed to allow air reaching the second opening to pass therethrough and detachably coupled to the second opening.

According to another embodiment of the present invention, an air cleaner includes a housing including a hook hole, and a cover panel including a catch hook to be caught by and coupled to the hook hole, wherein the housing further includes a slide slot having a slide groove extending in a predetermined slide direction, and the cover panel further includes a guide hook having a guide rib slidably inserted into the slide groove to guide the catch hook to the hook hole in the slide direction.

According to another embodiment of the present invention, an air cleaner includes a housing including a first opening into which outside air flows, a second opening configured to discharge the air outside, and including an internal flow path connecting the first opening and the second opening, and a photocatalyst module including a filter assembly having at least a portion coated with the photocatalyst, a light emitter configured to provide excitation light for activation of photochemical reaction of the photocatalyst, and a fixing bracket configured to fix each of the filter assembly and the light emitter to the internal flow path to irradiate a predetermined position of the filter assembly with the excitation light emitted from the light emitter, wherein the filter assembly includes a photocatalytic filter having a hollow shape with a central part in which a bypass hole is formed, and a filter guide configured to accommodate the photocatalytic filter to allow the air to pass through the photocatalytic filter and to allow any part of the air to selectively pass through the bypass hole and coupled to the fixing bracket.

Effects of the Invention

The present invention relates to an air cleaner and has the following effects.

According to the present invention, a discharge grille for discharging air purified by a filter to the outside may be separated from an opening of a housing to open an internal flow path in which a blowing fan and other internal components are installed, and thus cleaning, repair, and other tasks on the internal flow path and internal components may be easily performed through an opening from which the discharge grille is separated.

According to the present invention, driving of electrical parts may be stopped when an internal flow path is opened or power supplied to the electrical parts may be blocked, and thus a user may be prevented from injury or electric shock during cleaning, repair, and other tasks on the internal flow path and internal components.

According to the present invention, an input and output module for remotely manipulating an air cleaner may be detachably coupled to a discharge grille and may be wirelessly connected to a controller and other electrical parts, and thus, the input and output module may be used as a remote controller for remotely controlling the air cleaner.

According to the present invention, a locking tab may be locked to prevent an internal grille from being separated from a guide vane, and thus a user may be prevented from injury due to components of the air cleaner, exposed to the outside, as the internal grille is arbitrarily separated irrespective of user intention.

According to the present invention, it may be possible to assemble and separate a cover panel using only a hook coupling structure provided on the housing and the cover without separate use of a magnet and other members, thereby reducing manufacturing costs and assembly costs.

According to the present invention, a photocatalyst module having a hollow shape in which a bypass hole is formed may be applied, and thus any part of air reaching the photocatalyst module may pass through a photocatalytic filter and another part may pass through the bypass hole. As such, according to the present invention, flow resistance of air due to the photocatalytic filter may be reduced, and reduction in dust collection performance of the filter due to the photocatalytic filter may be prevented.

BRIEF DESCRIPTION OF DRAWINGS

FIG. 1 is a schematic perspective view showing the configuration of an air cleaner according to a first embodiment of the present invention.

FIG. 2 is a block diagram for explaining a control system of the air cleaner shown in FIG. 1.

FIG. 3 is a cross-sectional view showing an air circulation structure of the air cleaner shown in FIG. 1.

FIG. 4 is a diagram showing the state in which an input and output module is rotated to be separated from a discharge grille.

FIGS. 5 and 6 are diagrams showing the state in which a discharge grille is separated from a housing.

FIG. 7 is a diagram showing the state in which a guide vane and an internal grille are separated from a housing.

FIG. 8 is a diagram for explaining a first target member and a first sensing member.

FIG. 9 is a diagram showing a coupling relationship between a driving motor and an insulated cover.

FIG. 10 is a diagram showing a coupling relationship between a blowing fan and an insulated cover.

FIG. 11 is a schematic diagram of a separation prevention member.

FIG. 12 is a diagram showing a state in which a separation prevention member is separated from a driving motor.

FIG. 13 is a diagram showing a state in which a blowing fan is separated from a driving motor.

FIG. 14 is a diagram showing a state in which a driving motor is separated from a housing.

FIG. 15 is a diagram showing a coupling relationship between a mounting part of a housing body and a hinge bracket.

FIG. 16 is a perspective view showing the state in which an input and output module is rotated by a predetermined reference angle to be separated from an accommodation groove of a discharge grille.

FIGS. 17 and 18 are schematic diagrams showing the configuration of a mounting part and a hinge bracket.

FIG. 19 is a perspective view showing the state in which a hinge part of an input and output module is hinged to a hinge bracket.

FIG. 20 is a cross-sectional view showing the state in which an input and output module is accommodated in an accommodation groove of a discharge grille.

FIGS. 21 and 22 are diagrams showing a concept of the state in which straight movement of an input and output module is guided by a support member of a housing when the input and output module is rotated.

FIG. 23 is a cross-sectional view showing the state in which an input and output module is rotated by a predetermined reference angle to be separated from an accommodation groove of a discharge grille.

FIG. 24 is a diagram showing a concept of the state in which an input and output module is supported by a support member of a housing when the input and output module is rotated by a predetermined angle.

FIG. 25 is a diagram for explaining a relationship between forces applied to the input and output module in FIG. 24.

FIG. 26 is a perspective view showing the state in which a guide vane, an internal grille, and a locking tab are separated from each other.

FIG. 27 is a partial enlarged view of FIG. 26.

FIG. 28 is a plan view showing the state in which a locking tab is separated from an internal grille.

FIG. 29 is a perspective view showing the state in which a guide vane and an internal grille are separated from a housing.

FIGS. 30 and 31 are diagrams for explaining a coupling relationship between a locking hook and a vane holder.

FIG. 32 is a perspective view of a locking tab viewed from above.

FIG. 33 is a perspective view of a locking tab viewed from below.

FIGS. 34 to 37 are diagrams for explaining a method of locking or unlocking an internal grille using a locking member.

FIG. 38 is a schematic perspective view showing the configuration of an air cleaner according to a second embodiment of the present invention.

FIG. 39 is a perspective view of an air cleaner showing the state in which a cover panel shown in FIG. 38 is separated.

FIG. 40 is a perspective view showing the cover panel shown in FIG. 38.

FIG. 41 is a front view of an air cleaner showing the state in which a cover panel is installed at a predetermined home position.

FIG. 42 is a diagram showing the case in which a holding hook is caught by and coupled to a holding hole in the air cleaner shown in FIG. 41.

FIG. 43 is a diagram showing the state in which a guide hook is inserted into a catch groove of a slide slot in the air cleaner shown in FIG. 41.

FIG. 44 is a diagram showing the state in which a first catch hook is caught by and coupled to a first hook hole in the air cleaner shown in FIG. 41.

FIG. 45 is a diagram showing the state in which a second catch hook is caught by and coupled to a second hook hole in the air cleaner shown in FIG. 41.

FIG. 46 is a diagram showing the state in which a detection rib is in contact with a switch in the air cleaner shown in FIG. 41.

FIG. 47 is a diagram showing the state in which a cover panel is disposed to obliquely hold a holding hook by a holding hole.

FIG. 48 is a diagram showing the state in which a holding hook is obliquely held by a holding hole in an air cleaner shown in FIG. 47.

FIG. 49 is a diagram showing a positional relationship between a slide slot and a guide hook in the air cleaner shown in FIG. 47.

FIG. 50 is a diagram showing the state in which a cover panel is disposed for a guide hook to be inserted into a slide groove of a slide slot.

FIGS. 51 and 52 are diagrams showing a positional relationship between a slide slot and a guide hook in an air cleaner shown in FIG. 50.

FIG. 53 is a diagram showing the state in which a cover panel is raised to prevent a peripheral surface of a hook hole from interfering with a catch hook.

FIG. 54 is a diagram showing a positional relationship between a slide slot and a guide hook in an air cleaner shown in FIG. 53.

FIG. 55 is a diagram showing a positional relationship between a second catch hook and a second hook hole in the air cleaner shown in FIG. 53.

FIG. 56 is a schematic perspective view of the configuration of an air cleaner according to a third embodiment of the present invention.

FIG. 57 is a cross-sectional view taken along line I-I of FIG. 56.

FIG. 58 is a partial sectional perspective view taken along line I-I of FIG. 56.

FIG. 59 is a perspective view showing the state in which a photocatalyst module is installed in a housing.

FIG. 60 is a partial cross-sectional view taken along line II-II of FIG. 59.

FIG. 61 is a perspective view of a photocatalyst module.

FIG. 62 is an exploded perspective view of a filter assembly shown in FIG. 61.

FIG. 63 is an exploded perspective view of the photocatalyst module shown in FIG. 61.

FIG. 64 is a partial enlarged view of a region X of FIG. 60.

FIG. 65 is a partial enlarged view of a region Y of FIG. 60.

FIG. 66 is a perspective view showing a bottom surface of a light emitter shown in FIG. 63.

FIG. 67 is a partial cross-sectional view showing the state in which a filter assembly is separated from a fixing bracket.

FIG. 68 is a partial enlarged view of FIG. 67.

FIG. 69 is a perspective view showing the state in which a photocatalyst module is separated from a housing.

FIG. 70 is a schematic perspective view of the configuration of an air cleaner according to a fourth embodiment of the present invention.

FIG. 71 is a block diagram for explaining a control system of the air cleaner shown in FIG. 70.

FIG. 72 is a diagram showing the state in which an input and output module is separated from a discharge grille.

FIG. 73 is a cross-sectional view showing a coupling relationship between a housing and an input and output module.

FIG. 74 is a diagram showing the state in which a first signal transceiver and a wireless power transmitter are installed in a housing.

FIG. 75 is a partial perspective view of a discharge grille and an input and output module viewed in downward direction.

FIG. 76 is a diagram showing the state in which a discharge grille is separated from a housing.

BEST MODE

Hereinafter, at least one embodiment of the present invention will be described in detail with reference to the accompanying drawings. In the following description, like reference numerals designate like elements although the elements are shown in different drawings. Further, in the following description of the at least one embodiment, a detailed description of known functions and configurations incorporated herein will be omitted for the purpose of clarity and for brevity.

Additionally, in describing the components of the present invention, terms like first, second, A, B, (a), and (b) are used. These are solely for the purpose of differentiating one component from another, and one of ordinary skill would understand the terms are not to imply or suggest the substance, order or sequence of the components. Unless otherwise defined, all terms including technical and scientific terms used herein have the same meaning as commonly understood by one of ordinary skill in the art to which the present invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a schematic perspective view showing the configuration of an air cleaner according to a first embodiment of the present invention, FIG. 2 is a block diagram for explaining a control system of the air cleaner shown in FIG. 1, FIG. 3 is a cross-sectional view showing an air circulation structure of the air cleaner shown in FIG. 1, and FIG. 4 is a diagram showing the state in which an input and output module is rotated to be separated from a discharge grille.

Referring to FIGS. 1 to 4, an air cleaner 1 according to an exemplary embodiment of the present invention may include a housing 110 having an internal flow path 111b formed therein, a cover panel 120 having absorption holes 122 formed therein to guide outside air A to the internal flow path 111b, a filter 130 for purifying the air A guided to the internal flow path 111b, a blower unit 140 for blowing the air A received in the internal flow path 111b along a predetermined flow path, a discharge unit 150 for discharging the air A blown by the blower unit 140 to the outside, an input and output module 160 for inputting and outputting information, a sensing unit 170 for sensing whether the discharge unit 150 is coupled to a predetermined position of the housing 110, and a controller 180 for controlling overall driving of the air cleaner 1.

The air cleaner 1 may be configured as a tower-type air cleaner that purifies the outside air A absorbed through the absorption holes 122 formed on at least one of a side surface or a lower surface of the housing 110 using the filter 130 and then discharges the purified air to the outside through discharge holes 152b formed in an upper surface of the housing 110, but is not limited thereto. Hereinafter, for convenience of description, the present invention will be described in terms of the case in which the air cleaner 1 is configured as a tower-type air cleaner.

First, the housing 110 may be a device for supporting and accommodating various components included in the air cleaner 1.

The configuration of the housing 110 is not particularly limited. For example, the housing 110 may include a housing body 111 configured to provide a support framework and space for installing various components, a hinge bracket 113 to which the input and output module 160 is rotatably coupled, and a support member 115 for supporting the input and output module 160 to rotate and move the input and output module 160 in a predetermined manner. Hereinafter, for convenience of description, the housing body 111 will be first described, and then the hinge bracket 113 and the support member 115 will be described together with a hinge part 164 of the input and output module 160 to be described below.

As shown in FIG. 3, the housing body 111 may include a first opening 111a that has one side opened to be connected to the outside, the internal flow path 111b formed inside the housing 110, and a second opening 111c that has the other side opened to be connected to the outside.

The first opening 111a may be formed to be opened through at least one of side and lower surfaces of the housing body 111. For example, as shown in FIGS. 3 and 4, the first opening 111a may be formed in the side surface of the housing body 111. The plurality of first openings 111a may be radially formed at a predetermined interval, but the present invention is not limited thereto. Through the first opening 111a, the air A that is absorbed from the outside through the cover panel 120 may flow into the internal flow path 111b through the first opening 111a.

As shown in FIG. 3, the internal flow path 111b may be formed inside the housing body 111 to connect the first opening 111a and the second opening 111c. Various components of the air cleaner 1, such as the filter 130 and the blower unit 140, may be installed in the internal flow path 111b. Through the internal flow path 111b, the air A flowing through the first opening 111a may be purified and blown by the filter 130 and the blower unit 140 and may then be delivered to the second opening 111c.

As shown in FIG. 3, the second opening 111c may be formed to be opened through an upper surface of the housing body 111. Through the second opening 111c, the air A that passes through the internal flow path 111b in the state of being purified and blown through the filter 130 and the blower unit 140 may be discharged to the outside through the discharge unit 150 coupled to the second opening 111c.

The cover panel 120 may be a device for delivering the outside air A to the first opening 111a of the housing body 111 while protecting the housing body 111 from the outside.

As shown in FIG. 4, the cover panel 120 may have a shape corresponding to an outer circumference of the housing body 111 to surround at least a portion of the housing body 111. The number of the cover panels 120 is not particularly limited, and at least one cover panel 120 may be provided. The cover panel 120 may be detachably installed on an external surface of the housing body 111 to cover the first opening 111a from the outside of the housing body 111.

The plurality of absorption holes 122 that has a predetermined size to allow the air A to pass therethrough may be formed in the cover panel 120 to be connected to the first opening 111a. Then, when a blowing fan 142 to be described below is rotated and driven, absorption force may be applied to the first opening 111a and the absorption holes 122 connected to the first opening 111a, and the air A absorbed from the outside by the absorption force may sequentially pass through the absorption holes 122 and the first opening 111a and may be delivered to the internal flow path 111b.

Then, the filter 130 may be a device for purifying the air A flowing into the internal flow path 111b.

The type of a filter to be used as the filter 130 is not particularly limited, and various types of dust collection filters for collecting and removing dust and other contaminants contained in the air A may be used as the filter 130. For example, the filter 130 may be a high efficiency particulate air (HEPA) filter or a charcoal filter.

The filter 130 may have a shape to be inserted into the internal flow path 111b to cover the first opening 111a inside the housing body 111. For example, when the internal flow path 111b has a cylindrical shape, the filter 130 may have a cylindrical shape having an outer diameter corresponding to an inner diameter of the internal flow path 111b. As shown in FIG. 3, through the filter 130, the air A flowing into the internal flow path 111b through the first opening 111a may inevitably pass through the filter 130.

Therethrough, the filter 130 may collect and remove contaminants contained in the air A flowing into the internal flow path 111b, and thus may purify the air A flowing into the internal flow path 111b.

Then, the blower unit 140 is a device for providing a flow force to forcibly flow the air A accommodated in the internal flow path 111b.

The configuration of the blower unit 140 is not particularly limited. For example, as shown in FIG. 3, the blower unit 140 may include the blowing fan 142 for blowing the air A accommodated in the internal flow path 111b, and a driving motor 144 for rotating and driving the blowing fan 142.

The blower unit 140 may be installed in the internal flow path 111b to be located close to the second opening 111c compared with the filter 130. For example, as shown in FIG. 3, when the air cleaner 1 is configured as a tower-type air cleaner, the blower unit 140 may be installed in the internal flow path 111b to be located above the filter 130. Here, the air cleaner 1 may further include a guide grille 90 installed in the internal flow path 111b to be located between the blower unit 140 and the filter 130 and configured to guide the air A passing through the filter 130 to the blower unit 140. By the guide grille 90, the internal flow path 111b may be divided into a first internal flow path 111d in which the filter 130 is accommodated, and a second internal flow path 111e in which the blower unit 140, the discharge unit 150, etc. are accommodated.

The type of a fan to be used as the blowing fan 142 is not particularly limited. For example, the blowing fan 142 may be configure as a turbo fan that radially discharges the air A absorbed in an axial direction.

As shown in FIG. 3, the blowing fan 142 may include a plurality of blades 142a, and guide plates 142c and 142d that radially discharge the air A blown by the blades 142a based on a central part of the blowing fan 142

The number of the guide plates 142c and 142d is not particularly limited. For example, as shown in FIG. 3, the blowing fan 142 may include a first guide plate 142c for covering an upper side of the blades 142a, and a second guide plate 142d for covering a lower side of the blades 142a. The first guide plate 142c and the second guide plate 142d may have an inclination structure, which is inclined toward the second opening 111c, toward an inner circumference of the internal flow path 111b, but the present invention is not limited thereto.

As shown in FIG. 3, the second internal flow path 111e may include a first guide surface 111f formed on the inner circumference thereof to guide the air A passing through the guide grille 90 to the blades 142a, and a second guide surface 111g formed on the inner circumference to guide the air A blown by the blowing fan 142 to the second opening 111c. The first guide surface 111f may be formed between the guide grille 90 and the blowing fan 142 and may have an inclination structure inclined close to a central part of the blowing fan 142 toward the second opening 111c. In response thereto, the second guide surface 111g may be formed between the guide grille 90 and a guide vane 154 to surround at least a portion of the first guide surface 111f and the blowing fan 142 and may have an inclination structure inclined to be spaced apart from the central part of the blowing fan 142 toward the second opening 111c.

The driving motor 144 may be positioned between the blowing fan 142 and the first opening 111a, that is, between the blowing fan 142 and the filter 130, and may be installed in the internal flow path 111b in such a way that a shaft 144a protrudes toward the second opening 111c. When the blowing fan 142 is viewed from the second opening 111c, the driving motor 144 may have a smaller area than the blowing fan 142 to be hidden by the blowing fan 142. The shaft 144a may be shaft-coupled to a shaft hole 142b formed in the central part of the blowing fan 142 to provide driving force to the blowing fan 142.

The driving motor 144 may rotate and drive the blowing fan 142 in a predetermined direction to forcibly flow the air A accommodated in the internal flow path 111b toward the second opening 111c from the first opening 111a. Then, absorption force for absorbing the outside air A may be applied to the absorption holes 122 connected to the first opening 111a and the first opening 111a, and the air A blown by the blowing fan 142 may be blown toward the second opening 111c and may then be discharged to the outside through the discharge unit 150. As such, the blowing fan 142 may forcibly circulate the air A between the air cleaner 1 and an indoor space in which the air cleaner 1 is installed.

The blower unit 140 will be described below in more detail.

Then, the discharge unit 150 is a device for discharging the air A blown by the blowing fan 142 to the outside.

The configuration of the discharge unit 150 is not particularly limited. For example, as shown in FIG. 3, the discharge unit 150 may include a discharge grille 152, the guide vane 154, and an internal grille 156.

The discharge grille 152 may be provided to prevent contaminants and other liquid or solid external objects from flowing into the internal flow path 111b through the second opening 111c while discharging the air A that has reached the second opening 111c to the outside.

The guide vane 154 may be provided to deliver the air A blown by the blowing fan 142 to the discharge grille 152 in a predetermined manner.

The internal grille 156 may be provided to assist the discharge grille 152 by preventing residual substances of external objects that have not been blocked by the discharge grille 152 and have passed through the discharge grille 152 from flowing into the internal flow path 111b.

The discharge unit 150 will be described below in more detail.

Then, the input and output module 160 is a device for inputting and outputting various pieces of information.

The input and output module 160 may be disposed in the state of being accommodated in the discharge grille 152 when the air A is purified using the air cleaner 1, and may be provided to be separated from the discharge grille 152 when components installed in the internal flow path 111*b* need to be cleaned or replaced, or other reasons that require opening of the second opening 111*c* occur. For example, as shown in FIGS. 1 and 4, the input and output module 160 may be rotatably hinged to the housing body 111 to be accommodated on the discharge grille 152 or to be separated from the discharge grille 152. Then, when the air A is purified using the air cleaner 1, the input and output module 160 may be stored in the state of being accommodated on the discharge grille 152, and may be separated from the discharge grille 152 not to interfere with the discharge grille 152 when the second opening 111*c* needs to be opened.

As shown in FIG. 4, in order to protect the input and output module 160 from the outside, the discharge grille 152 may have an accommodation groove 152*a* that is concave in an upper surface thereof for the input and output module 160 to be inserted and accommodated thereinto. The shape of the accommodation groove 152*a* is not particularly limited, and the accommodation groove 152*a* may have a shape corresponding to the shape of the input and output module 160 to surround an outer circumference of the input and output module 160 inserted into and accommodated in the corresponding accommodation groove 152*a*.

The configuration of the input and output module 160 is not particularly limited. For example, as shown in FIGS. 2 and 3, the input and output module 160 may include a module body 161 provided to be accommodated in the accommodation groove 152*a*, an input member 162 for inputting information, an output member 163 for outputting information, and the hinge part 164 that is rotatably hinged to the hinge bracket 113 of the housing 110 to be described below to form a predetermined angle with the module body 161.

The configuration of the input member 162 is not particularly limited. For example, the input member 162 may include at least one button and a touchscreen. The input member 162 may be installed in the module body 161, but is not limited thereto.

Information to be input using the input member 162 is not particularly limited. For example, the input member 162 may be provided to input a manipulation signal for manipulating the air cleaner 1 and various other pieces of information. Thus, the controller 180 may control driving of the air cleaner 1 based on the manipulation signal and other information transferred from the input member 162.

The configuration of the output member 163 is not particularly limited. For example, the output member 163 may include a display for outputting information in the form of an image and a speaker for outputting information in the form of voice. In particular, when the input member 162 is a touchscreen, the input member 162 and the output member 163 may be integrally provided with each other, but the present invention is not limited thereto. The output member 163 may be installed in the module body 161, but the present invention is not limited thereto.

Information to be output using the output member 163 is not particularly limited. For example, the output member 163 may be provided to output information on a driving state of the air cleaner 1, information on an indoor environment in which the air cleaner 1 is installed, and various other pieces of information.

The output member 163 may output information input by the input member 162, information received from the controller 180, and information received from an external device in the form of an image or voice.

The aforementioned hinge part 164 will be described below in detail.

The sensing unit 170 is a device for sensing whether the second opening 111*c* of the housing body 111 is opened.

A method of sensing whether the second opening 111*c* is opened is not particularly limited. For example, the sensing unit 170 may be provided to sense at least one of whether the discharge unit 150 is coupled to the second opening 111*c*, or whether the input and output module 160 is accommodated in the accommodation groove 152*a* of the discharge grille 152.

To this end, as shown in FIG. 2, the sensing unit 170 may include a first target member 172 installed at a predetermined position of any one of the housing body 111 and the discharge unit 150, a first sensing member 174 installed at a predetermined position of the other one of the housing body 111 and the discharge unit 150 and configured to detect the first target member 172, a second target member 176 installed at a predetermined position of any one of the discharge unit 150 and the module body 161, and a second sensing member 178 installed at a predetermined position of the other one of the discharge unit 150 and the module body 161 and configured to detect the second target member 176.

The controller 180 may determine an installation state of the discharge unit 150 and the input and output module 160 based on signals transferred from the first sensing member 174 and the second sensing member 178.

For example, when the first sensing member 174 detects the first target member 172, the controller 180 may determine that the discharge unit 150 is coupled to a predetermined reference position of the second opening 111*c*, and when the first sensing member 174 does not detect the first target member 172, the controller 180 may determine that the discharge unit 150 is separated from the predetermined reference position of the second opening 111*c*.

For example, when the second sensing member 178 detects the second target member 176, the controller 180 may determine that the input and output module 160 is accommodated at a predetermined reference position of the accommodation groove 152*a*, and when the second sensing member 178 does not detect the second target member 176, the controller 180 may determine that the input and output module 160 is separated from the predetermined reference position of the accommodation groove 152*a*.

The controller 180 may control driving of the air cleaner 1 based on an installation state of the discharge unit 150 and the input and output module 160.

For example, when determining that the discharge unit 150 is separated from the predetermined reference position of the second opening 111*c*, the controller 180 may stop driving of the driving motor 144 and various other electrical parts installed in the internal flow path 111*b* or may block supply of power to the electrical parts.

Then, safety accidents such as injury or electric shock by other electrical parts may be prevented when the user's hand, a cleaning tool, or a repair tool is inserted into the internal flow path 111*b* through the second opening 111*c* opened as the discharge unit 150 is separated.

For example, when determining that the input and output module 160 is separated from the predetermined reference position of the accommodation groove 152*a*, the controller 180 may stop driving of the driving motor 144 and various other electrical parts installed in the internal flow path 111*b* or may block supply of power to the electrical parts.

As described above, when the air A is purified using the air cleaner 1 and the air cleaner 1 is generally used, the input and output module 160 may be used in the accommodation groove 152a in the state of being accommodated therein. However, as such, in the state in which the input and output module 160 is accommodated in the accommodation groove 152a, the discharge unit 150 may not be separated from the second opening 111c due to interference with the input and output module 160. Thus, an operation of separating the input and output module 160 from the accommodation groove 152a in order to prevent interference of the input and output module 160 with the discharge unit 150 may be likely to be interpreted as a preceding operation for separating the discharge unit 150 from the second opening 111c. Thus, when determining that the input and output module 160 is separated from the accommodation groove 152a, the controller 180 may stop driving of the driving motor 144 and various other electrical parts installed in the internal flow path 111b or may block supply of power to the electrical parts.

As described above, in the air cleaner 1, the input and output module 160 may be rotatably hinged to the housing body 111. In order to clean the internal flow path 111b and the blowing fan 142 or other components (hereinafter referred to as "internal components") installed in the internal flow path 111b or to repair or replace the internal components using the air cleaner 1, the internal flow path 111b and the internal components may be exposed to the outside through the second opening 111c by separating the discharge unit 150 from the second opening 111c in the state in which the input and output module 160 is separated from the discharge grille 152.

However, when the second opening 111c is used, a distance between a main work area of the internal flow path 111b, which requires work such as cleaning, repair, or replacement (hereinafter referred to as "other cleaning work") and the outside may be relatively short, and the number of internal components between the main work area and the outside may be relatively small. The second opening 111c may be positioned in an upper surface of the housing body 111, and the first opening 111a may be positioned in a side or lower surface of the housing body 111, and thus when a user approaches the main work area through the second opening 111c, the user may approach the main work area in a relatively comfortable position as compared with the case in which the user approaches the main work area through the first opening 111a. Thus, the user may insert the user's hand, a cleaning tool, or various tools into the main work area of the internal flow path 111b in a comfortable position without interference with internal components through the second opening 111c instead of the first opening 111a, and thus may easily perform other cleaning work.

When the second opening 111c is opened or is predicted to be opened, the air cleaner 1 may stop driving of electrical parts installed in the internal flow path 111b or may block supply of power to the electrical parts. As such, the air cleaner 1 may prevent safety accidents such as injury or electric shock by the electrical parts from occurring in a user during other cleaning work.

FIGS. 5 and 6 are diagrams showing the state in which a discharge grille is separated from a housing.

As shown in FIGS. 5 and 6, the discharge grille 152 may have a shape corresponding to the second opening 111c to be detachably fitted into the second opening 111c. The discharge grille 152 may include the accommodation groove 152a formed to be concave to detachably accommodate the module body 161 of the input and output module 160, the plurality of discharge holes 152b formed to allow the air A blown to the second opening 111c by the blowing fan 142 to pass through the discharge holes 152b, a through hole 152c formed through the discharge grille 152 for at least a portion of the hinge part 164 of the input and output module 160 to be described below to be inserted into the through hole 152c, and a first sensing groove 152d formed to be concave for a sensing block 165 of the input and output module 160 to be described below to be inserted into the first sensing groove 152d.

As shown in FIG. 6, the accommodation groove 152a may extend in a radial direction of the discharge grille 152 from the central part of the discharge grille 152 to an outer side and may be formed to be concave in a thickness direction of the discharge grille 152 in the upper surface of the discharge grille 152 to be opened toward the upper side of the air cleaner 1.

As shown in FIG. 6, the discharge holes 152b may be formed through the discharge grille 152 in a thickness direction thereof and may have a predetermined size to allow the air A to pass therethrough and to prevent passage of external objects that may damage the internal components. The discharge holes 152b may be radially formed based on the accommodation groove 152a, but the present invention is not limited thereto. The discharge holes 152b may discharge the air A blown to the second opening 111c by the blowing fan 142 to the outside and may prevent external objects that may damage the internal components from flowing into the internal flow path 111b through the discharge holes 152b.

As shown in FIG. 6, the through hole 152c may be formed through a bottom surface of the accommodation groove 152a in a thickness direction of the discharge grille 152. The through hole 152c may be formed in the outermost part of the accommodation groove 152a, but the present invention is not limited thereto. The through hole 152c may have a predetermined size to allow the hinge part 164 of the input and output module 160, a support 113f of the hinge bracket 113 to be described below, etc. to pass through the through hole 152c. At least a portion of the hinge part 164 and the support 113f may be inserted into the through hole 152c to be drawn out therefrom.

As shown in FIG. 6, the first sensing groove 152d may be formed to be concave in the bottom surface of the accommodation groove 152a in the thickness direction of the discharge grille 152 to have a shape corresponding to the sensing block 165 of the input and output module 160 to be described below. The sensing block 165 of the input and output module 160 may be inserted into the first sensing groove 152d when the input and output module 160 is accommodated in the accommodation groove 152a.

FIG. 7 is a diagram showing the state in which a guide vane and an internal grille are separated from a housing, and FIG. 8 is a diagram for explaining a first target member and a first sensing member.

As shown in FIG. 7, each of the guide vane 154 and the internal grille 156 may have a shape corresponding to the second opening 111c to be detachably fitted into the second opening 111c. The guide vane 154 and the internal grille 156 may be coupled to each other through a bolt or other fixing members, but the present invention is not limited thereto.

The guide vane 154 may include a guide plate 154a provided on a central part to guide the air A blown by the blowing fan 142 to an outer side of the guide vane 154, and a plurality of vane wings 154b provided at the outer side of the guide vane 154 to guide the air A blown by the blowing fan 142 to through holes 156a of the internal grille 156 to be described below.

The internal grille 156 may include the plurality of the through holes 156a formed therethrough in a thickness direction of the internal grille 156 to allow the air A guided by the guide vane 154 to pass through the through holes 156a, a handle 156b for gripping the internal grille 156, and a second sensing groove 156c formed to be concave for the first sensing groove 152d of the discharge grille 152 to be inserted into the second sensing groove 156c.

The through holes 156a may be formed to have a small size compared with the discharge holes 152b. As such, the internal grille 156 may be provided to assist the discharge grille 152 by preventing external objects that have not been blocked by the discharge grille 152 and have passed through the discharge grille 152 from flowing into the internal flow path 111b.

The handle 156b may be formed on the central part of the internal grille 156 not to face the guide vane 154, but the present invention is not limited thereto.

As shown in FIG. 7, the second target member 176 of the aforementioned sensing unit 170 may be inserted into the second sensing groove 156c. The configuration of the second target member 176 is not particularly limited. For example, the second target member 176 may be configured as a permanent magnet. The second target member 176 will be described below in detail together with the second sensing member 178.

As shown in FIG. 8, the guide vane 154 or the internal grille 156 may further include an insert groove 154c formed for the first target member 172 of the sensing unit 170 to be inserted thereinto. A position at which the insert groove 154c is formed is not particularly limited. For example, the insert groove 154c may be formed at the outer side of the guide vane 154 or the internal grille 156 to be in contact with an inner circumference of the internal flow path 111b when the guide vane 154 or the internal grille 156 is coupled to a predetermined reference position of the second opening 111c. The configuration of the first target member 172 is not particularly limited. For example, the first target member 172 may be configured as a permanent magnet.

As shown in FIG. 8, the housing body 111 may further include an insert groove 111h formed for the first sensing member 174 of the sensing unit 170 to be inserted thereinto. A position at which the insert groove 111h is formed is not particularly limited. For example, the insert groove 111h may be formed in the outer circumference of the housing body 111 to face the insert groove 154c to across a wall of the housing body 111 therebetween when the guide vane 154 or the internal grille 156 is coupled to the predetermined reference position of the second opening 111c.

The first sensing member 174 may be configured to sense the first target member 172 when the guide vane 154 or the internal grille 156 is coupled to the predetermined reference position of the second opening 111c. For example, when the first target member 172 is configured as a permanent magnet, the first sensing member 174 may be configured as a magnetic switch for detecting the first target member 172. Upon detecting the first target member 172, the first sensing member 174 may output a detection signal, and the controller 180 may determine whether the guide vane 154 or the internal grille 156 is coupled to the predetermined reference position of the second opening 111c based on the detection signal output from the first sensing member 174.

Although the case in which the insert groove 154c is formed in the guide vane 154 or the internal grille 156 has been described above, the present invention is not limited thereto. That is, the insert groove 154c may also be formed in the discharge grille 152.

FIG. 9 is a diagram showing a coupling relationship between a driving motor and an insulated cover, FIG. 10 is a diagram showing a coupling relationship between a blowing fan and an insulated cover, and FIG. 11 is a schematic diagram of a separation prevention member.

FIG. 12 is a diagram showing a state in which a separation prevention member is separated from a driving motor, FIG. 13 is a diagram showing a state in which a blowing fan is separated from a driving motor, and FIG. 14 is a diagram showing a state in which a driving motor is separated from a housing.

As shown in FIG. 9, the driving motor 144 may include the shaft 144a that is rotated and driven in a predetermined forward direction or in an opposite direction to the forward direction, and an alignment rib 144b provided to be coupled to an alignment groove 114b of a motor bracket 114 to be described below.

As shown in FIGS. 9 to 11, the blower unit 140 may include an insulated cover 146 that is shaft-coupled to the shaft 144a to be rotated and driven along the shaft 144a of the driving motor 144, has at least a portion formed of an insulator, and is shaft-coupled to the shaft hole 142b of the blowing fan 142, and a separation prevention member 148 that is detachably coupled to an end of the insulated cover 146 formed through the shaft hole 142b and supports the blowing fan 142 to prevent the blowing fan 142 from being separated from the insulated cover 146.

In general, a shaft of a motor may be formed of metal, or other conductors having conductivity. Thus, if the user comes into contact with the shaft 144a when performing other cleaning work on the internal flow path 111b and the internal components, there is a risk of electric shock.

To overcome this, the insulated cover 146 may be shaft-coupled to the shaft 144a to surround at least a portion of the shaft 144a of the driving motor 144. For example, as shown in FIG. 9, the insulated cover 146 may be provided to surround an end of the shaft 144a, which protrudes out of a case of the driving motor 144. The insulated cover 146 may be coupled to the outside of the end of the shaft 144a, which is exposed to the outside and may block the shaft 144a from being exposed to the outside, and accordingly, the user may be prevented from being electrocuted by the shaft 144a during other cleaning work on the internal flow path 111b and the internal components.

The insulated cover 146 may have an outer shape corresponding to an inner shape of the shaft hole 142b of the blowing fan 142. Thus, as shown in FIG. 10, the insulated cover 146 may be inserted into the shaft hole 142b to be shaft-coupled to the shaft hole 142b. As such, the blowing fan 142 may be rotated and driven along the shaft 144a of the driving motor 144 using the insulated cover 146 as a medium.

The insulated cover 146 may have a predetermined length to allow an end thereof to protrude toward the second opening 111c through the shaft hole 142b. The insulated cover 146 may have a first thread 146a formed on an outer circumference thereof.

Although the case in which the insulated cover 146 formed of an insulator material is shaft-coupled to a shaft 142a to prevent a user from being electrocuted has been described above, the present invention is not limited thereto. That is, the insulated cover 146 may be omitted, and instead, at least a portion of the shaft 142a may be formed of an insulator material. Hereinafter, the present invention will be described in terms of the case in which the insulated cover 146 is installed.

The separation prevention member 148 may be provided to be coupled to the end of the insulated cover 146 formed through the shaft hole 142b. For example, as shown in FIG. 11, the separation prevention member 148 may include an insert hole 148a into which an end of the insulated cover 146, positioned through the shaft hole 142b, is inserted, and a second thread 148b formed on the inner circumference of the insert hole 148a to be screwed to the first thread 146a of the insulated cover 146. Thus, the separation prevention member 148 may be coupled to the end of the insulated cover 146, positioned through the shaft hole 142b, through screw connection between the first thread 146a and the second thread 148b, and thus may support the blowing fan 142 to prevent the blowing fan 142 from being separated from the insulated cover 146 (refer to FIG. 7).

As described above, as the blower unit 140 is provided, the driving motor 144 may be disposed at a predetermined position of the internal flow path 111b by being mounted on the motor bracket 114 to be described below, the insulated cover 146 may be shaft-coupled to the shaft 144a of the driving motor 144, the blowing fan 142 may be coupled to the driving motor 144 for the insulated cover 146 to be inserted into the shaft hole 142b, and the separation prevention member 148 may be coupled to the end of the insulated cover 146, positioned through the shaft hole 142b.

The blower unit 140 may be exposed to the outside through the second opening 111c when the discharge unit 150 is separated from the second opening 111c to open the internal flow path 111b. Thus, the user may separate the discharge unit 150 from the second opening 111c and may then perform cleaning in the state in which the blower unit 140 is fixedly installed on the housing body 111 or may repair and replace components included in the blower unit 140 in the state in which the blower unit 140 is separated from the housing body 111.

Hereinafter, a method of separating the blower unit 140 from the housing body 111 will be described with reference to drawings.

First, as shown in FIG. 12, the separation prevention member 148 may be separated from the end of the insulated cover 146, positioned through an end of the shaft hole 142b, by rotating the separation prevention member 148 in a predetermined direction to release screw connection between the first thread 146a and the second thread 148b.

Then, as shown in FIG. 13, the blowing fan 142 may be separated from the driving motor 144 by raising the blowing fan 142 toward the second opening 111c to draw out the insulated cover 146 from the shaft hole 142b. Here, the blowing fan 142 may be provided to be drawn to the outside through the second opening 111c. For example, the blowing fan 142 may be provided to have a smaller diameter than an inner diameter of the internal flow path 111b and an inner diameter of the second opening 111c.

Then, as shown in FIG. 14, the driving motor 144 may be separated from the motor bracket 114 by manipulating a bolt or other fixing members for coupling the driving motor 144 to the motor bracket 114 of the housing body 111.

As shown in FIG. 14, the motor bracket 114 may include a plurality of coupling ribs 114a coupled to the inner circumference of the internal flow path 111b to fixedly install the motor bracket 114 at a predetermined position on the internal flow path 111b, the alignment groove 114b formed to be concave in any one of the coupling ribs 114a for the alignment rib 144b of the driving motor 144 to be inserted thereinto, and at least one bolt hole (not shown) for screwing the driving motor 144 and the motor bracket 114. By the motor bracket 114, the driving motor 144 may be fixedly installed at a predetermined position of the internal flow path 111b by fixing the driving motor 144 to the motor bracket 114 using a bolt and other fixing members in the state in which the driving motor 144 is accommodated on the motor bracket 114 in a predetermined alignment form for the alignment rib 144b to be inserted into the alignment groove 114b, and thus the driving motor 144 may be fixedly installed at a predetermined position of the internal flow path 111b.

FIG. 15 is a diagram showing a coupling relationship between a mounting part of a housing body and a hinge bracket, FIG. 16 is a perspective view showing the state in which an input and output module is rotated by a predetermined reference angle to be separated from an accommodation groove of a discharge grille, FIGS. 17 and 18 are schematic diagrams showing the configuration of a mounting part and a hinge bracket, and FIG. 19 is a perspective view showing the state in which a hinge part of an input and output module is hinged to a hinge bracket.

As described above, the input and output module 160 may be rotatably hinged to the housing 110. However, when the hinge coupling structure of the input and output module 160 and the housing 110 is exposed to the outside in the state in which the air A is purified using the air cleaner 1 and the air cleaner 1 is generally used, the hinge coupling structure may be damaged or the aesthetics of the air cleaner 1 may be adversely affected. To overcome this, the hinge coupling structure may not be exposed to the outside when the air cleaner 1 is generally used, and the hinge coupling structure may be limitedly exposed to the outside only when the input and output module 160 is rotated to open the second opening 111c.

Hereinafter, with reference to drawings, a method of hinging the input and output module 160 and the housing 110 to limitedly expose the hinge coupling structure to the outside only when the input and output module 160 is rotated to be separated from the accommodation groove 152a of the discharge grille 152 will be described. For convenience of description, the position of the input and output module 160 disposed to be accommodated in the accommodation groove 152a of the discharge grille 152 may be referred to as a "first reference position", and the position of the input and output module 160 that is rotated by a predetermined angle in a predetermined direction at the first reference position not to interfere with the discharge grille 152 may be referred to as a "second reference position".

The housing body 111 may further include a mounting part 111i on which the hinge bracket 113 is moveably installed in a predetermined direction. In response thereto, the housing 110 may further include an elastic member 117 for elastically supporting the hinge bracket 113.

First, the mounting part 111i may be provided on a wall of the housing body 111 to be spaced apart from the second opening 111c by a predetermined interval. For example, as shown in FIG. 15, when the second opening 111c is formed in the upper surface of the housing body 111, the mounting part 111i may be provided on the wall of the housing body 111 to surround the internal flow path 111b to be spaced apart from the second opening 111c by a predetermined interval toward a lower surface opposite to an upper surface of the housing body 111. As shown in FIG. 16, the through hole 152c of the discharge grille 152 may be formed in an outer side of the accommodation groove 152a, that is, in an outer side of the discharge grille 152 to face the mounting part 111*i* and the hinge bracket 113 installed on the mounting part 111*i*.

The mounting part 111*i* may include a guide groove 111*j* formed to be concave in an external surface, and a stopper 111*k* formed to protrude from the external surface.

As shown in FIG. 15, the guide groove 111*j* may extend on the external surface of the mounting part 111*i* in a height direction of the housing body 111. That is, the guide groove 111*j* may extend on the external surface of the mounting part 111*i* from an upper surface of the housing body 111 toward a lower surface. The number of the formed guide grooves 111*j* is not particularly limited, and at least one guide groove 111*j* may be formed at a predetermined interval.

As shown in FIGS. 17 and 18, the stopper 111*k* may protrude from the external surface of the mounting part 111*i* to have a predetermined height. The number of the formed stoppers 111*k* is not particularly limited, and at least one stopper 111*k* may be formed at a predetermined interval.

Then, the hinge bracket 113 may include one pair of parts of a bracket body 113*a* that is moveably installed on the mounting part 111*i* in the height direction of the housing body 111, and a bracket cover 113*b* that is detachably coupled to the bracket body 113*a* to cover at least a portion of the bracket body 113*a*.

The hinge bracket 113 may include a first coupling hole 113*c* and a second coupling hole 113*d* to which a hinge pin 164*b* of the hinge part 164 to be described below is coupled, a guide rail 113*e* that is slidably installed in the guide groove 111*j* of the mounting part 111*i*, the support 113*f* that supports the input and output module 160 not to rotate the input and output module 160 in another direction opposite to the one direction when the input and output module 160 is disposed at the second reference position, and a guide slit 113*g* into which the stopper 111*k* of the mounting part 111*i* is moveably inserted.

The first coupling hole 113*c* may be provided to couple one end 164*e* of the hinge pin 164*b* thereto, and the second coupling hole 113*d* may be provided to couple the other end 164*f* of the hinge pin 164*b*, opposite to the one end 164*e*.

As shown in FIGS. 17 and 19, any part of the first coupling hole 113*c* may be formed in the bracket body 113*a*, and the remaining part of the first coupling hole 113*c* may be formed in the bracket cover 113*b* to be matched with the part of the first coupling hole 113*c*. The first coupling hole 113*c* may have a shape corresponding to the one end 164*e* of the hinge pin 164*b* to fit the one end 164*e* of the hinge pin 164*b* thereinto. For example, when the one end 164*e* of the hinge pin 164*b* has a polygonal shape, the first coupling hole 113*c* may have a polygonal shape in response thereto.

As shown in FIGS. 17 and 19, any part of the second coupling hole 113*d* may be formed in the bracket body 113*a*, and the remaining part of the second coupling hole 113*d* may be formed in the bracket cover 113*b* to be matched with the part of the second coupling hole 113*d*. The second coupling hole 113*d* may have a shape corresponding to the other end 164*f* of the hinge pin 164*b* to fit the other end 164*f* of the hinge pin 164*b* thereinto. For example, when the other end 164*f* of the hinge pin 164*b* has a curved shape, the second coupling hole 113*d* may have a curved shape in response thereto.

As shown in FIG. 15, the guide rail 113*e* may extend in the height direction of the housing body 111 on one surface of the bracket body 113*a*, which faces the external surface of the mounting part 111*i*. The guide rail 113*e* may be slidably coupled to the guide groove 111*j* of the mounting part 111*i* in the height direction of the housing body 111.

That is, the guide rail 113*e* may be slidably coupled to the guide groove 111*j* of the mounting part 111*i* toward the upper surface or the lower surface of the housing body 111. By the guide rail 113*e*, the input and output module 160 hinged to the hinge bracket 113 and the hinge bracket 113 may be moved in the height direction of the housing body 111 along the guide groove 111*j*.

Although the case in which the guide groove 111*j* is formed in the mounting part 111*i* and the guide rail 113*e* is formed on the bracket body 113*a* has been described above, the present invention is not limited thereto. That is, the guide groove 111*j* may be formed in the bracket body 113*a* and the guide rail 113*e* may be formed on the mounting part 111*i*.

As shown in FIG. 15, the support 113*f* may accommodate at least a portion of the hinge part 164 and may be provided on the bracket body 113*a* to support the input and output module 160 disposed at the second reference position not to rotate the input and output module 160 toward the first reference position. In response thereto, as shown in FIG. 15, the mounting part 111*i* may further include an accommodation part 111*l* protruding from an internal surface of the mounting part 111*i* to accommodate the support 113*f* and the hinge part 164.

The accommodation part 111*l* may be provided to support the support 113*f* when the input and output module 160 is disposed at the first reference position. To this end, when the input and output module 160 is disposed at the first reference position, the accommodation part 111*l* may include an accommodation groove 111*m* that is concave in an external surface to accommodate and support the support 113*f*. Here, the internal surface of the mounting part 111*i* may refer to one surface of the mounting part 111*i*, which is directed toward the internal flow path 111*b*, and the external surface of the accommodation part 111*l* may refer to one surface of the accommodation part 111*l*, which is directed toward the hinge bracket 113. The support 113*f* will be described below in detail.

As shown in FIGS. 17 and 18, the guide slit 113*g* may be provided to slidably move the stopper 111*k* of the mounting part 111*i* in the height direction of the housing body 111. When the number of the formed guide slits 113*g* is not particularly limited, at least one guide slit 113*g* may be formed for any one of the stoppers 111*k* to be inserted thereinto.

The guide slit 113*g* may have a predetermined length to support the stopper 111*k* on an upper surface of the guide slit 113*g* when the hinge bracket 113 and the input and output module 160 are positioned at a predetermined lowest height and to support the stopper 111*k* on a lower surface of the guide slit 113*g* when the hinge bracket 113 and the input and output module 160 are positioned at a predetermined highest height. As such, the stopper 111*k* and the guide slit 113*g* may limit a driving distance of the hinge bracket 113 and the input and output module 160 to straightly move the hinge bracket 113 and the input and output module 160 up and down only within the predetermined lowest height and the highest height.

The elastic member 117 may be provided to elastically bias the hinge bracket 113 toward the lower side of the housing body 111.

A type of a member to be used as the elastic member 117 is not particularly limited. For example, the elastic member 117 may include a tension spring. To install the elastic member 117, the mounting part 111*i* may further include a first catch protrusion 111*n* by which one end of the elastic member 117 is caught, and the hinge bracket 113 may further include a second catch protrusion 113*h* that is spaced apart from the first catch protrusion 111n in the height direction of the housing body 111 and by which the other end of the elastic member 117, opposite to the one end, is caught.

As such, as the elastic member 117 is installed, the hinge bracket 113 may be elastically biased toward the lower side of the housing body 111 by the elastic member 117.

FIG. 20 is a cross-sectional view showing the state in which an input and output module is accommodated in an accommodation groove of a discharge grille, and FIGS. 21 and 22 are diagrams showing a concept of the state in which straight movement of an input and output module is guided by a support member of a housing when the input and output module is rotated.

FIG. 23 is a cross-sectional view showing the state in which an input and output module is rotated by a predetermined reference angle to be separated from an accommodation groove of a discharge grille, FIG. 24 is a diagram showing a concept of the state in which an input and output module is supported by a support member of a housing when the input and output module is rotated by a predetermined angle, and FIG. 25 is a diagram for explaining a relationship between forces applied to the input and output module in FIG. 24.

As shown in FIG. 20, the input and output module 160 may further include the sensing block 165 in which the second sensing member 178 of the sensing unit 170 is installed, and a guide surface 166 that guides straight movement of the input and output module 160 when the input and output module 160 is rotated.

The hinge part 164 may include a pin hole 164a, the hinge pin 164b rotatably coupled to the pin hole 164a, and an insert groove 164c that is concave into the hinge part 164.

The pin hole 164a may be formed through the hinge part 164 in a horizontal direction of the input and output module 160. In response thereto, the hinge pin 164b may be rotatably inserted into the pin hole 164a. The hinge pin 164b may have a predetermined length in such a way that each of both ends 164e and 164f protrudes out of the pin hole 164a. The both ends 164e and 164f of the hinge pin 164b may be fitted into the first coupling hole 113c and the second coupling hole 113d of the aforementioned hinge bracket 113, respectively. Thus, the input and output module 160 may be rotated around the hinge pin 164b.

As shown in FIG. 20, the insert groove 164c may be concave into the hinge part 164 to be opened toward the support member 115 when the input and output module 160 is disposed at the first reference position. The bracket cover 113b may include a first catch surface 113i, at least a portion of which is inserted into the insert groove 164c. In response thereto, as shown in FIG. 21, the hinge part 164 may further include a second catch surface 164d formed on an external surface thereto to be caught by the first catch surface 113i when the input and output module 160 is disposed at the second reference position.

The insert groove 164c may have a predetermined depth to prevent an inner circumference of the insert groove 164c and the first catch surface 113i from colliding with each other when the input and output module 160 is disposed at the first reference position. As such, the insert groove 164c may prevent the inner circumference of the insert groove 164c and the first catch surface 113i from colliding with each other and prevent the hinge part 164 and the hinge bracket 113 from being damaged.

A specific region of the external surface of the hinge part 164, which is in contact with the first catch surface 113i when the input and output module 160 is rotated between the first reference position and the second reference position, may have a curved shape having a predetermined curvature to slide along the first catch surface 113i.

As described above, the second reference position may be the position of the input and output module 160 when the input and output module 160 is rotated by a predetermined reference angle in one predetermined direction based on the first reference position. Here, the reference angle is not particularly limited. For example, the reference angle may be 90°. Then, the second reference position may indicate the state in which the input and output module 160 is positioned upright to be perpendicular to the discharge grille 152. In this case, as shown in FIG. 23, the first catch surface 113i and the second catch surface 164d may be formed to be caught by each other when the input and output module 160 is rotated by 90° at the first reference position and is disposed at the second reference position. As such, the first catch surface 113i and the second catch surface 164d may function as a stopper for limiting a rotation angle of the input and output module 160 to prevent the input and output module 160 from being excessively rotated by an angle greater than a reference angle.

The sensing block 165 may protrude from the lower surface of the module body 161 to be inserted into the first sensing groove 152d of the discharge grille 152 when the input and output module 160 is disposed at the first reference position. As shown in FIG. 20, the second sensing member 178 for detecting the second target member 176 inserted into the second sensing groove 156c of the internal grille 156 may be installed inside the sensing block 165.

The configuration of the second target member 176 and the second sensing member 178 is not particularly limited. For example, the second target member 176 may include a permanent magnet, and the second sensing member 178 may include a magnetic switch for detecting the second target member 176. As such, as the second target member 176 and the second sensing member 178 are provided, when the input and output module 160 is disposed at the first reference position for the sensing block 165 to be inserted into the first sensing groove 152d, the second sensing member 178 may output a detection signal of the second target member 176 and may transfer the detection signal to the controller 180. The controller 180 may determine whether the input and output module 160 is disposed at the first reference position, that is, whether the input and output module 160 is accommodated in the accommodation groove 152a based on the received detection signal.

As shown in FIG. 21, the support member 115 of the housing 110 may be a member for guiding movement in the height direction (hereinafter referred to as the "height direction") of the housing body 111 of the input and output module 160 in conjunction with the guide surface 166 when the input and output module 160 is rotated. The support member 115 may be configured in such a way that an accommodation space for moveably accommodating the hinge bracket 113 in the height direction is formed between the mounting part 111i and the support member 115 and an upper end 115a is installed on the external surface of the housing body 111 to face the input and output module 160.

The guide surface 166 may be provided to be continuously supported by the upper end 115a of the support member 115 while sliding along the upper end 115a of the support member 115 when the input and output module 160 is rotated. However, the guide rail 113e of the hinge bracket 113 may be coupled to the guide groove 111j of the mounting part 111i to enable movement in the height direction. Thus, the hinge bracket 113 and the input and output module 160 coupled thereto may move in the height direction by reaction force that acts on the guide surface 166 from the upper end 115a of the support member 115 when the input and output module 160 is rotated and driven.

In more detail, as shown in FIGS. 20 and 21, the guide surface 166 may be provided to raise the input and output module 160 and the hinge bracket 113 toward the upper surface of the housing body 111 when the input and output module 160 disposed at the first reference position is rotated in one predetermined direction toward the second reference position to be spaced apart from the accommodation groove 152a and to lower the input and output module 160 and the hinge bracket 113 toward the lower surface of the housing body 111 when the input and output module 160 disposed at the second reference position is rotated in the other direction opposite to the one direction to approach the accommodation groove 152a.

To this end, the guide surface 166 may include a first guide surface 166a provided to be supported by the upper end 115a of the support member 115 when the input and output module 160 is disposed at the first reference position, a second guide surface 166b provided to be supported by the upper end 115a of the support member 115 when the input and output module 160 is disposed at the second reference position, and a third guide surface 166c provided to be supported by the upper end 115a of the support member 115 when the input and output module 160 is rotated between the first reference position and the second reference position.

As shown in FIGS. 20 and 21, the first guide surface 166a may be formed on the lower surface of the module body 161 to be supported by the upper end 115a of the support member 115 when the input and output module 160 is positioned at the first reference position.

As shown in FIGS. 23 and 24, the second guide surface 166b may be supported by the upper end 115a of the support member 115 when the input and output module 160 is disposed at the second reference position and may be formed on the external surface of the hinge part 164 to form a reference angle with the first guide surface 166a.

As shown in FIG. 22, the third guide surface 166c may be supported by the upper end 115a of the support member 115 when the input and output module 160 is rotated between the first reference position and the second reference position and may be provided at a connection point between the module body 161 and the hinge part 164 to connect the first guide surface 166a and the second guide surface 166b. The third guide surface 166c may be provided to be in continuous contact with the upper end 115a of the support member 115 when the input and output module 160 is rotated between the first reference position and the second reference position. To this end, the third guide surface 166c may have a curved shape having a predetermined curvature.

As shown in FIG. 21, the support 113f may include a first support protrusion 113j that protrudes toward the hinge part 164, and the hinge part 164 may further include a second support protrusion 164g that protrudes toward the support 113f.

The first support protrusion 113j may protrude from an inner circumference of the support 113f toward the external surface of the hinge part 164. The second support protrusion 164g may protrude from the external surface of the hinge part 164 toward the inner circumference of the support 113f.

As shown in FIGS. 21 and 24, the first support protrusion 113j and the second support protrusion 164g may be spaced apart from each other by a predetermined interval when the input and output module 160 is disposed at the first reference position, and the second support protrusion 164g may be supported by the first support protrusion 113j when the input and output module 160 is disposed at the second reference position. In particular, the first support protrusion 113j and the second support protrusion 164g may be provided in such a way that the second support protrusion 164g moves over the first support protrusion 113j when the input and output module 160 is rotated with rotation force equal to or greater than predetermined reference rotation force. To this end, the first support protrusion 113j and the second support protrusion 164g may be elastically deformed.

Hereinafter, with reference to drawings, the state in which the input and output module 160 is straightly moved in the height direction by the support member 115 and the guide surface 166 when the input and output module 160 is rotated will be described.

First, as shown in FIGS. 21 and 22, when a user grips the input and output module 160 disposed at the first reference position and then rotates the input and output module 160 in one predetermined direction toward the second reference position, the first guide surface 166a may pressurize the upper end 115a of the support member 115 toward the lower side of the housing body 111 by torque and load of the input and output module 160, etc. Then, the input and output module 160 and the hinge bracket 113 may be rotated toward the second reference position, and simultaneously, may be raised toward the upper side of the housing body 111 by reaction force acting on the first guide surface 166a from the upper end 115a of the support member 115 and may slide along the upper end 115a of the support member 115 in the state in which the first guide surface 166a is supported by the upper end 115a of the support member 115.

As shown in FIG. 22, when the input and output module 160 is rotated by a predetermined angle or greater from the first reference position, the third guide surface 166c may meet the upper end 115a of the support member 115, and the input and output module 160 and the hinge bracket 113 may be continuously raised toward the upper side of the housing body 111 by reaction force acting on the third guide surface 166c from the upper end 115a of the support member 115. As such, as the input and output module 160 and the hinge bracket 113 are raised, a portion of the hinge part 164 and a portion of the hinge bracket 113 may be drawn out from the through hole 152c and may be exposed to the outside (refer to FIG. 16).

Then, as shown in FIG. 24, when the input and output module 160 is rotated by a predetermined reference angle, the second guide surface 166b provided to form a reference angle with the first guide surface 166a may meet the upper end 115a of the support member 115, and simultaneously, the second catch surface 164d of the hinge part 164 may be caught by the first catch surface 113i of the hinge bracket 113. Then, rotation and straight movement of the input and output module 160 may be completed, and the input and output module 160 may be positioned upright to be perpendicular to the discharge grille 152 in the state in which the second guide surface 166b is supported by the upper end 115a of the support member 115.

However, the second support protrusion 164g of the hinge part 164 may meet a lower surface of the first support protrusion 113j when a rotation angle of the input and output module 160 approaches the reference angle. Then, the first support protrusion 113j and the second support protrusion 164g may be elastically deformed by rotation force of the input and output module 160, and as such, the second support protrusion 164g may move over the first support protrusion 113j toward the upper side. Thus, as shown in FIG. 24, when rotation of the input and output module 160 by the reference angle is completed, the second support protrusion 164g may be accommodated on the upper surface of the first support protrusion 113j. Then, the first support protrusion 113j may support the input and output module 160 through the second support protrusion 164g to prevent the input and output module 160 from reversely rotating toward the first reference position.

Referring to FIG. 25, when the input and output module 160 is disposed at the second reference position, various external forces including force F0 applied from the hinge bracket 113 using the hinge pin 164b as a medium, load F1 of the module body 161, reaction force F2 applied to the second guide surface 166b from the upper end 115a of the support member 115, and reaction force F3 applied to the second support protrusion 164g by the first support protrusion 113j may be applied in combination to the input and output module 160. The force F0 applied from the hinge bracket 113 using the hinge pin 164b as a medium may include load of the hinge bracket 113 and elastic force of the elastic member 117 applied to the hinge bracket 113.

When each of the external forces F1, F2, and F3 applies torque (moment) around the hinge pin 164b to the input and output module 160 and the sum of the applied torques is "0", the input and output module 160 may be maintained in the state of being disposed at the second reference position. Here, the torque applied to the input and output module 160 by each of the external forces F1, F2, and F3 may correspond to the product of the magnitude of each of the external forces F1, F2, and F3 and distances L1, L2, and L3 between an application point to which each external forces F1, F2, and F3 is applied and the hinge pin 164b.

When a user applies force F4 to the input and output module 160 to apply torque equal to or greater than predetermined reference torque to the input and output module 160 in the other direction around the hinge pin 164b, the input and output module 160 may begin to be rotated in the other direction while the first support protrusion 113j and the second support protrusion 164g are elastically deformed and the second support protrusion 164g moves over the first support protrusion 113j toward the lower side. As such, when the input and output module 160 is rotated in the rotation direction, the hinge bracket 113 and the input and output module 160 may be lowered toward the lower surface of the housing body 111 by elastic force of the elastic member 117. Then, as shown in FIG. 21, the input and output module 160 may be re-accommodated in the accommodation groove 152a to support the support 113f by a bottom surface of the accommodation groove 111m and to simultaneously support the first guide surface 166a by the upper end 115a of the support member 115. The hinge part 164 and the hinge bracket 113 may be re-inserted into the through hole 152c to be isolated from the outside.

As described above, in the air cleaner 1, as the input and output module 160 is straightly moved by operational association between the guide surface 166 of the hinge part 164 and the support member 115 of the housing 110 when the input and output module 160 is rotated and driven, the input and output module 160 and the hinge coupling structure of the housing 110 may be limitedly exposed to the outside only when the input and output module 160 is rotated by a reference angle to be separated from the accommodation groove 152a. As such, the air cleaner 1 may protect the input and output module 160 and the hinge coupling structure of the housing 110 from the outside and the aesthetics of the air cleaner 1 may be improved.

FIG. 26 is a perspective view showing the state in which a guide vane, an internal grille, and a locking tab are separated from each other, FIG. 27 is a partial enlarged view of FIG. 26, and FIG. 28 is a plan view showing the state in which a locking tab is separated from an internal grille.

FIG. 29 is a perspective view showing the state in which a guide vane and an internal grille are separated from a housing, and FIGS. 30 and 31 are diagrams for explaining a coupling relationship between a locking hook and a vane holder.

The discharge unit 150 may include a guide vane 157 and an internal grille 158 that are configured by partially changing the guide vane 154 and the internal grille 156 instead of the aforementioned guide vane 154 and the internal grille 156. In this case, the discharge unit 150 may further include a locking tab 159 for locking or unlocking the guide vane 157 and the internal grille 158.

First, as shown in FIG. 26, the guide vane 157 may include a guide plate 157a provided on a central part to guide the air A blown by the blowing fan 142 toward the outer side of the guide vane 157, a plurality of vane wings 157b provided at the outer side of the guide vane 157 to guide the air A blown by the blowing fan 142 toward through holes 158a of the internal grille 158 to be described below, a target member insert groove 157c into which the second target member 176 of the sensing unit 170 is inserted, a nut fixing groove 157d to which a nut N screwed to a bolt B for fixing the locking tab 159 to the internal grille 158 is fixed, a first bracket insert groove 157 into which a predetermined catch part 117 of the housing 110 is inserted, and a locking hook 157f for locking the guide vane 157.

The guide plate 157a and the vane wings 157b may have the same configurations as the guide plate 154a and the vane wings 154b of the aforementioned guide vane 154, and thus a detailed description thereof will be omitted.

As shown in FIG. 27, when the input and output module 160 is accommodated at a predetermined reference position of the accommodation groove 152a included in the discharge grille 152, the target member insert groove 157c may be formed in the upper surface of the guide vane 157 to face the sensing block 165 of the input and output module 160 across the first sensing groove 152d of the discharge grille 152 and a second sensing groove 158c of the internal grille 158 to be described below. Thus, when the second sensing member 178 installed inside the sensing block 165 detects the second target member 176, the controller 180 may determine that the input and output module 160 is accommodate at the predetermined reference position of the accommodation groove 152a.

As shown in FIG. 27, the nut fixing groove 157d may be formed in the upper surface of the guide vane 157 to face bolt holes 158h and 159b of the internal grille 158 and the locking tab 159 to be described below when the internal grille 158 is accommodated in the guide vane 157 in a predetermined alignment form. The nut N provided to be screwed to a screw part of the bolt B positioned through the bolt holes 158h and 159b of the internal grille 158 and the locking tab 159 may be inserted into and fixed to the nut fixing groove 157d. Thus, through screw connection between the screw part of the bolt B inserted into the bolt holes 158h and 159b of the internal grille 158 and the locking tab 159 and the nut N fixed to the nut fixing groove 157d, the internal grille 158 may be locked not to be separated from the guide vane 157. Such locking of the internal grille 158 will be described below in detail.

As shown in FIG. 27, the first bracket insert groove 157e may be concave in a peripheral surface of the guide vane 157 for the predetermined catch part 117 of the housing body 111 to be inserted thereinto when the guide vane 157 is coupled to the predetermined reference position of the second opening 111c included in the housing body 111.

The first bracket insert groove 157e may have a shape corresponding to the catch part 117 to be caught by the predetermined catch part 117 of the housing body 111 inserted into the corresponding first bracket insert groove 157e in a predetermined locking direction or an unlocking direction opposite to the locking direction.

The catch part 117 of the housing body 111 is not particularly limited. For example, as shown in FIG. 28, the catch part 117 may correspond to an upper part of the support member 115 included in the housing 110 and an upper part of the mounting part 111i.

As shown in FIG. 28, the support member 115 may be installed in such a way that both ends thereof cover both surfaces of the mounting part 111i, and the mounting part 111i may have an internal surface on which the accommodation part 111l protruding toward the internal flow path 111b is formed. Here, the internal surface of the mounting part 111i may refer to one surface of the mounting part 111i, directed toward the internal flow path 111b. As shown in FIG. 27, the first bracket insert groove 157e may have a shape corresponding to the catch part 117, that is, both ends of the support member 115 and the accommodation part 111l of the mounting part 111i to selectively insert the catch part 117 into the first bracket insert groove 157e. To this end, the first bracket insert groove 157e may include a first accommodation part insert groove 157g that is concave in a bottom surface for the accommodation part 111l of the mounting part 111i to be inserted thereinto.

As shown in FIGS. 27 and 28, the first bracket insert groove 157e may have a larger width than the catch part 117. Then, a rotation space G for rotating the guide vane 157 by an angle equal to or less than a predetermined reference angle around the central part of the corresponding guide vane 157 may be formed between at least one side surface of both surfaces 117a and 117b of the catch part 117 and at least one side surface of both surfaces 157h and 157i of the first bracket insert groove 157e. As shown in FIG. 28, through the rotation space G, the guide vane 157 may be selectively rotated in a predetermined locking or unlocking direction.

The locking hook 157f may be provided to selectively lock or unlock the guide vane 157 in a rotation direction of the guide vane 157.

The shape and installation position of the locking hook 157f are not particularly limited. For example, as shown in FIG. 29, the locking hook 157f may be formed like a protrusion that protrudes from the outer circumference of the guide vane 157 toward the inner circumference of the internal flow path 111b.

The number of the installed locking hook 157f is not particularly limited. For example, as shown in FIG. 29, the plurality of locking hooks 157f may be formed at a predetermined interval.

As shown in FIGS. 29 and 30, in response to the locking hook 157f, the housing body 111 may further include a vane holder 111o for selectively catching or releasing the locking hook 157f in a rotation direction of the guide vane The configuration of the vane holder 111o is not particularly limited. For example, as shown in FIG. 31, the vane holder 111o may include a guide groove 111p in which the locking hook 157f is slidably accommodated and that guides the locking hook 157f to move along a predetermined moving path, an entrance 111q for providing a path for inserting the locking hook 157f into the guide groove 111p or drawing out the locking hook 157f from the guide groove 111p, and a catch rib 111r by which the locking hook 157f moved to a predetermined locking position of the guide groove 111p is caught.

The vane holder 111o may be formed on one region of the inner circumference of the internal flow path 111b, which faces the locking hook 157f when the guide vane 157 is inserted into the second opening 111c by a predetermined depth. The same number of vane holders 111o as the number of the installed locking hooks 157f may be formed at the same interval as an interval at which the locking hooks 157f are installed.

The guide groove 111p may be formed to slidably accommodate the locking hook 157f. In particular, the guide groove 111p may have a predetermined width to rotate the locking hook 157f at the reference angle or less around the central part of the guide vane 157 inside the guide groove 111p.

The entrance 111q may be connected to the guide groove 111p for the locking hook 157f to be inserted into the guide groove 111p through the corresponding entrance 111q or to draw out the locking hook 157f from the guide groove 111p. In particular, the entrance 111q may be formed in the upper side of the guide groove 111p to be opened toward the upper side of an air cleaner 12.

The catch rib 111r may be formed to close a portion of the entrance 111q, which corresponds to a predetermined locking position, to catch the locking hook 157f that slides to the locking position of an entire section of the guide groove 111p by rotating the guide vane 157. A method of forming the catch rib 111r is not particularly limited. For example, as shown in FIG. 31, the catch rib 111r may protrude toward the entrance 111q from one surface of both surfaces of the guide groove 111p, which is positioned at the locking position, to close the locking position toward the upper side of the air cleaner 120.

A locking method of the guide vane 157 using the locking hook 157f and the vane holder 111o will be described below.

Then, as shown in FIG. 26, the internal grille 158 may include the plurality of through holes 158a formed in a thickness direction of the internal grille 158 to allow the air A guided by the guide vane 157 to pass, a handle 158b for gripping the internal grille 158, the second sensing groove 158c that is concave for the first sensing groove 152d of the discharge grille 152 to be inserted thereinto, a second bracket insert groove 158d into which the catch part 117 of the housing 110 is inserted, and a locking tab insert groove 158e into which the locking tab 159 is inserted.

The through holes 158a, the handle 158b, and the second sensing groove 158c may have the same configuration as the through holes 156a, the handle 156b, and the second sensing groove 156c of the aforementioned internal grille 156, and thus a detailed description thereof will be omitted.

As shown in FIG. 27, the second bracket insert groove 158d may be concave in a peripheral surface of the internal grille 158 for the catch part 117 of the housing 110 to be inserted thereinto when the internal grille 158 is coupled to a predetermined reference position of the second opening 111c of the housing 110. In particular, the second bracket insert groove 158d may be concave in one region of the peripheral surface of the internal grille 158, which corresponds to the first bracket insert groove 157e, to be matched with the first bracket insert groove 157e of the guide vane 157 when the internal grille 158 is accommodated on the guide vane 157 in a predetermined alignment form.

The second bracket insert groove 158d may have a shape corresponding to the catch part 117, that is, both ends of the support member 115 and the accommodation part 111l of the mounting part 111*i* to selectively insert the catch part 117 thereinto. To this end, the second bracket insert groove 158*d* may include a second accommodation part insert groove 158*f* that is concave on a bottom surface for the accommodation part 111*l* of the mounting part 111*i* to be inserted thereinto.

As shown in FIGS. 27 and 28, the second bracket insert groove 158*d* may have a larger width than the catch part 117. Then, the rotation space G for rotating the guide vane 157 by an angle equal to or less than a predetermined reference angle around the central part of the corresponding guide vane 157 may be formed between at least one side surface of both surfaces 117*a* and 117*b* of the catch part 117 and at least one side surface of both surfaces 158*j* and 158*k* of the second bracket insert groove 158*d*. As shown in FIG. 28, through the rotation space G, the internal grille 158 coupled to the guide vane 157 may be rotated in a predetermined locking or unlocking direction along the guide vane 157.

As shown in FIG. 27, the locking tab insert groove 158*e* may be concave in an upper surface of the internal grille 158 for the locking tab 159 to be inserted into the locking tab insert groove 158*e* or to draw out the locking tab 159 from the locking tab insert groove 158*e*. In particular, as shown in FIGS. 27 and 28, the locking tab insert groove 158*e* may be concave in one region of the upper surface of the internal grille 158, adjacent to the second accommodation part insert groove 158*f*, to be connected to one surface 158*k* positioned at a side corresponding to the locking direction among both surfaces 158*j* and 158*k* of the second accommodation part insert groove 158*f*.

The locking tab insert groove 158*e* may have a shape corresponding to the locking tab 159. For example, as shown in FIG. 27, the locking tab insert groove 158*e* may include a connection part insert groove 158*g* formed for a connection part 159*a* of the locking tab 159 to be inserted thereinto, which is described below, a bolt hole 158*h* formed through a bottom surface of the connection part insert groove 158*g* to be matched with a bolt hole 159*b* of the locking tab 159 to be described below, and a pin hole 158*i* formed to be rotatably hinged to a hinge pin 159*c* of the locking tab 159 to be described below. In particular, as shown in FIGS. 27 and 28, the connection part insert groove 158*g* may be formed to be connected to the one surface 158*k* positioned at a side corresponding to the locking direction among both surfaces 158*j* and 158*k* of the second accommodation part insert groove 158*f*, and the pin hole 158*i* may be formed to be connected to the connection part insert groove 158*g*.

For convenience of description, hereinafter, one surface positioned at a side corresponding to the unlocking direction among the both surfaces 117*a* and 117*b* of the catch part 117 will be referred to as a first side surface 117*a*, and one surface positioned at a side corresponding to the locking direction among both surfaces 117*a* and 117*b* of the catch part 117 will be referred to as a second side surface 117*b*. One surface positioned at a side corresponding to the unlocking direction among the both surfaces 157*h* and 157*i* of the first bracket insert groove 157*e* will be referred to as a first side surface 157*h*, and one surface positioned at a side corresponding to the locking direction among both surfaces 157*h* and 157*i* of the first bracket insert groove 157*e* will be referred to as a second side surface 157*i*. In addition, one surface positioned at a side corresponding to the unlocking direction among both surfaces 158*j* and 158*k* of the second bracket insert groove 158*d* will be referred to as a first side surface 158*j*, and one surface positioned at a side corresponding to the locking direction among both surfaces of the second bracket insert groove 158*d* will be referred to as a second side surface 158*k*.

FIG. 32 is a perspective view of a locking tab viewed from above, FIG. 33 is a perspective view of a locking tab viewed from below, and FIGS. 34 to 37 are diagrams for explaining a method of locking or unlocking an internal grille using a locking member.

Then, the locking tab 159 may be provided to lock the internal grille 158 not to be separated from the guide vane 157 and to simultaneously lock the guide vane 157 not to be separated from the housing 110.

To this end, as shown in FIGS. 32 and 33, the locking tab 159 may include the connection part 159*a* formed to be inserted into the connection part insert groove 158*g* of the locking tab insert groove 158*e*, the bolt hole 159*b* formed through the connection part 159*a* for a screw part of the bolt B for screwing the guide vane 157 and the internal grille 158 to be inserted thereinto, the hinge pin 159*c* that extends from the connection part 159*a* to be rotatably hinged to the pin hole 158*i* of the locking tab insert groove 158*e*, and a stopper 159*d* that extends from the connection part 159*a* to be caught by the second side surface 117*b* of the catch part 117 when the locking tab 159 is inserted into the locking tab insert groove 158*e*.

The hinge pin 159*c* may have a smaller diameter than a diameter of the bolt holes 158*h* and 159*b* to be rotatably inserted into the pin hole 158*i* of the internal grille 158.

The hinge pin 159*c* may include a flange 159*e* that protrudes in a radial direction of the hinge pin 159*c* from a lower end of the hinge pin 159*c* inserted into the bolt holes 158*h* and 159*b*, and at least one incision groove 159*f* that extends by a predetermined length toward an upper end from a lower end of the hinge pin 159*c* to elastically deform the hinge pin 159*c*. In particular, the flange 159*e* may have a predetermined size to allow the pin hole 158*i* to pass therethrough only when the hinge pin 159*c* is elastically contracted by the incision groove 159*f*. Then, the flange 159*e* is inserted into the pin hole 158*i* in the state in which the hinge pin 159*c* is elastically contracted through the incision groove 159*f*, the flange 159*e* is caught by a bottom surface of the internal grille 158 while the hinge pin 159*c* is elastically restored, and thus the hinge pin 159*c* may be hinged to the pin hole 158*i*.

As shown in FIG. 34, the stopper 159*d* may have a predetermined size to be inserted into the rotation space G formed between the catch part 117 and the locking tab insert groove 158*e* and to be caught by the catch part 117 in the unlocking direction when the guide vane 157 and the internal grille 158 are disposed in a predetermined locking form to catch first side surfaces 157*h* and 158*j* of first and second bracket insert grooves 157*e* and 158*d* by the catch part 117.

Hereinafter, a method of locking the guide vane 157 and the internal grille 158 will be described with reference to drawings.

First, as shown in FIGS. 30 and 31, the guide vane 157 may be inserted into the second opening 111*c* by a predetermined depth for the catch part 117 to be inserted into the first bracket insert groove 157*e* and to simultaneously insert the locking hook 157*f* into the guide groove 111*p* through the entrance 111*q*. Then, the locking hook 157*f* may be disposed at the unlocking position connected in an upward direction of the entrance 111*q* and the air cleaner 12 of an entire section of the guide groove 111*p*.

Then, the guide vane 157 may be rotated in the locking direction to catch the first side surface 157*h* of the first bracket insert groove 157e by the first side surface 117a of the catch part 117 in the locking direction. Then, as shown in FIG. 31, the locking hook 157f may be moved to the locking position from the unlocking position of the guide groove 111p. Thus, the locking hook 157f may be caught by the catch rib 111r not to be drawn out from the guide groove 111p through the entrance 111q, and as such, the guide vane 157 may be primarily locked by the locking hook 157f and the vane holder 111o not to be separated from the second opening 111c.

Then, as shown in FIG. 28, the internal grille 158 may be accommodated in the primarily locked guide vane 157 to match the first bracket insert groove 157e of the guide vane 157 with the second bracket insert groove 158d of the internal grille 158. Then, the first side surface 158j of the second bracket insert groove 158d may be caught by the first side surface 117a of the catch part 117 with the first side surface 157h of the first bracket insert groove 157e in the locking direction.

Then, as shown in FIG. 34, the locking tab 159 may be inserted into the locking tab insert groove 158e of the internal grille 158. Then, the stopper 159d of the locking tab 159 inserted into the rotation space G may be caught by the second side surface 117b of the catch part 117 in the unlocking direction.

Then, as shown in FIG. 35, the screw part of the bolt B may be inserted into the bolt holes 158h and 159b of the locking tab 159 and the locking tab insert groove 158e, and then the nut N fixed to the nut fixing groove 157d of the guide vane 157 may be screwed thereto. Then, the internal grille 158 may be locked in the state of being screwed to the guide vane 157 not to be separated from the guide vane 157. The locking tab 159 may be fixed to the locking tab insert groove 158e in the state of being caught by the catch part 117 in the unlocking direction. Thus, the guide vane 157 may be supported by the catch part 117 not to rotated in the unlocking direction, and thus the locking hook 157f may be secondarily locked to maintain the state of being caught by the catch rib 111r at the locking position.

Hereinafter, a method of unlocking the guide vane 157 and the internal grille 158 will be described with reference to drawings.

Unlocking of the guide vane 157 and the internal grille 158 and the aforementioned locking of the guide vane 157 and the internal grille 158 may be performed in reverse order.

First, as shown in FIG. 36, the bolt B may be separated from the nut N and may then be drawn out from the bolt holes 158h and 159b of the locking tab 159 and the locking tab insert groove 158e.

Then, as shown in FIG. 36, the locking tab 159 may be drawn out from the locking tab insert groove 158e. Then, locking of the internal grille 158 and secondary locking of the guide vane 157 by the locking tab 159 may be released. Thus, the internal grille 158 may become capable of being separated from the guide vane 157, and the guide vane 157 may become capable of being rotated in the unlocking direction.

Then, as shown in FIG. 31, the guide vane 157 may be rotated in the unlocking direction to move the locking hook 157f to the unlocking position of the guide groove 111p. Then, the locking hook 157f may become capable of being drawn out from the guide groove 111p through the entrance 111q, and thus primary locking of the guide vane 157 by the locking hook 157f and the vane holder 111o may be released.

Then, as shown in FIG. 30, the guide vane 157 may be separated from the second opening 111c by raising the guide vane 157 in an upward direction of the air cleaner 12 to draw out the locking hook 157f from the guide groove 111p through the entrance 111q.

As described above, the hinge pin 159c of the locking tab 159 may be hinged to the pin hole 158i of the internal grille 158. Thus, as shown in FIG. 37, in the state in which the connection part 159a and the stopper 159d of the locking tab 159 are selectively drawn out from the connection part insert groove 158g and the rotation space G, the locking tab 159 may be easily stored in the state in which the locking tab 159 is held on the upper surface of the internal grille 158 by being rotated by a predetermined angle around the hinge pin 159c. In addition, the bolt B may be easily stored in the state in which the bolt B is held in the locking tab 159 by inserting the screw part into the bolt hole 159b of the locking tab 159.

FIG. 38 is a schematic perspective view showing the configuration of an air cleaner according to a second embodiment of the present invention, FIG. 39 is a perspective view of an air cleaner showing the state in which a cover panel shown in FIG. 38 is separated, and FIG. 40 is a perspective view showing the cover panel shown in FIG. 38.

An air cleaner 2 according to the second embodiment of the present invention is different from the aforementioned air cleaner 1 in terms of a coupling relationship between a housing 210 and a cover panel 220.

Referring to FIGS. 38 to 40, the air cleaner 2 may include the housing 210, the cover panel 220 detachably coupled to the housing 210 to cover a side surface of the housing 210, a discharge grille 230 for discharging air purified by a filter (not shown) to the outside, and an input and output module 240 installed to be accommodated in an accommodation groove 232 of the discharge grille 230 and configured to input and output various pieces of information on the air cleaner 2.

First, the housing 210 may be configured to provide a framework and space for installing various components included in the air cleaner 2.

The configuration of the housing 210 is not particularly limited. For example, the housing 210 may include a base 211, a housing body 213 for providing a framework and space for installing various components, and a fixing bar 215 for fixedly installing the cover panel 220.

The base 211 may be provided to support load of the air cleaner 2. The shape of the base 211 is not particularly limited. For example, as shown in FIG. 39, the base 211 may have a disk shape.

As shown in FIG. 39, the base 211 may include a holding hole 211a, a switch hole 211b, and a switch 211c.

The holding hole 211a may be formed at a predetermined position of the base 211 to support a holding hook 222 to be described below. The holding hole 211a may be installed at a predetermined holding position of the base 211 for a guide hook 223 to be described below to be inserted into a slide slot 213d when the cover panel 220 is rotated toward an external surface of the housing body 213 in the state in which the holding hook 222 is held by the holding hole 211a.

The number of the formed holding hole 211a is not particularly limited, and at least one holding hole 211a may be formed at a predetermined interval.

The switch hole 211b may be formed at one side of the base 211 to be spaced apart from the holding hole 211a by a predetermined interval. The switch 211c may be installed in the switch hole 211b to be exposed in an upward direction of the air cleaner 2. Upon being pressed by a detection rib 226 of the cover panel 220 to be described below, the switch 211c may transmit a detection signal indicating that the cover panel 220 is installed at a predetermined home position, to a controller (not shown).

The housing body 213 may include a first opening 213a, an internal flow path 213b, a second opening 213c, the slide slot 213d, and a first hook hole 213e.

The first opening 213a may be formed in a side surface of the housing body 213 to be opened in a horizontal direction of the air cleaner 2, the second opening 213c may be formed in an upper surface of the housing body 213 to be opened in an upward direction of the air cleaner 2, and the internal flow path 213b may be formed inside the housing body 213 to connect the first opening 213a and the second opening 213c. A filter (not shown) for purifying air flowing into the internal flow path 213b through the first opening 213a, a blowing fan (not shown) for blowing air accommodated in the internal flow path 213b toward the second opening 213c in the state of being purified by the filter, etc. may be installed in the internal flow path 213b.

The slide slot 213d may be concave in an external surface of a wall of the housing body 213 to be opened to the outside of the housing body 213. The slide slot 213d may include a slide groove 213f that extends in a predetermined slide direction, a catch groove 213g that is connected to an end of the slide groove 213f and extends in a predetermined caught direction, and a flange 213h that protrudes from the slide groove 213f.

The number of the formed slide slot 213d is not particularly limited. For example, the slide slot 213d may be formed in a pair, and here, the pair of slide slots 213d may be formed at a predetermined interval to be symmetrical with each other in right and left directions.

The slide groove 213f may be formed for the guide hook 223 of the cover panel 220 to be described below to be inserted into the slide groove 213f through a fore end of the slide groove 213f when the cover panel 220 is moved toward the wall of the housing body 213. Here, the fore end of the slide groove 213f may refer to an end of both ends of the slide groove 213f, which is positioned away from the fixing bar 215, and a rear end of the slide groove 213f may refer to an end of the both ends of the slide groove 213f, which is positioned close to the fixing bar 215.

A sliding direction may be determined to guide catch hooks 224 and 225 of the cover panel 220 to be described below to hook holes 213e and 215a when the guide hook 223 of the cover panel 220 to be described below slides.

Here, the case in which the catch hooks 224 and 225 are guided to the hook holes 213e and 215a may refer to the case in which the catch hooks 224 and 225 are moved to the position for being inserted into or caught by the hook holes 213e and 215a.

The bottom surface of the slide groove 213f may have an inclination structure inclined upward in the sliding direction. The inclination structure of the slide groove 213f may be provided to raise the cover panel 220 by a predetermined clearance compared with a caught height of the catch hooks 224 and 225 when the cover panel 220 is rotated to allow the guide hook 223 to slide along a bottom surface of the slide groove 213f. That is, the slide groove 213f may be provided to raise the cover panel 220 to a height to be stably inserted into the hook holes 213e and 215a in the state in which the catch hooks 224 and 225 do not collide with a peripheral surface of the hook holes 213e and 215a.

The catch groove 213g may extend in a predetermined caught direction from the rear end of the slide groove 213f. Here, the caught direction may refer to a direction in which the catch hooks 224 and 225 are caught by the hook holes 213e and 215a.

When the catch groove 213g is provided to extend in the caught direction, if the cover panel 220 is moved in a caught direction to move the guide hook 223 along the catch groove 213g in the state in which the cover panel 220 is moved to allow the guide hook 223 to enter the catch groove 213g and the catch hooks 224 and 225 are guided to the hook holes 213e and 215a, the catch hooks 224 and 225 may be caught by and coupled to the hook holes 213e and 215a in the caught direction.

A bearing of the caught direction is not particularly limited. For example, the caught direction may be a direction of gravity. When the guide hook 223 enters the catch groove 213g, as the cover panel 220 and the guide hook 223 are automatically dropped by gravity, it may be convenient that the catch hooks 224 and 225 are automatically caught by the hook holes 213e and 215a, and the catch hooks 224 and 225 may be strongly bound to the hook holes 213e and 215a using load of the cover panel 220, thereby preventing the catch hooks 224 and 225 from being separated from the hook holes 213e and 215a.

The flange 213h may protrude to have a predetermined height from a bottom surface of the slide groove 213f and may be formed to be spaced apart from an internal surface of the slide groove 213f, that is, an external surface of the housing body 213 by a predetermined interval. An internal surface of the flange 213h, which faces the internal surface of the slide groove 213f, may have an inclination structure that is inclined in such a way that a distance from the internal surface of the slide groove 213f is gradually reduced in the sliding direction. The flange 213h will be described below in detail.

The position at which the first hook hole 213e is formed is not particularly limited. For example, as shown in FIG. 39, the first hook hole 213e may be formed in an upper end of the wall of the housing body 213. The number of the formed first hook hole 213e is not particularly limited, and at least one first hook hole 213e may be formed along a peripheral surface of the housing body 213 at a predetermined interval. The first hook hole 213e may be formed to be opened in an upward direction, but the present invention is not limited thereto.

As shown in FIG. 39, the fixing bar 215 may be formed like a bar that extends in a longitudinal direction and may be coupled to the external surface of the housing body 213 to extend a long way in the height direction of the housing body 213. The number of the installed fixing bar 215 is not particularly limited. For example, the fixing bar 215 may be installed in a pair, and here, the pair of fixing bars 215 may be formed at an angle interval of 180° to divide the base 211 and the housing body 213 into a pair of partitions that is symmetrical with each other. In this case, the aforementioned holding hole 211a, the switch hole 211b, the switch 211c, the slide slot 213d, the first hook hole 213e, etc. may be separately formed in each partition.

The fixing bar 215 may have a second hook hole 215a formed in a side surface to be opened in the aforementioned sliding direction. The second hook hole 215a may be formed in each of one surface of the fixing bar 215 and the other surface opposite to the one surface to symmetrically couple the pair of cover panels 220 to both surfaces of the fixing bar 215.

The number of the formed second hook hole 215a is not particularly limited, and at least one second hook hole 215a may be formed at a predetermined interval in a height direction of the housing body 213.

FIG. 41 is a front view of an air cleaner showing the state in which a cover panel is installed at a predetermined home position, FIG. 42 is a diagram showing the case in which a holding hook is caught by and coupled to a holding hole in the air cleaner shown in FIG. 41, and FIG. 43 is a diagram showing the state in which a guide hook is inserted into a catch groove of a slide slot in the air cleaner shown in FIG. 41.

FIG. 44 is a diagram showing the state in which a first catch hook is caught by and coupled to a first hook hole in the air cleaner shown in FIG. 41, FIG. 45 is a diagram showing the state in which a second catch hook is caught by and coupled to a second hook hole in the air cleaner shown in FIG. 41, and FIG. 46 is a diagram showing the state in which a detection rib is in contact with a switch in the air cleaner shown in FIG. 41.

Then, the cover panel 220 may be provided to cover the first opening 213a of the housing body 213.

As described above, the base 211 and the housing body 213 may be divided into a pair of partitions by the fixing bars 215. In response thereto, the cover panel 220 may be provided in a pair, and here, the pair of cover panels 220 may be provided to separately cover any one of the partitions.

The shape of the cover panel 220 is not particularly limited. For example, when the housing body 213 has a cylindrical shape, the cover panel 220 may have a curved shape having a radius of curvature corresponding to a radius of curvature of the housing body 213.

As shown in FIG. 40, the cover panel 220 may include an absorption hole 221, the holding hook 222, the guide hook 223, a first catch hook 224, a second catch hook 225, and the detection rib 226.

The absorption hole 221 may be formed through the cover panel 220 in the thickness direction thereof to be connected to the first opening 213a. When the shape of the absorption hole 221 and the number of the formed absorption holes 221 are not particularly limited, the plurality of absorption holes 221 may be formed at a predetermined interval to have a size for allowing air to pass through the absorption holes 221 and not to pass through the absorption holes 221. When a blowing fan (not shown) of a blower unit is driven to blow air accommodated in the internal flow 213b toward the second opening 213c, absorption force may be applied to the absorption holes 221 connected to the first opening 213a and the absorption holes 221 connected thereto, and outside air that is absorbed by the absorption holes 221 by the absorption force may enter the internal flow path 213b through the first opening 213a.

In order to hold the cover panel 220 by the holding hole 211a of the base 211 when the cover panel 220 is coupled to the housing body 213, the holding hook 222 may be formed at a specific position of the internal surface of the cover panel 220, which corresponds to the position at which the holding hole 211a is formed.

The configuration of the holding hook 222 is not particularly limited. For example, as shown in FIG. 40, the holding hook 222 may include a support 222a coupled to an internal surface of the cover panel 220, and a flange 222b that extends in a downward direction from the support 222a to form a predetermined angle with the support 222a. The support 222a and the flange 222b may be formed to be perpendicular to each other, but the present invention is not limited thereto.

The number of the formed holding hooks 222 is not particularly limited, and the same number of holding hooks 222 as the number of the holding holes 211a may be formed at the same interval as an interval at which the holding holes 211a are formed.

As shown in FIGS. 41 and 42, when the cover panel 220 is coupled to the housing body 213 to be positioned at a predetermined home position, the holding hook 222 may be caught by and coupled to the holding hole 211a to support the support 222a by a peripheral surface 211e of the holding hole 211a and to simultaneously insert the flange 222b into the holding hole 211a.

The guide hook 223 may be formed at a specific position of an internal surface of the cover panel 220, which corresponds to the position at which the slide slot 213d is formed, to be inserted into the slide slot 213d of the housing body 213 when the cover panel 220 is coupled to the housing body 213.

The configuration of the guide hook 223 is not particularly limited. For example, as shown in FIG. 40, the guide hook 223 may include a guide rib 223a coupled to an internal surface of the cover panel 220, a reinforcing rib 223b for reinforcing the rigidity of the guide rib 223a, and a catch protrusion 223c that protrudes in a downward direction from an end of the guide rib 223a to come into contact with a bottom surface of the slide groove 213f when the guide hook 223 enters the slide groove 213f.

The guide hook 223 may be formed to be inserted into the slide slot 213d by a predetermined depth, and the catch protrusion 223c may be formed to have a larger height than the flange 213h of the slide slot 213d. In particular, the catch protrusion 223c may be formed to be perpendicular to the guide hook 223, but the present invention is not limited thereto.

The number of the formed guide hooks 223 is not particularly limited, and the same number of guide hooks 223 as the number of the slide slots 213d may be formed at the same interval as an interval at which the slide slots 213d are formed.

As shown in FIG. 43, when the cover panel 220 is coupled to the housing body 213 to be positioned at a predetermined home position, the guide hook 223 may be inserted into the catch groove 213g to be positioned lower than a bottom surface of the slide groove 213f by the predetermined clearance. A relationship between the guide hook 223 and the slide slot 213d will be described in detail below.

The first catch hook 224 may be formed at a specific position of an internal surface of the cover panel 220, which corresponds to the position at which the first hook hole 213e is formed, to be caught by and coupled to the first hook hole 213e of the housing body 213 when the cover panel 220 is coupled to the housing body 213.

The configuration of the first catch hook 224 is not particularly limited. For example, as shown in FIG. 40, the first catch hook 224 may include a support 224a coupled to an internal surface of the cover panel 220, and a flange 224b that extends in a downward direction from the support 224a to form a predetermined angle with the support 224a. The support 224a and the flange 224b may be performed to be perpendicular to each other, but the present invention is not limited thereto.

The number of the formed first catch hooks 224 is not particularly limited, and the same number of first catch hooks 224 as the number of the first hook holes 213e may be formed at the same interval as an interval at which the first hook holes 213e are formed.

As shown in FIG. 44, when the cover panel 220 is coupled to the housing body 213 to be positioned at a predetermined home position, the first catch hook 224 may be caught by and coupled to the first hook hole 213e for the flange 224b to be inserted into the first hook hole 213e by a predetermined depth.

The second catch hook 225 may be formed at a specific position of an internal surface of the cover panel 220, which corresponds to the position at which the second hook hole 215a is formed, to be caught by and coupled to the second hook hole 215a of the fixing bar 215 when the cover panel 220 is coupled to the housing body 213.

The configuration of the second catch hook 225 is not particularly limited. For example, as shown in FIG. 40, the second catch hook 225 may include a support 225a coupled to an internal surface of the cover panel 220, and a flange 225b that extends in a downward direction from the support 225a to form a predetermined angle with the support 225a. The support 225a and the flange 225b may be formed to be perpendicular to each other, but the present invention is not limited thereto.

The number of the formed second catch hooks 225 is not particularly limited, and the same number of second catch hooks 225 as the number of the second hook holes 215a may be formed at the same interval as an interval at which the second hook holes 215a are formed.

As shown in FIG. 45, when the cover panel 220 is coupled to the housing body 213 to be positioned at a predetermined home position, the second catch hook 225 may be caught by and coupled to the second hook hole 215a to be supported by the internal surface of the second hook hole 215a by the support 225a and for the flange 225b to be inserted into the second hook hole 215a by a predetermined depth.

The detection rib 226 may be formed at a specific position of an internal surface of the cover panel 220, which corresponds to the position at which the switch 211c is installed, to press the switch 211c of the base 211 when the cover panel 220 is coupled to the housing body 213.

The configuration of the detection rib 226 is not particularly limited. For example, as shown in FIG. 40, the detection rib 226 may be coupled to an internal surface of the cover panel 220 to protrude by a predetermined length. The detection rib 226 may include a pressing protrusion 226a that protrudes from a lower surface to press the switch 211c.

As shown in FIG. 46, when the cover panel 220 is coupled to the housing body 213 to be positioned at a predetermined home position, the pressing protrusion 226a of the detection rib 226 may press the switch 211c, and in response thereto, the switch 211c may input a detection signal indicating that the cover panel 220 is installed at a home position, to a controller. The controller may control the air cleaner 2 to be operated in a normal mode only when the cover panel 220 is installed at a home position based on the detection signal, but the present invention is not limited thereto.

FIG. 47 is a diagram showing the state in which a cover panel is disposed to obliquely hold a holding hook by a holding hole, FIG. 48 is a diagram showing the state in which a holding hook is obliquely held by a holding hole in an air cleaner shown in FIG. 47, and FIG. 49 is a diagram showing a positional relationship between a slide slot and a guide hook in the air cleaner shown in FIG. 47.

FIG. 50 is a diagram showing the state in which a cover panel is disposed for a guide hook to be inserted into a slide groove of a slide slot, and FIGS. 51 and 52 are diagrams showing a positional relationship between a slide slot and a guide hook in an air cleaner shown in FIG. 50.

FIG. 53 is a diagram showing the state in which a cover panel is raised to prevent a peripheral surface of a hook hole from interfering with a catch hook, FIG. 54 is a diagram showing a positional relationship between a slide slot and a guide hook in an air cleaner shown in FIG. 53, and FIG. 55 is a diagram showing a positional relationship between a second catch hook and a second hook hole in the air cleaner shown in FIG. 53.

Hereinafter, a method of coupling the cover panel 220 to the housing body 213 will be described with reference to drawings.

First, as shown in FIGS. 47 to 49, the cover panel 220 may be accommodated on the base 211 to obliquely hold the holding hook 222 by the holding hole 211a in the state in which the guide hook 223 does not enter the slide groove 213f. In this case, a distance between the second catch hooks 225 and the second hook holes 215a may be reduced as the second catch hooks 225 and the second hook holes 215a are positioned closer to a lower side.

Then, as shown in FIGS. 50 to 52, the cover panel 220 may be rotated toward the housing body 213 to allow the guide hook 223 to enter the slide groove 213f. Then, the catch protrusion 223c of the guide hook 223, which enters the slide groove 213f, may slide in a sliding direction along a bottom surface of the slide groove 213f. However, because the bottom surface of the slide groove 213f has an inclination structure that is inclined upward in the sliding direction, the catch protrusion 223c may slide along the bottom surface of the slide groove 213f, and thus the cover panel 220 may be raised by an inclination height of the bottom surface of the slide groove 213f toward the fixing bar 215.

The internal surface of the flange 213h may have an inclination structure having an interval with an internal surface of the slide groove 213f, which tapers in the sliding direction, and thus the catch protrusion 223c may be pressurized toward an internal surface of the slide groove 213f, that is, an external surface of the housing body 213 by an internal surface of the flange 213h. The cover panel 220 may be elastically deformed to have a curvature corresponding to the housing body 213 by external force applied from the flange 213h.

In general, the cover panel may be configured as a relatively thin plate, and thus the radius of curvature may vary slightly for each cover panel due to manufacturing tolerances or deformation due to long-term use. Non-uniformity of the radius of curvature may cause mis-mounting of the cover panel 220 and an external step difference. However, the slide slot 213d may elastically deform the cover panel 220 through the flange 213h to have a constant radius of curvature corresponding to the radius of curvature of the housing body 213. As such, the slide slot 213d may prevent mis-mounting of the cover panel 220 and an external step difference due to non-uniformity of the radius of curvature.

As shown in FIG. 50, when the guide hook 223 enters a sliding slot, the second catch hook 225 positioned at the lower side among the second catch hooks 225 may be inserted into the second hook hole 215a corresponding to the corresponding catch hook 225, and as such, the second catch hooks 225 inserted into the second hook holes 215a may guide the cover panel 220 to prevent mis-mounting of the cover panel 220.

Then, as shown in FIGS. 53 to 55, the cover panel 220 may be rotated toward the housing body 213 to allow the guide hook 223 to enter the catch groove 213g. Then, the guide hook 223 may enter the catch groove 213g in the state of being raised by an inclination height of a bottom surface of the slide groove 213f, the first catch hook 224 may enter a position to face the first hook hole 213e in the state in which the first catch hook 224 does not collide with the peripheral surface of the first hook hole 213e, and the second catch hook 225 may be inserted into the second hook hole 215a in the state in which the second catch hook 225 does not collide with a peripheral surface of the second hook hole 215a.

When the guide hook 223 enters the catch groove 213g in the state of being raised by an inclination height of a bottom surface of the slide groove 213f, a component supporting the cover panel 220 disappears momentarily, and thus the cover panel 220 and the guide hook 223 may be free to fall due to gravity. Then, the catch hooks 224 and 225 may be caught by the hook holes 213e and 215a in the direction of gravity, and thus the cover panel 220 may be coupled to the housing body 213 to be positioned at a predetermined home position, and the pressing protrusion 226a of the detection rib 226 may pressurize the switch 211c.

When the cover panel 220 is separated from the housing body 213, the aforementioned coupling operation needs to be performed in reverse order. That is, the cover panel 220 may be raised to prevent a peripheral surface of the hook holes 213e and 215a from interfering with movement of the catch hooks 224 and 225 and to simultaneously allow the guide hook 223 to enter the slide groove 213f, and then, the cover panel 220 may be moved in an opposite direction to the sliding direction to sequentially pass through the catch groove 213g and the slide groove 213f and may be separated from the housing body 213.

As described above, in the air cleaner 2, it may be possible to assemble and separate the cover panel 220 using only a hook coupling structure provided on the housing 210 and the cover panel 220 without separate use of a magnet and other members, thereby reducing manufacturing costs and assembly costs.

In the air cleaner 2, it may be possible to separate and assemble all of the cover panels 220 from and with the housing 210, thereby preventing materials from corroding during cleaning with water in the state in which the cover panel 220 is fixed to the housing 210.

In the air cleaner 2, the cover panel 220 may be elastically deformed to have a radius of curvature corresponding to a radius of curvature of the housing body 111, thereby preventing mis-mounting and external step difference due to non-uniformity of curvature of the cover panel 220.

FIG. 56 is a schematic perspective view of the configuration of an air cleaner according to a third embodiment of the present invention, FIG. 57 is a cross-sectional view taken along line I-I of FIG. 56, FIG. 58 is a partial sectional perspective view taken along line I-I of FIG. 56, and FIG. 59 is a perspective view showing the state in which a photocatalyst module is installed in a housing.

An air cleaner 3 according to a third embodiment of the present invention may be different from the aforementioned air cleaner 1 in that the air cleaner 3 has an improved structure for additionally sterilizing and deodorizing the air A through photochemical reaction of photocatalyst.

Referring to FIGS. 56 to 58, the air cleaner 3 may include a housing 310 in which an internal flow path 310a is formed, a cover panel 320 in which absorption holes 322 for guiding the outside air A to the internal flow path 310a of the housing 310 are formed, a filter 330 for collecting and removing dust and other foreign substances contained in the air A guided to the internal flow path 310a, a photocatalyst module 340 for sterilizing and deodorizing the air A guided to the internal flow path 310a through photochemical reaction of the photocatalyst, a blower unit 350 for blowing the air A accommodated in the internal flow path 310a, a discharge unit 360 for discharging the air A blown by the blower unit 350 to the outside, and an input and output module 370 for inputting and outputting information.

First, the housing 310 is a device for installing and accommodating various components included in the air cleaner 3.

The configuration of the housing 310 is not particularly limited. For example, as shown in FIG. 57, the housing 310 may include a base 311, a housing body 312 for providing a space for installing and accommodating various components, and a support 313 for connecting the base 311 and the housing body 312 to support the housing body 312.

As shown in FIG. 57, the internal flow path 310a in which the air A absorbed from the outside through the absorption holes 322 of the cover panel 320 flows toward discharge holes 362b of the discharge unit 360 to be described below may be formed inside the housing 310. The internal flow path 310a may include a first internal flow path 310b that is formed in an internal space of the housing 310, partitioned by supports 313, and in which the air A flowing from the outside through the absorption holes 322 of the cover panel 320 flows, and a second internal flow path 310c that is formed in the internal space of the housing 310, partitioned by the housing body 312, and in which the air A passing through the first internal flow path 310b flows.

As shown in FIG. 57, the base 311 may be provided to be accommodated on the ground on which the air cleaner 3 is installed. Wheels for moving the air cleaner 3, wires and plugs for electrically connecting the air cleaner 3 to an external power source, etc. may be installed on the base 311.

As shown in FIGS. 57 and 58, the housing body 312 may include a first part 314 that constitutes a lower side of the housing body 312 and guides the air A purified by the filter 330 in the first internal flow path 310b to the second internal flow path 310c, a second part 315 installed inside the first part 314 to guide the air A flowing into the second internal flow path 310c through the first part 314 to the blower unit 350, and a third part 316 that constitutes an upper side of the housing body 312 and guides the air A blown by the blower unit 350 to the outside.

As shown in FIG. 59, the first part 314 may include a module insert hole 314a that is formed to be connected to the first internal flow path 310b and into which at least a portion of the photocatalyst module 340 is inserted. Thus, the air A passing through the first internal flow path 310b may pass through the photocatalyst module 340 inserted into the module insert hole 314a and may then flow into the second internal flow path 310c.

As shown in FIG. 58, the second part 315 may be inserted into the first part 314 in a height direction of the air cleaner 3. The second part 315 may have an inclination structure having a diameter that is gradually reduced toward the blower unit 350. As such, the second part 315 may guide the air A passing through the photocatalyst module 340 to the blower unit 350.

The second part 315 may include a motor bracket 315a in which a driving motor 354 of the blower unit 350 to be described below is installed. The motor bracket 315a may be coupled to an inner circumference of the second part 315 by a coupling rib 315b.

As shown in FIG. 58, the third part 316 may be coupled to the first part 314 in a height direction of the air cleaner 3. The third part 316 may include a second opening 316a for discharging the air A blown by the blower unit 350 to the outside. The third part 316 may have a shape corresponding to the blower unit 350 to surround the blower unit 350. For example, an inclined surface 316b having a diameter that is gradually increased toward the second opening 316a may be formed on a lower side of the third part 316. The third part 316 may guide the air A blown by the blower unit 350 to the outside through the second opening 316a.

As shown in FIG. 59, the support 313 may be provided between the base 311 and the first part 314 to support the housing body 312. The number of the installed supports 313 is not particularly limited, and the plurality of supports 313 may be installed at a predetermined interval.

As shown in FIG. 59, first openings 313a for connecting the absorption holes 322 and the first internal flow path 310b of the cover panel 320 may be formed between the supports 313. By the first openings 313a, the air A absorbed from the outside through the absorption holes 322 of the cover panel 320 may flow into the first internal flow path 310b through the first openings 313a.

The cover panel 320 is a device for transferring the outside air A to the internal flow path 310a while protecting the housing body 312 from the outside.

As shown in FIG. 58, the cover panel 320 may have a shape corresponding to an outer circumference of the housing 310 to surround at least a portion of the housing 310.

The number of the installed cover panels 320 is not particularly limited, and at least one cover panel 320 may be installed. The cover panel 320 may be detachably installed on an external surface of the housing 310 by a hook and other coupling members (not shown) to cover the first openings 313a from the outside of the housing 310.

The cover panel 320 may be formed to connect the plurality of absorption holes 322 having a predetermined size for passing the air A therethrough to the first openings 313a.

Then, the filter 330 is a device for purifying the air A flowing into the first internal flow path 310b.

The filter 330 may have a shape to be inserted into the first internal flow path 310b to cover the first openings 313a inside the supports 313. For example, as shown in FIG. 58, when the first internal flow path 310b has a cylindrical shape, the filter 330 may have a cylindrical shape having an outer diameter corresponding to a diameter of the first internal flow path 310b.

Then, the photocatalyst module 340 is a device for sterilizing and deodorizing the air A passing through the first internal flow path 310b using photochemical reaction of photocatalyst.

The configuration of the photocatalyst module 340 is not particularly limited. For example, as shown in FIG. 58, the photocatalyst module 340 may include a filter assembly 341 having at least a portion coated with the photocatalyst, a light emitter 342 for providing excitation light (UV) for activation of photochemical reaction of the photocatalyst coated on the filter assembly 341, and a fixing bracket 343 fixing each of the filter assembly 341 and the light emitter 342 to the internal flow path 310a to irradiate a predetermined position of the filter assembly 341 with excitation light (UV) emitted from the light emitter 342.

The position at which the photocatalyst module 340 is installed is not particularly limited. For example, as shown in FIGS. 58 and 59, the photocatalyst module 340 may be installed to be positioned between the filter 330 and the blower unit 350. In particular, the filter assembly 341 may be positioned at an opposite side to the second opening 316a based on the light emitter 342, and the light emitter 342 may be installed to irradiate the filter assembly 341 positioned at the opposite side to the second opening 316a with excitation light (UV). According to a positional relationship between the filter assembly 341 and the light emitter 342, excitation light (UV) emitted from the light emitter 342 may be blocked from being discharged to the outside through the second opening 316a, thereby preventing the user's health from being adversely affected due to the excitation light (UV) emitted to the outside of the air cleaner 3.

As shown in FIGS. 58 and 59, at least a portion of the photocatalyst module 340 may be inserted into the module insert hole 314a of the first part 314 to allow the air A purified by the filter 330 in the first internal flow path 310b to pass through the filter assembly 341. Then, the air A purified by the filter 330 in the first internal flow path 310b may be sterilized and deodorized by the photocatalyst module 340 and may then flow into the second internal flow path 310c.

The photocatalyst module 340 will be described below in detail.

The blower unit 350 is a device for providing flow force for allowing the air A accommodated in the internal flow path 310a to forcibly flow.

The configuration of the blower unit 350 is not particularly limited. For example, as shown in FIGS. 57 and 58, the blower unit 350 may include a blowing fan 352 provided to blow the air A accommodated in the internal flow path 310a, and the driving motor 354 for rotating and driving the blowing fan 352.

Then, the discharge unit 360 is a device for discharging the air A blown by the blowing fan 352 to the outside.

The configuration of the discharge unit 360 is not particularly limited. For example, as shown in FIG. 58, the discharge unit 360 may include a discharge grille 362, a guide vane 364, and an internal grille 366.

The discharge grille 362 may be provided to prevent contaminants and other liquid or solid foreign objects from flowing into the internal flow path 310a through the second opening 316a while discharging the air A that has reached the second opening 316a to the outside. As shown in FIGS. 56 and 58, the discharge grille 362 may include a module accommodation groove 362a for accommodating the input and output module 370 therein, and the discharge holes 362b for discharging the air A that has reached the second opening 316a to the outside.

The guide vane 364 may include a plurality of vane wings for delivering the air A blown by the blowing fan 352 to the discharge grille 362 in a predetermined state.

The internal grille 366 may be provided to prevent residual substances of external objects passing through the discharge grille 362 from flowing into the internal flow path 310a.

The input and output module 370 is a device for inputting and outputting various pieces of information for manipulating or controlling the air cleaner 3 or displaying a driving state of the air cleaner 3.

The input and output module 370 may be provided to be detachably accommodated in an accommodation groove of the discharge grille 362, but the present invention is not limited thereto.

FIG. 60 is a partial cross-sectional view taken along line II-II of FIG. 59, and FIG. 61 is a perspective view of a photocatalyst module.

The photocatalyst module 340 may be installed to be positioned between the filter 330 and the blower unit 350. For example, referring to FIG. 60, the filter assembly 341 may be inserted into the module insert hole 314a of the first part 314 in the state of being detachably coupled to the fixing bracket 343 and the light emitter 342 may be coupled to the fixing bracket 343 to irradiate the filter assembly 341 with excitation light (UV). Any one portion of the fixing bracket 343 may be interposed between the first part 314 and the second part 315 to be fixed to the housing body 312, and another portion of the fixing bracket 343 may be inserted into the module insert hole 314a of the first part 314 while supporting the filter assembly 341.

To install the photocatalyst module 340 as described above, as shown in FIGS. 60 and 61, the filter assembly 341 may include a photocatalytic filter 344, and a filter guide 345 for accommodating the photocatalytic filter 344 therein. In response thereto, the fixing bracket 343 may include a first fixing bracket 348 to which the light emitter 342 is coupled and that has a portion interposed between the first part 314 and the second part 315 to be fixed to the housing body 312, and a second fixing bracket 349 to which the filter guide 345 of the filter assembly 341 is coupled and that is coupled to the first fixing bracket 348 in such a way that the photocatalytic filter 344 of the filter assembly 341 is spaced apart from the light emitter 342 by a predetermined distance.

The photocatalyst module 340 may receive the air A passing through the filter 330, and thus may have a shape corresponding to the filter 330. For example, as shown in FIG. 61, when the filter 330 has a cylindrical shape, the photocatalyst module 340 may have a disk shape.

FIG. 62 is an exploded perspective view of a filter assembly shown in FIG. 61.

As shown in FIG. 62, the photocatalytic filter 344 may have an annular ring shape in which a bypass hole 344a is formed in a central part. However, the present invention is not limited thereto, and the photocatalytic filter 344 may have a polygonal ring shape in which the bypass hole 344a is formed in the central part. As such, as the photocatalytic filter 344 has a hollow ring shape, any part of the air A that has reached the photocatalyst module 340 from the first internal flow path 310b may pass through the photocatalytic filter 344, and another part of the air A may selectively pass through the bypass hole 344a.

Although the case in which the photocatalytic filter 344 has a ring shape has been described above, the present invention is not limited thereto. That is, the photocatalytic filter 344 may have a disk shape from which the bypass hole 344a is omitted. Hereinafter, the present invention will be described in terms of the case in which the photocatalytic filter 344 has an annular ring shape.

The size of the photocatalytic filter 344 is not particularly limited, and the photocatalytic filter 344 may have a smaller outer diameter than a diameter of the module insert hole 314a by a predetermined ratio to be inserted into the module insert hole 314a of the first part 314 to be described below in the state of being accommodated in the filter guide 345. The photocatalytic filter 344 may have a smaller inner diameter than an outer diameter by a predetermined ratio to allow a predetermined ratio of the air A among the air A that has reached the photocatalyst module 340 from the first internal flow path 310b to pass through the bypass hole 344a.

As shown in FIG. 62, the photocatalytic filter 344 may include a plurality of unit photocatalytic filters 344b that is separated from each other. When the photocatalytic filter 344 has an annular disk shape, the unit photocatalytic filters 344b may each be configured in an arc shape having a predetermined arc angle. The unit photocatalytic filters 344b may be accommodated in the filter guide 345 to be spaced apart from each other by a predetermined clearance gap G. As such, as the unit photocatalytic filters 344b come into contact with each other, the unit photocatalytic filters 344b may be prevented from being deformed.

Photocatalyst may be coated on at least a portion of the unit photocatalytic filters 344b. The type of photocatalyst to be coated on the unit photocatalytic filters 344b is not particularly limited. For example, zinc oxide (ZnO), cadmium sulfide (CdS), titanium dioxide (TiO2), or the like may be used as the photocatalyst.

Because titanium dioxide (TiO2) does not change even when receiving light, titanium dioxide (TiO2) may be used semi-permanently, and thus the photocatalyst may be formed of titanium dioxide. Zinc oxide (ZnO) and cadmium sulfide (CdS) have disadvantages in that the catalyst itself is decomposed while receiving light, and thus zinc oxide (ZnO) and cadmium sulfide (CdS) have a relatively short lifespan as a photocatalyst.

As the photocatalyst is coated on the unit photocatalytic filters 344b, when excitation light (UV) emitted from the light emitter 342 is irradiated to the unit photocatalytic filters 344b to activate photochemical reaction of the photocatalyst, ozone (O3) and hydroxyl radical (hydroxyl group, OH radical, hydroxy radical) may be generated from oxygen (O2) and water vapor (H2O) of the air A. The generated hydroxyl radical may be mixed with the air A passing through the unit photocatalytic filters 344b and the bypass hole 344a and may then decompose contaminants and odor-causing substances contained in the air A, and thus may sterilize and deodorize the air A. The aforementioned process of generating hydroxyl radical and sterilization and deodorization reaction are well known, and thus a detailed description will be omitted.

The filter guide 345 may be a member for accommodating the photocatalytic filter 344 to maintain a predetermined shape thereof. The configuration of the filter guide 345 is not particularly limited. For example, the filter guide 345 may include a pair of parts having matching structures such as a first filter guide 346 and a second filter guide 347.

The first filter guide 346 may be a member for accommodating an upper part of the photocatalytic filter 344. The first filter guide 346 may have a shape corresponding to the photocatalytic filter 344. For example, when the photocatalytic filter 344 has an annular disk shape, the first filter guide 346 may have an annular disk shape. In this case, the first filter guide 346 may have a larger outer diameter and inner diameter than an outer diameter and inner diameter of the photocatalytic filter 344 by a predetermined ratio to accommodate the upper part of the photocatalytic filter 344 in the first filter guide 346.

As shown in FIG. 62, the first filter guide 346 may include a first through hole 346a, a first connection hole 346b, a first coupling hook 346c, a second coupling hook 346d, a catch rib 346e, and a first support rib 346f.

The first through hole 346a may be formed in a central part of the first filter guide 346 to be matched with the bypass hole 344a of the photocatalytic filter 344. The first connection hole 346b may be formed in one region of the first filter guide 346, which faces the photocatalytic filter 344, to be connected to the photocatalytic filter 344 in a thickness direction of the first filter guide 346.

The first coupling hook 346c may protrude from an outer circumference of the first filter guide 346. The second coupling hook 346d may protrude from an inner circumference of the first filter guide 346.

The catch rib 346e may protrude from the outer circumference of the first filter guide 346 to protrude toward an inner circumference of a filter insert hole 349a of the second fixing bracket 349 to be described below. The same number of first support ribs 346f as the number of the installed unit photocatalytic filters 344b may protrude from the lower surface of the first filter guide 346 at the same arc angle interval as an arc angle interval of the unit photocatalytic filters 344b to be inserted into a gap G between the unit photocatalytic filters 344b by a predetermined depth.

Photocatalyst may be coated on at least a portion of the first filter guide 346. Then, photochemical reaction may occur in the photocatalyst coated on the first filter guide 346, and thus sterilization and deodorization efficiency with respect to the air A may be increased.

The second filter guide 347 may be a member for accommodating a lower side of the photocatalytic filter 344. The second filter guide 347 may have a shape corresponding to the photocatalytic filter 344. For example, when the photocatalytic filter 344 has an annular disk shape, the second filter guide 347 may have an annular disk shape. In this case, the second filter guide 347 may have a larger outer diameter and inner diameter than an outer diameter and inner diameter of the photocatalytic filter 344 by a predetermined ratio to accommodate the lower side of the photocatalytic filter 344 in the second filter guide 347.

The second filter guide 347 may include a second through hole 347a, a second connection hole 347b, a flowing grille 347c, a first protrusion rib 347d, a second protrusion rib 347f, a third coupling hook 347h, a bolt hole 347i, and a second support rib 347j.

The second through hole 347a may be formed in the central part of the second filter guide 347 to be matched with the bypass hole 344a of the photocatalytic filter 344. The second connection hole 347b may be formed in one region of the second filter guide 347, which faces the photocatalytic filter 344, in the thickness direction of the second filter guide 347 to be connected to the photocatalytic filter 344. The flowing grille 347c may be formed in the second through hole 347a to have a lattice structure or a radial structure.

The first protrusion rib 347d may protrude from the outer circumference of the second filter guide 347 toward the second opening 316a, and a first hook groove 347e to which the first coupling hook 346c is to be hooked may be formed in the first protrusion rib 347d. The second protrusion rib 347f may protrude from the inner circumference of the second filter guide 347 toward the second opening 316a, and a second hook groove 347g to which the second coupling hook 346d is to be hooked may be formed in the second protrusion rib 347f. The first protrusion rib 347d and the second protrusion rib 347f may be formed at the same interval at an interval at which the first coupling hooks 346c and the second coupling hooks 346d are formed to simultaneously hook first coupling hooks 346c and second coupling hooks 346d to first hook grooves 347e and second hook grooves 347g.

The third coupling hook 347h may protrude from the outer circumference of the second filter guide 347 toward the second opening 316a. The bolt hole 347i may be formed in the outer circumference of the second filter guide 347. The same number of second support ribs 347j as the number of the installed unit photocatalytic filters 344b may protrude from the upper surface of the second filter guide 347 at the same arc angle interval as an arc angle interval of the unit photocatalytic filters 344b to be inserted into the gap G between the unit photocatalytic filters 344b.

Photocatalyst may be coated on at least a portion of the second filter guide 347. In particular, photocatalyst may be coated on at least a portion of the flowing grille 347c having a relatively wide surface area in contact with the air A. Then, photochemical reaction may occur in the photocatalyst coated on the second filter guide 347, and thus sterilization and deodorization efficiency with respect to the air A may be increased.

As described above, as the first filter guide 346 and the second filter guide 347 are provided, the first filter guide 346 and the second filter guide 347 may be coupled to each other by hook coupling between coupling hooks 346c and 346d and hook grooves 347e and 347g. The photocatalytic filter 344 may be accommodated in the internal space of the filter guide 345 formed by matching the first filter guide 346 and the second filter guide 347.

FIG. 63 is an exploded perspective view of the photocatalyst module shown in FIG. 61, FIG. 64 is a partial enlarged view of a region X of FIG. 60, FIG. 65 is a partial enlarged view of a region Y of FIG. 60, and FIG. 66 is a perspective view showing a bottom surface of a light emitter shown in FIG. 63.

As shown in FIG. 63, the first fixing bracket 348 may include a bracket body 348a and a light emitter guide 348b.

The bracket body 348a may have a shape corresponding to the photocatalytic filter 344. For example, as shown in FIG. 63, when the photocatalytic filter 344 has an annular disk shape, the bracket body 348a may have an annular disk shape having a larger inner diameter than an outer diameter of the filter guide 345 by a predetermined ratio.

As shown in FIG. 63, the bracket body 348a may include a first bolt hole 348c formed in an outer circumference thereof. The plurality of first bolt holes 348c may be formed at a predetermined interval, but the present invention is not limited thereto.

As shown in FIGS. 64 and 65, the bracket body 348a may be interposed between the first part 314 and the second part 315 of the housing body 312, and thus may be fixed to the housing body 312. To this end, the first part 314 may further include a bracket accommodation groove 314b formed to be concave to accommodate the lower surface of the bracket body 348a therein. The bracket body 348a may further include an alignment groove 348d concave in an upper surface thereof, and the second part 315 may include an alignment protrusion 315c that protrudes from one surface of the second part 315 to be inserted into the alignment groove 348d when the second part 315 is inserted into the first part 314. The alignment groove 348d and the alignment protrusion 315c may be accommodated in the bracket accommodation groove 314b in the state in which the bracket body 348a is aligned in a predetermined alignment form.

The light emitter guide 348b may have a shape corresponding to the photocatalytic filter 344. For example, as shown in FIG. 63, when the photocatalytic filter 344 has an annular disk shape, the light emitter guide 348b may have an annular disk shape having a smaller outer diameter than an outer diameter of the photocatalytic filter 344 by a predetermined ratio and a larger inner diameter than an inner diameter of the photocatalytic filter 344 by a predetermined ratio.

As shown in FIGS. 61 and 63, when the filter assembly 341 is coupled to the second fixing bracket 349, the light emitter guide 348b may be disposed on a central part of the bracket body 348a to face the photocatalytic filter 344. To this end, the bracket body 348a may further include a plurality of fixing ribs 348e that is installed at a predetermined interval to fix the light emitter guide 348b to the bracket body 348a. Flow path holes 348f through which the air A delivered from the filter assembly 341 passes may be formed between the fixing ribs 348e.

As shown in FIGS. 64 and 65, the light emitter guide 348b may include a fitting groove 348g that is concave in the lower surface thereof, which faces the photocatalytic filter 344. In response thereto, as shown in FIG. 66, the light emitter 342 may include a substrate 342a detachably fitted into the fitting groove 348g, light emitting devices 342b that are installed at a predetermined interval on one surface of the substrate 342a and emit excitation light (UV) for activation of photochemical reaction of the photocatalyst, and a connection terminal 342c for electrically connecting the substrate 342a and an external power source.

As shown in FIG. 66, the substrate 342a may have a shape corresponding to the light emitter guide 348b. For example, when the light emitter guide 348b has an annular disk shape, the fitting groove 348g formed in the lower surface of the light emitter guide 348b may also have an annular disk shape, and thus the substrate 342a may have an annular disk shape to be fitted into the fitting groove 348g. In particular, the substrate 342a may be detachably fitted into the fitting groove 348g, and as such, the substrate 342a may be separated from the light emitter guide 348b, and then repair, replacement, and other maintenance work for the light emitting device 342b and other components of the light emitter 342 may be easily performed.

The light emitting device 342b may be provided to emit ultraviolet light, which has a self-sterilizing effect, as excitation light (UV), but is not limited thereto. For example, the light emitting device 342b may be provided to emit light of various wavelengths for activation of photochemical reaction of photocatalyst in addition to ultraviolet light. The light emitting device 342b may be configured as a light emitting diode, but is not limited thereto.

As described above, as the light emitter 342 is provided, as shown in FIGS. 64 and 65, the substrate 342a may be detachably fitted into the fitting groove 348g to allow the light emitting devices 342b and the unit photocatalytic filters 344b to face each other. Then, excitation light (UV) emitted from the light emitting devices 342b may be emitted to the filter assembly 341 fixed to the second fixing bracket 349, and photochemical reaction of photocatalyst coated on the filter assembly 341 may be activated by excitation light (UV), thereby generating hydroxyl radicals.

As shown in FIG. 63, the second fixing bracket 349 may include the filter insert hole 349a, a second bolt hole 349b, a catch groove 349c, a third hook groove 349d, and a rib groove 349f.

The second fixing bracket 349 may have a shape corresponding to the photocatalytic filter 344. For example, as shown in FIG. 63, when the photocatalytic filter 344 has an annular disk shape, the second fixing bracket 349 may have an annular disk shape having the same inner diameter as an outer diameter of the filter guide 345 or a larger inner diameter than the outer diameter of the filter guide 345 by a predetermined ratio.

As shown in FIGS. 64 and 65, the second fixing bracket 349 may be provided in such a way that the photocatalytic filter 344 accommodated in the filter guide 345 and the light emitter 342 coupled to the light emitter guide 348b are spaced apart from each other by a predetermined reference distance. The reference distance may be set to intensively irradiate the unit photocatalytic filters 344b with excitation light (UV) emitted from the light emitting device 342b. Then, photochemical reaction of photocatalyst may be further activated by intensively irradiating the unit photocatalytic filters 344b having a relatively wide surface area compared with the filter guide 345 with excitation light (UV).

The filter insert hole 349a may correspond to a hollow formed in the central part of the second fixing bracket 349 in a thickness direction of the photocatalytic filter 344. The filter assembly 341 may be inserted into the filter insert hole 349a to allow the outer circumference of the filter guide 345 to face the inner circumference of the filter insert hole 349a.

The second bolt hole 349b may be formed in the upper surface of the second fixing bracket 349 to be matched with the first bolt hole 348c of the first fixing bracket 348. The same number of second bolt holes 349b as the number of the formed first bolt holes 348c may be formed. For example, when the plurality of first bolt holes 348c is formed, the same number of second bolt holes 349b as the number of the formed first bolt holes 348c may be formed at the same interval at which the first bolt holes 348c are formed.

As described above, as the bolt holes 348c and 349b are provided in the fixing brackets 348 and 349, the first fixing bracket 348 and the second fixing bracket 349 may be coupled to each other by coupling a bolt to the first bolt holes 348c and the second bolt holes 349b that are matched with each other in the state in which the first fixing bracket 348 and the second fixing bracket 349 are disposed to match the first bolt holes 348c and the second bolt holes 349b with each other. Then, the filter assembly 341 coupled to the second fixing bracket 349 and the second fixing bracket 349 may be fixed at a predetermined position of the second internal flow path 310c in the state of being supported by the first fixing bracket 348.

As shown in FIG. 63, the catch groove 349c may be formed in the inner circumference of the filter insert hole 349a for the catch rib 346e of the first filter guide 346 to be inserted thereinto. In particular, as shown in FIG. 65, the catch groove 349c may be formed to have a predetermined depth to catch the catch rib 346e inserted into the catch groove 349c by the inner circumference of the catch groove 349c.

The third hook groove 349d may be formed in the inner circumference of the filter insert hole 349a to hook the third coupling hook 347h of the second filter guide 347 thereto. As shown in FIG. 63, a catch protrusion 349e by which the third coupling hook 347h inserted into the third hook groove 349d is caught may protrude from the inner circumference of the third hook groove 349d. Then, the third coupling hook 347h may be hooked to the third hook groove 349d by catching the third coupling hook 347h inserted into the third hook groove 349d by the catch protrusion 349e.

The third hook groove 349d and the third coupling hook 347h may be provided to hook the third coupling hook 347h to the third hook groove 349d or separate the third coupling hook 347h from the third hook groove 349d in the state in which the catch rib 346e is caught by the catch groove 349c. To this end, at least one of the third hook groove 349d or the third coupling hook 347h may be elastically deformed.

The rib groove 349f may be formed in the inner circumference of the filter insert hole 349a for the first protrusion rib 347d of the second filter guide 347 to be inserted thereinto. As shown in FIG. 64, a stopper 349g may protrude from the internal surface of the rib groove 349f. The stopper 349g may be formed to catch an upper end of the first protrusion rib 347d in a thickness direction of the photocatalytic filter 344 when the filter assembly 341 is inserted into the filter insert hole 349a by a predetermined depth. The stopper 349g may limit a depth by which the filter assembly 341 is inserted to prevent the filter assembly 341 from being excessively inserted into the filter insert hole 349a by a depth larger than the predetermined depth.

By the second fixing bracket 349, the third coupling hook 347h may be hooked to the third hook groove 349d while the catch rib 346e is hooked to the catch groove 349c when the filter assembly 341 is inserted into the filter insert hole 349a, and as such, the filter assembly 341 may be coupled to the inner circumference of the filter insert hole 349a. As such, as the filter assembly 341 is installed, as shown in FIGS. 64 and 65, the air A that has reached the filter assembly 341 after being purified by the filter 330 in the first internal flow path 310b in the state in which the filter assembly 341 is irradiated with excitation light (UV) emitted from the light emitting device 342b may pass through the filter assembly 341 and may then flow into the second internal flow path 310c. Then, photochemical reaction of photocatalyst coated on the filter assembly 341 may be activated by excitation light (UV), and the air A passing through the filter assembly 341 may be sterilized and deodorized by hydroxyl radicals generated by photochemical reaction.

The dust collection performance of the filter 330 may be affected by flow resistance to the air A flowing along the internal flow path 310a, and thus when the flow resistance to the air A flowing along the internal flow path 310a increases due to installation of the photocatalytic filter 344, there may be a possibility of the dust collection performance of the filter 330 being lowered. However, the photocatalytic filter 344 of the filter assembly 341 may have an annular ring shape having the bypass hole 344a formed in a central part thereof. Thus, as shown in FIGS. 64 and 65, any part of the air A that has reached the filter assembly 341 may pass through the unit photocatalytic filters 344b, and another part of the air A may pass through the bypass hole 344a. Thus, when the photocatalyst module 340 having an annular ring shape is used, increase in flow resistance due to the photocatalytic filter 344 may be reduced compared with the case in which a general photocatalytic filter having a disk shape without the bypass hole 344a is applied to the photocatalyst module 340. As such, the photocatalytic filter 344 may minimize reduction in dust collection performance of the filter 330 due to the photocatalytic filter 344.

The flowing grille 347c coated with the photocatalyst may be installed in the second through hole 347a of the second filter guide 347, which is formed to be matched with the bypass hole 344a, to come into contact with the air A passing through the bypass hole 344a. By the flowing grille 347c, the reduced amount of hydroxyl radical production when the photocatalytic filter 344 with an annular ring shape is applied to the photocatalyst module 340 may be supplemented, and thus the amount of hydroxyl radical production at an appropriate level for sterilization and deodorization of the air A may be stably ensured.

FIG. 67 is a partial cross-sectional view showing the state in which a filter assembly is separated from a fixing bracket, FIG. 68 is a partial enlarged view of FIG. 67, and FIG. 69 is a perspective view showing the state in which a photocatalyst module is separated from a housing.

As described above, at least one of the third hook groove 349d or the third coupling hook 347h may be elastically deformed to hook the third coupling hook 347h to the third hook groove 349d or to separate the third coupling hook 347h from the third hook groove 349d in the state in which the catch rib 346e is caught by the catch groove 349c. Thus, as shown in FIGS. 67 and 68, when the filter assembly 341 is separated from the filter insert hole 349a, the third coupling hook 347h may be preferentially separated from the third hook groove 349d in the state in which the cover panel 320 and the filter 330 are separated from the housing 310 to expose the filter assembly 341 coupled to the filter insert hole 349a to the outside through the first openings 313a. Then, the filter assembly 341 may be separated from the filter insert hole 349a by obliquely inclining the filter assembly 341 based on the catch rib 346e caught by the catch groove 349c and then drawing out the catch rib 346e from the catch groove 349c. As shown in FIG. 69, the filter assembly 341 separated from the filter insert hole 349a may be drawn out from the housing 310 through the first openings 313a, and as such, cleaning and replacement of the photocatalytic filter 344 and other maintenance work for the filter assembly 341 may be easily performed in the state in which the filter assembly 341 is drawn out to the outside.

When the filter assembly 341 is coupled to the filter insert hole 349a, the filter assembly 341 may be coupled to the filter insert hole 349a by performing the aforementioned separation of the filter assembly 341 in reverse order. That is, when the filter assembly 341 is coupled to the filter insert hole 349a, the filter assembly 341 may be coupled to the filter insert hole 349a by inserting the catch rib 346e into the catch groove 349c and then hooking the third coupling hook 347h to the third hook groove 349d.

FIG. 70 is a schematic perspective view of the configuration of an air cleaner according to a fourth embodiment of the present invention, FIG. 71 is a block diagram for explaining a control system of the air cleaner shown in FIG. 70, and FIG. 72 is a diagram showing the state in which an input and output module is separated from a discharge grille.

An air cleaner 4 according to the fourth embodiment of the present invention may be different from the aforementioned air cleaner 1 in that a coupling relationship between a housing 410 and an input and output module 460 is changed.

Referring to FIGS. 70 to 72, the air cleaner 4 may include the housing 410 in which an internal flow path 411b is formed, a cover panel 420 in which absorption holes 422 for guiding the outside air A to the internal flow path 411b are formed, a filter 430 for purifying the air A guided to the internal flow path 411b, a blower unit 440 for blowing the air A accommodated in the internal flow path 411b, a discharge unit 450 for discharging the air A blown by the blower unit 440 to the outside, the input and output module 460 for remotely manipulating the air cleaner 4 and detachably coupled to the discharge unit 450, a sensing unit 470 for sensing whether the discharge unit 450 is coupled at a predetermined position of the housing 410, and a controller 480 for controlling overall driving of the air cleaner 4.

FIG. 73 is a cross-sectional view showing a coupling relationship between a housing and an input and output module, and FIG. 74 is a diagram showing the state in which a first signal transceiver and a wireless power transmitter are installed in a housing.

First, the housing 410 is a device for supporting and accommodating various components included in the air cleaner 4.

The configuration of the housing 410 is not particularly limited. For example, as shown in FIGS. 71 to 73, the housing 410 may include a housing body 411 for providing a support framework and space for installing various components, a first signal transceiver 413 for wirelessly transmitting and receiving a signal, and a wireless power transmitter 415 for wirelessly transmitting power for driving the input and output module 460.

As shown in FIG. 73, the housing body 411 may include a first opening (not shown) having one opened side to be connected to the outside, the internal flow path 411b formed in the housing 410, and a second opening 411c having the other opened side to be connected to the outside.

The first signal transceiver 413 may be provided to wirelessly transmit and receive a manipulation signal and other signals for remotely manipulating the air cleaner 4. For example, the first signal transceiver 413 may be provided to wirelessly transmit signals output from the controller 480 and various other electrical parts included in the air cleaner 4 or to wirelessly receive a manipulation signal transmitted from the first signal transceiver 413 of the input and output module 460 to be described below and signals transmitted from other external devices.

The position at which the first signal transceiver 413 is installed is not particularly limited. For example, as shown in FIGS. 73 and 74, when the air cleaner 4 is configured as a tower-type air cleaner, the first signal transceiver 413 may be fixedly installed to an upper end of one surface of the housing body 411 to face a second signal transceiver 464 of the input and output module 460 to be described below.

A method of transmitting and receiving a signal of the first signal transceiver 413 is not particularly limited. For example, the first signal transceiver 413 may be provided to wirelessly transmit and receive an infrared signal.

The wireless power transmitter 415 may be provided to wirelessly transmit power for driving the input and output module 460 via electromagnetic induction using a coil. However, the present invention is not limited thereto, and the wireless power transmitter 415 may be also provided to wirelessly transmit power using an electron resonance method, a microwave method, and other methods.

The position at which the wireless power transmitter 415 is installed is not particularly limited. For example, as shown in FIGS. 73 and 74, when the air cleaner 4 is configured as a tower-type air cleaner, the wireless power transmitter 415 may be installed at an upper end of one surface of the housing body 411 to be spaced apart from the first signal transceiver 413 at a predetermined interval so as to face a wireless power receiver 465 of the input and output module 460 to be described below.

As shown in FIG. 73, the housing 410 may further include a cover member 417 that is detachably installed on one surface of the housing body 411 to cover the first signal transceiver 413 and the wireless power transmitter 415, but the present invention is not limited thereto.

Then, the cover panel 420 is a device for delivering the outside air A to a first opening of the housing body 411 while protecting the housing body 411 from the outside.

As shown in FIG. 70, the cover panel 420 may have a shape corresponding to the outer circumference of the housing body 411 to surround at least a portion of the housing body 411.

The cover panel 420 may be formed to connect the plurality of absorption holes 422 having a predetermined size for allowing the air A to pass therethrough to the first opening.

Then, the blower unit 440 is a device for providing flow force for forcibly flowing the air A accommodated in the internal flow path 411*b*.

The configuration of the blower unit 440 is not particularly limited. For example, as shown in FIG. 71, the blower unit 440 may include a blowing fan (not shown) provided to blow the air A accommodated in the internal flow path 411*b*, and a driving motor 442 for rotating and driving the blowing fan.

Then, the discharge unit 450 is a device for discharging the air A blown by the blowing fan to the outside.

The configuration of the discharge unit 450 is not particularly limited. For example, as shown in FIG. 72, the discharge unit 450 may include a discharge grille 452, a guide vane 454, and an internal grille 456.

The discharge grille 452 may be provided to prevent contaminants, and other liquid or solid foreign objects from flowing into the internal flow path 411*b* through the second opening 411*c* while discharging the air A that has reached the second opening 411*c* to the outside. To this end, as shown in FIG. 72, the discharge grille 452 may include a plurality of discharge holes 452*a* formed to allow the air A blown by the blowing fan to the second opening 411*c* to pass therethrough.

The guide vane 454 may be provided to deliver the air A blown by the blowing fan to the discharge grille 452 in a predetermined state.

The internal grille 456 may be provided to prevent residual substances of external objects passing through the discharge grille 452 from flowing into the internal flow path 411*b*.

FIG. 75 is a partial perspective view of a discharge grille and an input and output module viewed in downward direction.

Then, the input and output module 460 is a device for inputting a manipulation signal and other information for manipulating the air cleaner 4 or outputting a driving state and other information of the air cleaner 4.

The configuration of the input and output module 460 is not particularly limited. For example, as shown in FIGS. 71 and 72, the input and output module 460 may include a module body 461, an input member 462 for inputting information, an output member 463 for outputting information, the second signal transceiver 464 for transmitting and receiving a signal, the wireless power receiver 465 for wirelessly receiving power transmitted from the wireless power transmitter 415 of the housing 410, and a battery 466 charged with power received by the wireless power receiver 465.

As shown in FIGS. 70 and 72, the module body 461 may be provided to be detachably coupled to the discharge grille 452. To this end, the discharge grille 452 may further include an accommodation groove 452*b* concave in an upper surface thereof for the module body 461 to be inserted and accommodated thereinto, and a first fixing member 452*c* for detachably fixing the module body 461 accommodated at a predetermined reference position of the accommodation groove 452*b*.

As shown in FIG. 72, the accommodation groove 452*b* may extend to an outer side from the central part of the discharge grille 452 and may be concave in a thickness direction of the discharge grille 452 to be opened toward the upper side of the air cleaner 4.

The shape of the accommodation groove 452*b* is not particularly limited, and the accommodation groove 452*b* may have a shape corresponding to the shape of the module body 461 to surround the outer circumference of the module body 461 inserted into and accommodated in the corresponding accommodation groove 452*b*.

The first fixing member 452*c* may have at least a portion formed of a permanent magnet to detachably fix the module body 461 using magnetism. The position at which the first fixing member 452*c* is installed is not particularly limited. For example, as shown in FIG. 75, the discharge grille 452 may further include a fitting groove 452*d* formed in a lower surface to fit the first fixing member 452*c* thereinto, and the first fixing member 452*c* may be disposed on the lower surface of the discharge grille 452 in the state of being fitted into the fitting groove 452*d*.

The number of the installed first fixing member 452*c* is not particularly limited. For example, as shown in FIG. 75, the plurality of fitting grooves 452*d* may be formed at a predetermined interval, and each of the fitting grooves 452*d* may be fitted into the first fixing member 452*c*.

The module body 461 may further include a second fixing member 461*a* having at least a portion formed of a permanent magnet or a magnetic material to be detachably coupled to the first fixing member 452c using magnetism discharged from the first fixing member 452c.

A method of installing the second fixing member 461a is not particularly limited. For example, bolt holes (not shown) formed at the same interval as an interval at which the fitting grooves 452d are disposed may be formed in the lower surface of the module body 461, and the second fixing member 461a may be formed of a permanent magnet or a magnetic material, and may have a bolt structure to be coupled to each of the bolt holes.

By the first fixing member 452c and the second fixing member 461a, the input and output module 460 may be detachably coupled at a predetermined reference position of the accommodation groove 452b using magnetism. Thus, the input and output module 460 may be used as a manipulation panel for manipulating the air cleaner 4 in the state of being accommodated in the accommodation groove 452b or may be used as a remote controller for remotely manipulating the air cleaner 4 in the state of being separated from the accommodation groove 452b when the air cleaner 4 is driven in a normal mode of use for air purification, dehumidification, etc.

Although the case in which the first fixing member 452c has at least a portion formed of a permanent magnet and the second fixing member 461a has at least a portion formed of a permanent magnet or a magnetic material has been described above, the present invention is not limited thereto. That is, the first fixing member 452c may also have at least a portion formed of a permanent magnet or a magnetic material and the second fixing member 461a may be formed of a permanent magnet.

The input member 462 and the output member 463 may have substantially the same configuration of the input member 162 and the output member 163 of the aforementioned air cleaner 1, and a detailed description thereof will be omitted.

The second signal transceiver 464 may be provided to wirelessly transmit and receive a manipulation signal and other signals for manipulating the air cleaner 4. For example, the second signal transceiver 464 may be provided to transmit a manipulation signal and other signals input by the input member 462 or to receive driving information and other signals of the air cleaner 4 transmitted from the first signal transceiver 413 or an external device in the state of being wirelessly connected to the first signal transceiver 413 or an external device.

The position at which the second signal transceiver 464 is installed is not particularly limited. For example, as shown in FIG. 73, when the module body 461 is accommodated at a predetermined reference position of the accommodation groove 452b, the second signal transceiver 464 may be installed on the lower surface of the module body 461 to face the first signal transceiver 413.

A method of transmitting and receiving a signal of the second signal transceiver 464 is not particularly limited. For example, when the first signal transceiver 413 is provided to wirelessly transmit and receive an infrared signal, the second signal transceiver 464 may be provided to wirelessly transmit and receive an infrared signal.

The wireless power receiver 465 may be provided to wirelessly receive power transmitted from the wireless power transmitter 415. For example, when the wireless power transmitter 415 is provided to wirelessly transmit power via electromagnetic induction using a coil, the wireless power receiver 465 may be provided to receive power that is wirelessly transmitted by the wireless power transmitter 415 via electromagnetic induction using a coil.

The position at which the wireless power receiver 465 is installed is not particularly limited. For example, as shown in FIG. 73, when the module body 461 is accommodated at a predetermined reference position of the accommodation groove 452b, the wireless power receiver 465 may be fixedly installed inside the module body 461 to be spaced apart from the wireless power transmitter 415 by a distance equal to or less than a predetermined effective charging distance.

The battery 466 may be configured as a secondary battery to be charged and discharged with power. The battery 466 may be charged with power received from the wireless power transmitter 415 through the wireless power receiver 465, and various electrical parts included in the input and output module 460 may be driven using power that is wirelessly received by the wireless power receiver 465 or power supplied from the battery 466.

Then, the sensing unit 470 is a device for sensing whether the second opening 411c of the housing body 411 is opened.

A method of sensing whether the second opening 411c is opened is not particularly limited. For example, the sensing unit 470 may be provided to sense whether the discharge unit 450 is coupled to the second opening 411c.

To this end, the sensing unit 470 may include a target member (not shown) installed at a predetermined position of any one of the housing body 411 and the discharge unit 450, and a sensing member 474 installed at a predetermined position of the other one of the housing body 411 and the discharge unit 450 and configured to detect the target member.

The controller 480 may determine the state in which the discharge unit 450 is installed based on a signal transferred by the sensing member 474. For example, when the sensing member 474 detects the target member, the controller 480 may determine that the discharge unit 450 is coupled to the second opening 411c, and when the sensing member 474 does not detect the target member, the controller 480 may determine that the discharge unit 450 is separated from the second opening 411c.

The controller 480 may control driving of the air cleaner 4 based on the state in which the discharge unit 450 is installed. For example, upon determining that the discharge unit 450 is separated from the second opening 411c to open the second opening 411c, the controller 480 may stop driving of the driving motor 442 and various other electrical parts installed in the internal flow path 411b or may block supply of power to the electrical parts.

FIG. 76 is a diagram showing the state in which a discharge grille is separated from a housing.

As shown in FIG. 76, the discharge grille 452 may have a shape corresponding to the second opening 411c to be detachably fitted into the second opening 411c. Thus, the discharge grille 452 may be separated from the second opening 411c in the case of a maintenance work or other reasons that requires opening of the second opening 411c.

The above description is merely illustrative of the technical spirit of the present invention, and various modifications and variations will be possible without departing from the essential characteristics of the present invention by those skilled in the art to which the present invention pertains.

Therefore, the embodiments disclosed in the present invention are not intended to limit the technical spirit of the present invention, but to illustrate, and the scope of the technical spirit of the present invention is not limited by these embodiments. The scope of the present invention should be interpreted by the following claims, and all technical spirits within the scope equivalent thereto should be construed as being included in the scope of the present invention.

The invention claimed is:

1. An air cleaner comprising:
a housing including a first opening configured to absorb outside air, a second opening configured to discharge the air outside, and a housing body having an internal flow path connecting the first opening and the second opening:
a blower unit including a blowing fan configured to blow air accommodated in the internal flow path toward the second opening, and a driving motor disposed between the first opening and the blowing fan and detachably shaft-coupled to the blowing fan, and installed in the internal flow path;
a filter installed in the internal flow path and configured to purify air absorbed through the first opening;
a discharge unit including
(1) a discharge grille having a plurality of discharge holes formed to allow air reaching the second opening to pass therethrough
(2) a guide vane for guiding air passing through the internal flow path toward the discharge grille,
(3) a plurality of through holes for allowing the air to pass therethrough and formed to have a smaller diameter than the discharge holes,
(4) an internal grille disposed between the discharge grille and the guide vane, and
(5) a locking tab for locking the internal grille in a state of being coupled to the guide vane, and detachably coupled to the second opening, wherein the internal grille has a locking tab insert groove into which the locking tab is detachably inserted: and wherein:
the locking tab has a connection part with a bolt hole formed therein and a hinge pin extending from the connection part; and the locking tab insert groove has a bolt hole matched with the bolt hole of the locking tab, a connection part insert groove into which the connection part is detachably inserted, and a pin hole to which the hinge pin is hinged.

2. An air cleaner comprising:
a housing including a first opening configured to absorb outside air, a second opening configured to discharge the air outside, and a housing body having an internal flow path connecting the first opening and the second opening:
a blower unit including a blowing fan configured to blow air accommodated in the internal flow path toward the second opening, and a driving motor disposed between the first opening and the blowing fan and detachably shaft-coupled to the blowing fan, and installed in the internal flow path:
a filter installed in the internal flow path and configured to purify air absorbed through the first opening:
a discharge unit including
(1) a discharge grille having a plurality of discharge holes formed to allow air reaching the second opening to pass therethrough
(2) a guide vane for guiding air passing through the internal flow path toward the discharge grille,
(3) a plurality of through holes for allowing the air to pass therethrough and formed to have a smaller diameter than the discharge holes,
(4) an internal grille disposed between the discharge grille and the guide vane, and
(5) a locking tab for locking the internal grille in a state of being coupled to the guide vane, and detachably coupled to the second opening, wherein the internal grille has a locking tab insert groove into which the locking tab is detachably inserted: and wherein:
the guide vane has a locking hook protruding toward an inner circumference of the internal flow path;
the housing further includes a vane holder formed on the inner circumference of the internal flow path to be caught by the locking hook; and
the locking tab is provided to lock the guide vane and to maintain a state in which the locking hook is caught by the vane holder.

3. The air cleaner according to claim 2, wherein:
the guide vane is inserted into the second opening to selectively rotate the locking hook in a locking direction in which the vane holder is caught or an unlocking direction in which the locking hook caught by the vane holder is released; and
the locking tab is provided to lock the guide vane rotated in the locking direction and disposed in a predetermined locking form.

4. The air cleaner according to claim 3, wherein the locking tab includes a stopper caught by a predetermined flange of the housing in the unlocking direction when the guide vane is disposed in the locking form.

* * * * *